United States Patent
Sunaga et al.

(10) Patent No.: US 9,056,938 B2
(45) Date of Patent: Jun. 16, 2015

(54) FLUORINE-CONTAINING CYCLIC OLEFIN POLYMER COMPOSITION, IMPRINT PRODUCT OBTAINED USING THE COMPOSITION, AND METHOD FOR PRODUCING THE SAME

(75) Inventors: Tadahiro Sunaga, Yamato (JP); Takashi Oda, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 80 days.

(21) Appl. No.: 13/392,678

(22) PCT Filed: Aug. 20, 2010

(86) PCT No.: PCT/JP2010/005145
§ 371 (c)(1),
(2), (4) Date: Feb. 27, 2012

(87) PCT Pub. No.: WO2011/024421
PCT Pub. Date: Mar. 3, 2011

(65) Prior Publication Data
US 2012/0156448 A1 Jun. 21, 2012

(30) Foreign Application Priority Data
Aug. 26, 2009 (JP) .................................. 2009-195946

(51) Int. Cl.
*C08G 61/08* (2006.01)
*C08F 283/14* (2006.01)

(52) U.S. Cl.
CPC ....... *C08F 283/14* (2013.01); *Y10T 428/24802* (2015.01); *C08G 61/08* (2013.01); *C08G 2261/418* (2013.01); *C08G 2261/3324* (2013.01)

(58) Field of Classification Search
USPC ..................................... 522/65, 185; 526/252
See application file for complete search history.

(56) References Cited

U.S. PATENT DOCUMENTS 5,776,997 A * 7/1998 Hafner et al. .................... 522/65
6,875,819 B2 * 4/2005 Sunaga et al. ............. 525/326.2
(Continued)

FOREIGN PATENT DOCUMENTS

JP 63-210114 A 8/1988
JP 6-206985 A 7/1994
(Continued)

OTHER PUBLICATIONS

Office Action dated Jan. 14, 2013, issued by the Chinese Patent Office in the corresponding Chinese Patent Application No. 201080037682.3 (5 pages).
(Continued)

*Primary Examiner* — Peter D Mulcahy
*Assistant Examiner* — Henry Hu
(74) *Attorney, Agent, or Firm* — Buchanan Ingersoll & Rooney PC

(57) ABSTRACT

A fluorine-containing cyclic olefin polymer composition of the present invention includes a fluorine-containing cyclic olefin polymer (A) containing a repeating structural unit represented by the general formula (1) and having a fluorine atom content rate of 40 to 75% by mass; a photocurable compound (B); and a photocuring initiator (C).

7 Claims, 1 Drawing Sheet

(56) References Cited

U.S. PATENT DOCUMENTS

| | | | |
|---|---|---|---|
| 2006/0008731 A1 | 1/2006 | Van Der Puy et al. | |
| 2009/0215974 A1* | 8/2009 | Sunaga et al. | 526/282 |
| 2009/0246686 A1* | 10/2009 | Watanabe et al. | 430/270.1 |

FOREIGN PATENT DOCUMENTS

| | | | |
|---|---|---|---|
| JP | 07-149823 A | | 6/1995 |
| JP | 2000-323461 A | | 11/2000 |
| JP | 2001-350265 A | | 12/2001 |
| JP | 2002-40650 A | | 2/2002 |
| JP | 2002-539604 A | | 11/2002 |
| JP | 2003-155365 | * | 5/2003 |
| JP | 2003-155365 A | | 5/2003 |
| JP | 2004-504718 A | | 2/2004 |
| JP | 2005-515617 A | | 5/2005 |
| JP | 2006-054300 | * | 2/2006 |
| JP | 2006-54300 A | | 2/2006 |
| JP | 2006-293094 A | | 10/2006 |
| JP | 2007-177046 A | | 7/2007 |
| JP | 2008-202022 | * | 9/2008 |
| WO | WO 00/54107 A1 | | 9/2000 |
| WO | WO 02/07199 A1 | | 1/2002 |
| WO | WO 03/031096 A2 | | 4/2003 |
| WO | WO 2008/155928 | | 12/2008 |

OTHER PUBLICATIONS

International Search Report (PCT/ISA/210) issued on Dec. 7, 2010, by Japanese Patent Office as the International Searching Authority for International Application No. PCT/JP2010/005145.

Office Action issued in corresponding Japanese Patent Application No. 2011-528636 dated Oct. 15, 2013.

* cited by examiner

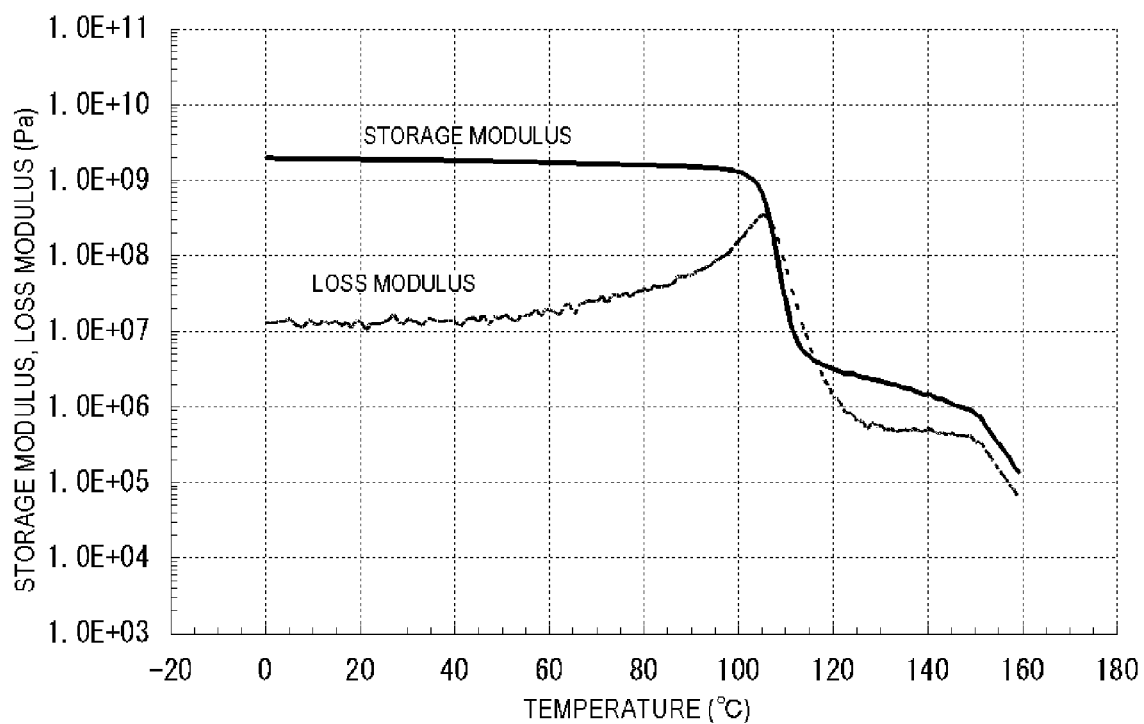

FLUORINE-CONTAINING CYCLIC OLEFIN POLYMER COMPOSITION, IMPRINT PRODUCT OBTAINED USING THE COMPOSITION, AND METHOD FOR PRODUCING THE SAME

TECHNICAL FIELD

The present invention relates to a fluorine-containing cyclic olefin polymer composition, an imprint product having a desired fine pattern formed using the composition, and a method for producing the same.

BACKGROUND ART

A resin molding product having a fine pattern is useful such as an optical element (a micro lens array, an optical waveguide, an optical switching, a Fresnel zone plate, a binary optical element, a blaze optical element, a photonics crystal, or the like), an anti-reflection filter, a biochip, a microreactor chip, a recording medium, a display material, a carrier for a catalyst. There has been recently a demand for acquisition of smaller devices as well as finer patterns thereof. As a method for preparing a resin molding product having such a fine structure over its surface, there has been proposed a method in which a pattern of a mold having a fine pattern is transcribed on a resin to produce an imprint product having a fine pattern formed thereon, that is, a so-called nanoimprint method (see, for example, Patent Documents 1 and 2). Furthermore, as a method substituting for a photolithographic method in a process of manufacturing semiconductor, there has been proposed a nanoimprint method in which a resist is coated on a silicone substrate and a mold having a fine pattern formed thereon is pressed to transcribe the fine pattern on the resist (see, for example, Patent Documents 3 and 4).

However, in any of the above-mentioned nanoimprint methods, a step of releasing a mold has suffered from a problem that the mold is not smoothly released and the shape precision of fine patterns in the imprint product is reduced. Thus, in order to smoothly release the mold, an attempt has been made to coat a release agent on a mold surface. In this case, there have been problems that unevenness in the thickness of a release agent layer causes reduction of the pattern precision of a mold, and that the release agent layer becomes thinner due to successive use of the mold, and accordingly, there occurs a need to coat a release agent on the mold again, leading to reduction of the productivity.

In order to solve these problems, there has been proposed a method in which a non-adhesive material having a non-adhesive surface energy of less than about 30 dyn/cm is used as a mold material (Patent Document 5). Examples of the non-adhesive material include fluoropolymers such as a fluorinated ethylene propylene copolymer, a tetrafluoroethylene polymer; fluorinated siloxane polymers; silicones; and the like.

However, the method described in Patent Document 5 includes imprinting a mold or its negative pattern made of a non-adhesive material onto a photocurable or thermosetting thin film formed on a substrate. that is, the method uses a mold or its negative pattern as a lithographic tool. In Patent Document 5, the non-adhesive material is intended to serve mainly as a release agent. Further, a mold using silicone has a low elastic modulus, and it is difficult to imprint a pattern shape precisely.

Furthermore, in Patent Document 6, there is disclosed a method for forming a pattern on a transcription layer, which consists of a step in which a thermoplastic resin containing a fluorine-containing polymer which has 35% by mass or more of a fluorine content, is pressed with a mold having an inverse pattern of a desired pattern, and thereby forming a desired pattern on the transcription layer; and a step in which the mold is released from the transcription layer. It is described that according to this method, the releasability of the transcription layer is excellent and a fine pattern can be formed. Herein, examples of the fluorine-containing polymer include polytetrafluoroethylene, a 1,1,1-trifluoro-2-trifluoromethylpenten-2-ol copolymer, a perfluorocyclic ether polymer (trade name CYTOP (registered trademark)), a copolymer of chlorotrifluoroethylene and vinyl ether (trade name LUMIFLON (registered trademark)), and the like.

However, when the fluorine content of these polymers is 60% by mass or less, their dimensional accuracy in terms of the depth, width and interval of convex structures is low and dimensional difference is large, because the elastic modulus is rapidly decreased at a temperature above the glass transition temperature, and after the polymer is subjected to press molding, when cooling rapidly, the shrinkage ratio is increased due to the decreased elastic modulus. In addition, even if fluorine content is 60% by mass or more, the fluorine resins such as polytetrafluoroethylene which exhibit a high melting point temperature (Tm), since it is necessary to set the molding temperature markedly higher, provide significant differences in the dimensions between the convex structure mold and the imprint product because of increase in the differences between the elastic modulus and shrinkage ratio during the process of heating and cooling. Furthermore, the fluorine resins must be pressed at temperature of 300° C. or higher which associate with a high possibility of decomposition of the fluorine resins when heated at the temperature of 260° C. higher to generate hydrogen fluoride gas and therefore, there occur problems such as corrosion of molds and peripheral devices, environmental pollution.

The imprint methods which comprise molding by heat press as suggested as described above, are required to uniformly put high pressure on a large area in order to obtain an imprint product with a large area, and thus a large-sized heat press molding machine is necessitated. Thus, there is a large problem in manufacturing an imprint product with a large area because of limitations on the area of the imprint product that can be industrially processed.

RELATED DOCUMENT

Patent Document

[Patent Document 1] PCT Japanese Translation Patent Publication No. 2004-504718
[Patent Document 2] PCT Japanese Translation Patent Publication No. 2002-539604
[Patent Document 3] Japanese Unexamined Patent Publication No. 2000-323461
[Patent Document 4] Japanese Unexamined Patent Publication No. 2003-155365
[Patent Document 5] PCT Japanese Translation Patent Publication No. 2005-515617
[Patent Document 6] Japanese Unexamined Patent Publication No. 2006-54300

DISCLOSURE OF THE INVENTION

It is an object of the present invention to provide an imprint product, to which a fine pattern on a mold surface is transcribed with high dimensional precision by optimizing the change in the modulus and the shrinkage rate of a resin in the processes of heating, cooling, and curing with light irradiation in the step for producing a nanoimprint product, using a fluorine-containing cyclic olefin polymer composition containing a specific fluorine-containing cyclic olefin polymer, a photocurable compound, and a photocuring initiator. It is another object of the present invention to provide an imprint product having a high surface hardness, using the fluorine-containing cyclic olefin polymer composition. It is still another object of the present invention to provide a method for producing an imprint product, in which an imprint can be efficiently produced with high dimensional precision, and thus, an imprint having a large area can be obtained by a simple process; and a method for preparing a cured product having a fine pattern transcribed to the surface of a photocuring resin using the imprint product as a replica mold.

Means for Solving the Problems

Embodiments of the present invention are as follows.

(1) A fluorine-containing cyclic olefin polymer composition, wherein the composition comprises:
a fluorine-containing cyclic olefin polymer (A) containing a repeating structural unit represented by the general formula (1) and having a fluorine atom content rate of 40 to 75% by mass; a photocurable compound (B); and a photocuring initiator (C).

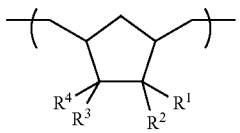

(in the formula (1), at least one of $R^1$ to $R^4$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms. In the case where $R^1$ to $R^4$ are fluorine-free groups, $R^1$ to $R^4$ are selected from hydrogen, alkyl having 1 to 10 carbon atoms, alkoxy having 1 to 10 carbon atoms, and alkoxyalkyl having 2 to 10 carbon atoms. $R^1$ to $R^4$ may be the same as or different from each other; $R^1$ to $R^4$ may be combined with one another to form a ring structure.)

(2) The fluorine-containing cyclic olefin polymer composition as set forth in (1),
wherein the mass ratio (A)/(B) of the fluorine-containing cyclic olefin polymer (A) and the photocurable compound (B) is in the range from 99.9/0.1 to 80/20.

(3) The fluorine-containing cyclic olefin polymer composition as set forth in (1) or (2),
wherein the photocurable compound (B) is a (meth)acrylate monomer having a trifunctional or higher reactive double bond group and/or an epoxy monomer having a trifunctional or higher cationically ring-opening polymerizable linking group.

(4) The fluorine-containing cyclic olefin polymer composition as set forth in any one of (1) to (3),
wherein the storage modulus or loss modulus of the fluorine-containing cyclic olefin polymer (A) in the measurement of a dynamic mechanical analysis by tensile mode at a frequency of 1 Hz and a temperature increase rate of 3° C./minute has a variable region in the range from −1 to 0 MPa/° C. with respect to a temperature varying in the temperature region of the glass transition temperature or higher.

(5) The fluorine-containing cyclic olefin polymer composition as set forth in any one of (1) to (4),
wherein the variable region of the storage modulus or loss modulus in the temperature region of the glass transition temperature or higher of the fluorine-containing cyclic olefin polymer (A) is in the storage modulus region or loss modulus region of 0.1 MPa or more.

(6) The fluorine-containing cyclic olefin polymer composition as set forth in any one of (1) to (5),
wherein the fluorine-containing cyclic olefin polymer (A) is constituted with a repeating structural unit [I] represented by the general formula (1) and a repeating structural unit [II] represented by the general formula (2), the molar ratio thereof is [I]/[II]=95/5 to 25/75, and the fluorine atom content rate is 40 to 75% by mass.

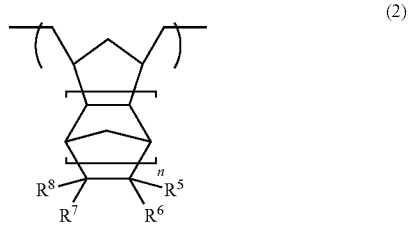

(in the formula (2), at least one of $R^5$ to $R^8$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms. In the case where $R^5$ to $R^8$ are fluorine-free groups, $R^5$ to $R^8$ are selected from hydrogen, alkyl having 1 to 10 carbon atoms, alkoxy having 1 to 10 carbon atoms, and alkoxyalkyl having 2 to 10 carbon atoms. $R^5$ to $R^8$ may be the same as or different from each other; $R^5$ to $R^8$ may be combined with one another to form a ring structure; n represents an integer of 1 or 2.)

(7) An imprint product having a fine pattern of a mold surface transcribed thereon, wherein the imprint product comprises a fluorine-containing cyclic olefin polymer (A) containing a repeating structural unit represented by the general formula (1) and having a fluorine atom content rate of 40 to 75% by mass; a photocurable compound (B); and a photocuring initiator (C).

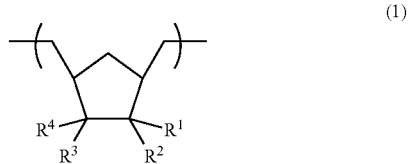

(in the formula (1), at least one of $R^1$ to $R^4$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms; in the case where $R^1$ to $R^4$ are fluorine-free groups, $R^1$ to $R^4$ are selected from hydrogen, alkyl having 1 to 10 carbon atoms, alkoxy having 1 to 10 carbon atoms, and alkoxyalkyl having 2 to 10 carbon atoms; $R^1$ to $R^4$ may be the same as or different from each other; $R^1$ to $R^4$ may be combined with one another to form a ring structure.)

(8) The imprint product as set forth in (7),
wherein the mass ratio (A)/(B) of the fluorine-containing cyclic olefin polymer (A) and the photocurable compound (B) is in the range from 99.9/0.1 to 80/20.

(9) The imprint product as set forth in (7) or (8),
wherein the storage modulus or loss modulus of the fluorine-containing cyclic olefin polymer (A) in the measurement of a dynamic mechanical analysis by tensile mode at a frequency of 1 Hz and a temperature increase rate of 3° C./minute has a variable region in the range from −1 to 0 MPa/° C. with respect to a temperature varying in the temperature region of the glass transition temperature or higher.

(10) The imprint product as set forth in any one of (7) to (9),
wherein the variable region of the storage modulus or loss modulus in the temperature region of the glass transition temperature or higher of the fluorine-containing cyclic olefin polymer (A) is in the storage modulus region or loss modulus region of 0.1 MPa or more.

(11) The imprint product as set forth in any one of (7) to (10),
wherein the fluorine-containing cyclic olefin polymer (A) is constituted with a repeating structural unit [I] represented by the general formula (1) and a repeating structural unit [II] represented by the general formula (2), the molar ratio thereof is [I]/[II]=95/5 to 25/75, and the fluorine atom content rate is 40 to 75% by mass.

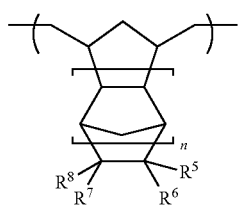

(in the formula (2), at least one of $R^5$ to $R^8$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms; in the case where $R^5$ to $R^8$ are fluorine-free groups, $R^5$ to $R^8$ are selected from hydrogen, alkyl having 1 to 10 carbon atoms, alkoxy having 1 to 10 carbon atoms, and alkoxyalkyl having 2 to 10 carbon atoms; $R^5$ to $R^8$ may be the same as or different from each other; $R^5$ to $R^8$ may be combined with one another to form a ring structure; n represents an integer of 1 or 2.)

(12) A method for producing an imprint product to which a fine pattern of a mold is transcribed, wherein the method comprises a step of bringing the fluorine-containing cyclic olefin polymer composition as set forth in any one of (1) to (6) into contact with the surface of a mold having a fine pattern over its surface, and
a step of heating the composition and then irradiating it with light to cure the composition.

(13) The method for producing an imprint as set forth in (12),
wherein the step of bringing the fluorine-containing cyclic olefin polymer composition into contact with the surface of the mold comprises a step of coating the composition over the surface of a mold having a fine pattern over its surface.

(14) A method for producing an imprint product to which a fine pattern of a mold is transcribed, wherein the method comprises a step of forming the coating film by coating the fluorine-containing cyclic olefin polymer composition as set forth in any one of (1) to (6) over a support,
a step of pressing the upper surface of the coating film to a mold surface having a fine pattern, and
a step of heating the coating film pressed over the mold surface, and then irradiating it with light to cure the coating film.

(15) A method for producing a cured body using the imprint product as set forth in any one of (7) to (11) as a mold, wherein the method comprises a step of bringing a surface having the fine pattern of an imprint product into contact with a photocurable monomer composition,
a step of curing the photocurable monomer composition with light irradiation to obtain a cured product, and
a step of releasing the cured product from the imprint product.

(16) A resin composition for obtaining an imprint product transcribed a fine pattern of a mold surface, wherein the composition comprises a fluorine-containing cyclic olefin polymer (A) containing a repeating structural unit represented by the general formula (1) and having a fluorine atom content rate of 40 to 75% by mass; a photocurable compound (B); and a photocuring initiator (C).

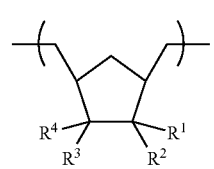

(in the formula (1), at least one of $R^1$ to $R^4$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms; in the case where $R^1$ to $R^4$ are fluorine-free groups, $R^1$ to $R^4$ are selected from hydrogen, alkyl having 1 to 10 carbon atoms, alkoxy having 1 to 10 carbon atoms, and alkoxyalkyl having 2 to 10 carbon atoms; $R^1$ to $R^4$ may be the same as or different from each other; $R^1$ to $R^4$ may be combined with one another to form a ring structure.)

(17) The resin composition for transcription as set forth in (16),
wherein the mass ratio (A)/(B) of the fluorine-containing cyclic olefin polymer (A) and the photocurable compound (B) is in the range from 99.9/0.1 to 80/20.

(18) The resin composition for transcription as set forth in (16) or (17),
wherein the storage modulus or loss modulus of the fluorine-containing cyclic olefin polymer (A) in the measurement of a dynamic mechanical analysis by tensile mode at a frequency of 1 Hz and a temperature increase rate of 3° C./minute has a variable region in the range from −1 to 0 MPa/° C. with respect to a temperature varying in the temperature region of the glass transition temperature or higher.

(19) The resin composition for transcription as set forth in any one of (16) to (18),
wherein the variable region of the storage modulus or loss modulus in the temperature region of the glass transition temperature or higher of the fluorine-containing cyclic olefin polymer (A) is in the storage modulus region or loss modulus region of 0.1 MPa or more.

(20) The resin composition for transcription as set forth in any one of (16) to (19),
wherein the fluorine-containing cyclic olefin polymer (A) is constituted with a repeating structural unit [I] represented by the general formula (1) and a repeating structural unit [II]

represented by the general formula (2), the molar ratio thereof is [I]/[II]=95/5 to 25/75, and the fluorine atom content rate is 40 to 75% by mass.

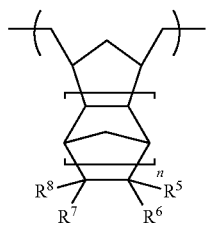

(2)

(in the formula (2), at least one of $R^5$ to $R^8$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms; in the case where $R^5$ to $R^8$ are fluorine-free groups, $R^5$ to $R^8$ are selected from hydrogen, alkyl having 1 to 10 carbon atoms, alkoxy having 1 to 10 carbon atoms, and alkoxyalkyl having 2 to 10 carbon atoms; $R^5$ to $R^8$ may be the same as or different from each other; $R^5$ to $R^8$ may be combined with one another to form a ring structure; n represents an integer of 1 or 2.)

In the present invention, the fine pattern means a structure including a convex portion and a concave portion, in which the width of the convex portion and/or the concave portion is from 10 nm to 50 μm, the depth of the concave portion is from 30 nm to 50 μm, and the aspect ratio of the width of the convex portion to the depth of the concave portion is from 0.1 to 500.

In the present invention, the expression "bringing a solution including a polymer composition and an organic solvent into contact with the surface of a mold having a fine pattern over its surface" includes any of a case where a solution including a polymer composition and an organic solvent is coated on a mold surface having a fine pattern formed thereon and a case where the solution is coated over a support (base material), and then the upper surface of the coating layer is pressed on a mold surface having a fine pattern formed thereon. In addition, this shall apply to the expression "bringing a surface having the fine pattern of the imprint product into contact with the photocurable monomer composition".

Effects of the Invention

According to the present invention, since a specific fluorine-containing cyclic olefin polymer having a hydrocarbon structure in the main chain and a fluorine-containing aliphatic ring structure in the side chain is used, a hydrogen bond can be formed between the molecules or within the molecule. Further, since a photocurable compound and a photocuring initiator are used, light is irradiated for curing, and thus, a three-dimensional network structure can be formed inside the imprint product and over the surface of the imprint product. By such an operation, it is possible to optimize the change in the modulus and the shrinkage rate of a resin in the processes of heating, cooling, and curing with light irradiation in the step for preparing a nanoimprint product, while further improving the hardness. Therefore, with the fluorine-containing cyclic olefin polymer composition containing a photocurable compound and a photopolymerization initiator of the present invention, the fine pattern of the mold surface is transcribed with high dimensional precision, and as a result, an imprint product having a fine pattern over its surface, having a high surface hardness, can be formed and an imprint product having a large area can be obtained by a simple process. This imprint product has an excellent separating property, superior production efficiency, and a high industrial value.

BRIEF DESCRIPTION OF THE DRAWINGS

FIG. 1 shows a change in the dynamic viscoelastic modulus measured in a tensile mode of the fluorine-containing cyclic olefin polymer obtained in Example 1, having a flat variable region of the storage modulus or the loss modulus in a temperature region from 113° C. to 152° C.

DESCRIPTION OF EMBODIMENTS

The fluorine-containing cyclic olefin polymer composition (resin composition for transcription) of the present invention contains a fluorine-containing cyclic olefin polymer (A), a photocurable compound (B), and a photocuring initiator (C).

<Fluorine-Containing Cyclic Olefin Polymer (A)>

The fluorine-containing cyclic olefin polymer (A) contains a repeating structural unit represented by the general formula (1) and has a fluorine atom content rate of 40 to 75% by mass.

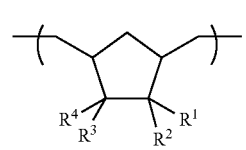

(1)

In the formula (1), at least one of $R^1$ to $R^4$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms. In the case where $R^1$ to $R^4$ are fluorine-free groups, $R^1$ to $R^4$ are selected from hydrogen, alkyl having 1 to 10 carbon atoms, alkoxy having 1 to 10 carbon atoms, and alkoxyalkyl having 2 to 10 carbon atoms. $R^1$ to $R^4$ may be the same as or different from each other. $R^1$ to $R^4$ may be combined with one another to form a ring structure.

More specifically, in the general formula (1), examples of $R^1$ to $R^4$ include fluorine; or alkyl having 1 to 10 carbon atoms, in which apart or all of hydrogen atoms of the alkyl group is (are) substituted with fluorine atom(s), such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methylisopropyl, perfluoro-2-methylisopropyl, n-perfluorobutyl, n-perfluoropentyl, perfluorocyclopentyl, and the like; alkoxy having 1 to 10 carbon atoms in which a part or all of hydrogen atoms of the alkoxy group is (are) substituted with fluorine atom(s), such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methylisopropoxy, perfluoro-2-methylisopropoxy, n-perfluorobutoxy, n-perfluoropentoxy, perfluorocyclopentoxy, and the like; and alkoxyalkyl having 2 to 10 carbon atoms in which a part or all of hydrogen atoms of the alkoxy group is (are) substituted with fluorine atom(s), such as fluoromethoxymethyl, difluoromethoxymethyl, trifluoromethoxymethyl, trifluoroethoxymethyl, pentafluoroethoxymethyl, heptafluoropropoxymethyl, hexafluoroisopropoxymethyl, heptafluoroisopropoxymethyl, hexafluoro-2-methylisopropoxymethyl, perfluoro-2- methylisopropoxymethyl, n-perfluorobutoxymethyl, n-perfluoropentoxymethyl, perfluorocyclopentoxymethyl, and the like.

Furthermore, $R^1$ to $R^4$ may be combined with one another to form a ring structure or to form a ring such as perfluorocycloalkyl, perfluorocycloether, which is formed through oxygen, and the like.

Furthermore, examples of other $R^1$ to $R^4$ containing no fluorine include hydrogen, or alkyl having 1 to 10 carbon atoms, for example, alkyl such as methyl, ethyl, propyl, isopropyl, 2-methylisopropyl, n-butyl, n-pentyl, cyclopentyl, and the like; alkoxy having 1 to 10 carbon atoms, such as methoxy, ethoxy, propoxy, butoxy, pentoxy, and the like; and alkoxyalkyl having 2 to 10 carbon atoms, such as methoxymethyl, ethoxymethyl, propoxymethyl, butoxymethyl, pentoxymethyl, and the like.

In the present invention, the fluorine-containing cyclic olefin polymer (A) may be a repeating structural unit represented by the general formula (1) individually or a combination of two or more structural units, in which at least one of $R^1$ to $R^4$ of the general formula (1) is different from the others.

Furthermore, in the present invention, specific examples of the fluorine-containing cyclic olefin polymer (A) containing the repeating structural unit represented by the general formula (1) include poly(1-fluoro-2-trifluoromethyl-3,5-cyclopentylene ethylene), poly(1-fluoro-1-trifluoromethyl-3,5-cyclopentylene ethylene),
poly(1-methyl-1-fluoro-2-trifluoromethyl-3,5-cyclopentylene ethylene), poly(1,1-difluoro-2-trifluoromethyl-3,5-cyclopentylene ethylene), poly(1,2-difluoro-2-trifluoromethyl-3,5-cyclopentylene ethylene), poly(1-perfluoroethyl-3,5-cyclopentylene ethylene),
poly(1,1-bis(trifluoromethyl)-3,5-cyclopentylene ethylene),
poly(1,1,2-trifluoro-2-trifluoromethyl-3,5-cyclopentylene ethylene), poly(1,2-bis(trifluoromethyl)-3,5-cyclopentylene ethylene), poly(1-perfluoropropyl-3,5-cyclopentylene ethylene),
poly(1-methyl-2-perfluoropropyl-3,5-cyclopentylene ethylene),
poly(1-butyl-2-perfluoropropyl-3,5-cyclopentylene ethylene),
poly(1-perfluoro-iso-propyl-3,5-cyclopentylene ethylene),
poly(1-methyl-2-perfluoro-iso-propyl-3,5-cyclopentylene ethylene),
poly(1,2-difluoro-1,2-bis(trifluoromethyl)-3,5-cyclopentylene ethylene),
poly(1,1,2,2,3,3,3a,6a-octafluorocyclopentyl-4,6-cyclopentylene ethylene),
poly(1,1,2,2,3,3,4,4,3a,7a-decafluorocyclohexyl-5,7-cyclopentylene ethylene),
poly(1-perfluorobutyl-3,5-cyclopentylene ethylene), poly(1-perfluoro-iso-butyl-3,5-cyclopentylene ethylene),
poly(1-perfluoro-tert-butyl-3,5-cyclopentylene ethylene),
poly(1-methyl-2-perfluoro-iso-butyl-3,5-cyclopentylene ethylene),
poly(1-butyl-2-perfluoro-iso-butyl-3,5-cyclopentylene ethylene),
poly(1,2-difluoro-1-trifluoromethyl-2-perfluoroethyl-3,5-cyclopentylene ethylene),
poly(1-(1-trifluoromethyl-2,2,3,3,4,4,5,5-octafluorocyclopentyl)-3,5-cyclopentylene ethylene),
poly((1,1,2-trifluoro-2-perfluorobutyl)-3,5-cyclopentylene ethylene),
poly(1,2-difluoro-1-trifluoromethyl-2-perfluorobutyl-3,5-cyclopentylene ethylene),
poly(1-fluoro-1-perfluoroethyl-2,2-bis(trifluoromethyl)-3,5-cyclopentylene ethylene),
poly(1,2-difluoro-1-perfluoropropanyl-2-trifluoromethyl-3,5-cyclopentylene ethylene), poly(1-perfluorohexyl-3,5-cyclopentylene ethylene), poly(1-methyl-2-perfluorohexyl-3,5-cyclopentylene ethylene), poly(1-butyl-2-perfluorohexyl-3,5-cyclopentylene ethylene), poly(1-hexyl-2-perfluorohexyl-3,5-cyclopentylene ethylene), poly(1-octyl-2-perfluorohexyl-3,5-cyclopentylene ethylene), poly(1-perfluoroheptyl-3,5-cyclopentylene ethylene),
poly(1-perfluorooctyl-3,5-cyclopentylene ethylene),
poly(1-perfluorodecanyl-3,5-cyclopentylene ethylene),
poly(1,1,2-trifluoro-perfluoropentyl-3,5-cyclopentylene ethylene),
poly(1,2-difluoro-1-trifluoromethyl-2-perfluorobutyl-3,5-cyclopentylene ethylene),
poly(1,1,2-trifluoro-perfluorohexyl-3,5-cyclopentylene ethylene),
poly(1,2-difluoro-1-trifluoromethyl-2-perfluoropentyl-3,5-cyclopentylene ethylene),
poly(1,2-bis(perfluorobutyl)-3,5-cyclopentylene ethylene),
poly(1,2-bis(perfluorohexyl)-3,5-cyclopentylene ethylene),
poly(1-methoxy-2-trifluoromethyl-3,5-cyclopentylene ethylene),
poly(1-tert-butoxymethyl-2-trifluoromethyl-3,5-cyclopentylene ethylene), and
poly(1,1,3,3,3a,6a-hexafluorofuranyl-3,5-cyclopentylene ethylene).

Furthermore, in the present invention, specific examples of the fluorine-containing cyclic olefin polymer (A) containing the repeating structural unit represented by the general formula (1) include poly(1-fluoro-2-trifluoromethyl-3,5-cyclopentylene ethylene), poly(1-fluoro-1-trifluoromethyl-3,5-cyclopentylene ethylene),
poly(1-methyl-1-fluoro-2-trifluoromethyl-3,5-cyclopentylene ethylene), poly(1,1-difluoro-2-trifluoromethyl-3,5-cyclopentylene ethylene), poly(1,2-difluoro-2-trifluoromethyl-3,5-cyclopentylene ethylene), poly(1-perfluoroethyl-3,5-cyclopentylene ethylene),
poly(1,1-bis(trifluoromethyl)-3,5-cyclopentylene ethylene),
poly(1,1,2-trifluoro-2-trifluoromethyl-3,5-cyclopentylene ethylene), poly(1,2-bis(trifluoromethyl)-3,5-cyclopentylene ethylene), poly(1-perfluoropropyl-3,5-cyclopentylene ethylene),
poly(1-methyl-2-perfluoropropyl-3,5-cyclopentylene ethylene),
poly(1-butyl-2-perfluoropropyl-3,5-cyclopentylene ethylene),
poly(1-perfluoro-iso-propyl-3,5-cyclopentylene ethylene),
poly(1-methyl-2-perfluoro-iso-propyl-3,5-cyclopentylene ethylene),
poly(1,2-difluoro-1,2-bis(trifluoromethyl)-3,5-cyclopentylene ethylene),
poly(1,1,2,2,3,3,3a,6a-octafluorocyclopentyl-4,6-cyclopentylene ethylene),
poly(1,1,2,2,3,3,4,4,3a,7a-decafluorocyclohexyl-5,7-cyclopentylene ethylene), poly(1-perfluorobutyl-3,5-cyclopentylene ethylene),
poly(1-perfluoro-iso-butyl-3,5-cyclopentylene ethylene),
poly(1-perfluoro-tert-butyl-3,5-cyclopentylene ethylene),
poly(1-methyl-2-perfluoro-iso-butyl-3,5-cyclopentylene ethylene),
poly(1-butyl-2-perfluoro-iso-butyl-3,5-cyclopentylene ethylene),
poly(1,2-difluoro-1-trifluoromethyl-2-perfluoroethyl-3,5-cyclopentylene ethylene),
poly(1-(1-trifluoromethyl-2,2,3,3,4,4,5,5-octafluorocyclopentyl)-3,5-cyclopentylene ethylene), poly((1,1,2-trifluoro-2-perfluorobutyl)-3,5-cyclopentylene ethylene),
poly(1,2-difluoro-1-trifluoromethyl-2-perfluorobutyl-3,5-cyclopentylene ethylene),
poly(1-fluoro-1-perfluoroethyl-2,2-bis(trifluoromethyl)-3,5-cyclopentylene ethylene),
poly(1,2-difluoro-1-perfluoropropanyl-2-trifluoromethyl)-3,5-cyclopentylene ethylene), poly(1-perfluorohexyl-3,5-cyclopentylene ethylene), poly(1-methyl-2-perfluorohexyl-3,5-cyclopentylene ethylene), poly(1-butyl-2-perfluorohexyl-3,5-cyclopentylene ethylene), poly(1-hexyl-2-perfluorohexyl-3,5-cyclopentylene ethylene), poly(1-octyl-2-perfluorohexyl-3,5-cyclopentylene ethylene), poly(1-perfluoroheptyl-3,5-cyclopentylene ethylene),
poly(1-perfluorooctyl-3,5-cyclopentylene ethylene),
poly(1-perfluorodecanyl-3,5-cyclopentylene ethylene), poly(1,1,2-trifluoro-perfluoropentyl-3,5-cyclopentylene ethylene),
poly(1,2-difluoro-1-trifluoromethyl-2-perfluorobutyl-3,5-cyclopentylene ethylene),
poly(1,1,2-trifluoro-perfluorohexyl-3,5-cyclopentylene ethylene),
poly(1,2-difluoro-1-trifluoromethyl-2-perfluoropentyl-3,5-cyclopentylene ethylene),
poly(1,2-bis(perfluorobutyl)-3,5-cyclopentylene ethylene),
poly(1,2-bis(perfluorohexyl)-3,5-cyclopentylene ethylene),
poly(1-methoxy-2-trifluoromethyl-3,5-cyclopentylene ethylene),
poly(1-tert-butoxymethyl-2-trifluoromethyl-3,5-cyclopentylene ethylene),
poly(1,1,3,3,3a,6a-hexafluorofuranyl-3,5-cyclopentylene ethylene),
poly(1-fluoro-2-trifluoromethoxy-3,5-cyclopentylene ethylene),
poly(1-fluoro-1-trifluoromethoxy-3,5-cyclopentylene ethylene),
poly(1-methyl-1-fluoro-2-trifluoromethoxy-3,5-cyclopentylene ethylene),
poly(1,1-difluoro-2-trifluoromethoxy-3,5-cyclopentylene ethylene),
poly((1,2-difluoro-2-trifluoromethoxy-3,5-cyclopentylene ethylene),
poly(1-perfluoroethoxy-3,5-cyclopentylene ethylene),
poly(1,1-bis(trifluoromethoxy)-3,5-cyclopentylene ethylene),
poly(1,1,2-trifluoro-2-trifluoromethoxy-3,5-cyclopentylene ethylene), poly(1,2-bis(trifluoromethoxy)-3,5-cyclopentylene ethylene), poly(1-perfluoropropoxy-3,5-cyclopentylene ethylene),
poly(1-methyl-2-perfluoropropoxy-3,5-cyclopentylene ethylene),
poly(1-butyl-2-perfluoropropoxy-3,5-cyclopentylene ethylene),
poly(1-perfluoro-iso-propoxy-3,5-cyclopentylene ethylene),
poly(1-methyl-2-perfluoro-iso-propoxy-3,5-cyclopentylene ethylene),
poly(1,2-difluoro-1,2-bis(trifluoromethoxy)-3,5-cyclopentylene ethylene), poly(1-perfluorobutoxy-3,5-cyclopentylene ethylene),
poly(1-perfluoro-iso-butoxy-3,5-cyclopentylene ethylene),
poly(1-perfluoro-tert-butoxy-3,5-cyclopentylene ethylene),
poly(1-methyl-2-perfluoro-iso-butoxy-3,5-cyclopentylene ethylene),
poly(1-butyl-2-perfluoro-iso-butoxy-3,5-cyclopentylene ethylene),
poly(1,2-difluoro-1-trifluoromethoxy-2-perfluoroethoxy-3,5-cyclo pentylene ethylene),
poly((1,1,2-trifluoro-2-perfluorobutoxy)-3,5-cyclopentylene ethylene),
poly(1,2-difluoro-1-trifluoromethoxy-2-perfluorobutoxy-3,5-cyclo pentylene ethylene),
poly(1-fluoro-1-perfluoroethoxy-2,2-bis(trifluoromethoxy)-3,5-cyclopentylene ethylene),
poly(1,2-difluoro-1-perfluoropropoxy-2-trifluoromethoxy-3,5-cyclopentylene ethylene), poly(1-perfluorohethoxy-3,5-cyclopentylene ethylene), poly(1-methyl-2-perfluorohethoxy-3,5-cyclopentylene ethylene), poly(1-butyl-2-perfluorohethoxy-3,5-cyclopentylene ethylene), poly(1-hexyl-2-perfluorohethoxy-3,5-cyclopentylene ethylene), poly(1-octyl-2-perfluorohethoxy-3,5-cyclopentylene ethylene), poly(1-perfluoroheptoxy-3,5-cyclopentylene ethylene),
poly(1-perfluorooctoxy-3,5-cyclopentylene ethylene),
poly(1-perfluorodetoxy-3,5-cyclopentylene ethylene),
poly(1,1,2-trifluoro-perfluoropentoxy-3,5-cyclopentylene ethylene),
poly(1,2-difluoro-1-trifluoromethoxy-2-perfluorobutoxy-3,5-cyclo pentylene ethylene),
poly(1,1,2-trifluoro-2-perfluorohethoxy-3,5-cyclopentylene ethylene),
poly(1,2-difluoro-1-trifluoromethoxy-2-perfluoropentyl-3,5-cyclo pentylene ethylene),
poly(1,2-bis(perfluorobutoxy)-3,5-cyclopentylene ethylene),
poly(1,2-bis(perfluorohethoxy)-3,5-cyclopentylene ethylene),
poly(1-methoxy-2-trifluoromethoxy-3,5-cyclopentylene ethylene),
poly(1-tert-butoxymethyl-2-trifluoromethoxy-3,5-cyclopentylene ethylene), poly(1-(2',2',2',-trifluoroethoxy)-3,5-cyclopentylene ethylene),
poly(1-(2',2',3',3',3'-pentafluoropropoxy)-3,5-cyclopentylene ethylene),
poly(1-methyl-2-(2',2',3',3',3'-pentafluoropropoxy)-3,5-cyclopentylene ethylene),
poly(1-butyl-2-(2',2',3',3',3'-pentafluoropropoxy)-3,5-cyclopentylene ethylene),
poly(1-(1',1',1'-trifluoro-iso-propoxy)-3,5-cyclopentylene ethylene),
poly(1-methyl-(1',1',1'-trifluoro-iso-propoxy)-3,5-cyclopentylene ethylene),
poly(1-(2',2',3',3',4',4',4'-heptafluorobutoxy)-3,5-cyclopentylene ethylene),
poly(1-(1',1',1'-trifluoro-iso-butoxy)-3,5-cyclopentylene ethylene),
poly(1-(1',1',1'-trifluoro-iso-butoxy)-3,5-cyclopentylene ethylene),
poly(1-methyl-2-(1',1',1'-trifluoro-iso-butoxy)-3,5-cyclopentylene ethylene),
poly(1-butyl-2-(1',1',1'-trifluoro-iso-butoxy)-3,5-cyclopentylene ethylene),
poly(1,2-difluoro-1-trifluoromethoxy-2-(2',2',2'-trifluoroethoxy)-3,5-cyclopentylene ethylene),
poly(1,1,2-trifluoro-2-(2',2',3',3',4',4',4'-heptafluorobutoxy)-3,5-cyclopentylene ethylene),
poly(1,2-difluoro-1-trifluoromethoxy-2-(2',2',3',3',4',4',4'-heptafluorobutoxy)-3,5-cyclopentylene ethylene),
poly(1-fluoro-1-(2',2',2',-trifluoroethoxy)-2,2-bis(trifluoromethoxy)-3,5-cyclopentylene ethylene),
poly(1,2-difluoro-1-(2',2',3',3',3'-pentafluoropropoxy)-2-trifluoromethoxy-3,5-cyclopentylene ethylene), poly(1-(2',2',3',3',4',4',5',5',6',6'-undecafluorohethoxy)-3,5-cyclopentylene ethylene),
poly(1-methyl-2-(2',2',3',3',4',4',5',5',6',6'-undecafluorohethoxy)-3,5-cyclopentylene ethylene),
poly(1-butyl-2-(2',2',3',3',4',4',5',5',6',6'-undecafluorohethoxy)-3,5-cyclopentylene ethylene),
poly(1-hexyl-2-(2',2',3',3',4',4',5',5',6',6'-undecafluorohethoxy)-3,5-cyclopentylene ethylene),
poly(1-octyl-2-(2',2',3',3',4',4',5',5',6',6'-undecafluorohethoxy)-3,5-cyclopentylene ethylene),
poly(1-(2',2',3',3',4',4',5',5',6',6',7',7',7'-tridecafluoroheptoxy)-3,5-cyclopentylene ethylene),
poly(1-(2',2',3',3',4',4',5',5',6',6',7',7',8',8',8'-pentadecafluorooctoxy)-3,5-cyclopentylene ethylene),
poly(1-(2',2',3',3',4',4',5',5',6',6',7',7',8',8',9',9',9'-heptadecafluorodecoxy)-3,5-cyclopentylene ethylene),
poly(1,1,2-trifluoro-2-(1',1',1'-trifluoro-iso-propoxy)-3,5-cyclopentylene ethylene),
poly(1,2-difluoro-1-trifluoromethoxy-2-(2',2',3',3',4',4',4'-heptafluorobutoxy)-3,5-cyclopentylene ethylene),
poly(1,1,2-trifluoro-(2',2',3',3',4',4',5',5',6',6'-undecafluorohethoxy)-3,5-cyclopentylene ethylene),
poly(1,2-bis(2',2',3',3',4',4',4'-heptafluorobutoxy)-3,5-cyclopentylene ethylene),
poly(1,2-bis(2',2',3',3',4',4',5',5',6',6'-undecafluorohethoxy)-3,5-cyclopentylene ethylene), and the like.

Furthermore, in the present invention, the fluorine-containing cyclic olefin copolymer having the repeating structural unit [I] represented by the general formula (1) and the repeating structural unit [II] represented by the following general formula (2) has a molar ratio of the structural unit [I] to the structural unit [II] of [I]/[II]=95/5 to 25/75 and a fluorine atom content rate of 40 to 75% by mass. Further, the structural unit [I] does not contain the repeating structural unit represented by the general formula (2).

With such a constitution, the heat resistance of a film is improved while a good releasing property is maintained, and therefore, an imprint product solving a problem of scratching on the film surface can be obtained. With the glass transition temperature which is an index of the heat resistance of the film, by introducing a rigid aliphatic ring structure of the structural unit [II] represented by the general formula (2), the mobility of the polymer decreases under heating, as compared with the structural unit [I] represented by the general formula (1), and thus, the glass transition temperature increases without interfering with the characteristics of the fluorine-containing polymer and the heat resistance of the film can be improved.

Further, in the following description, unless otherwise specified, the fluorine-containing cyclic olefin polymer (A) may include a fluorine-containing cyclic olefin copolymer.

Furthermore, a fluorine-containing cyclic olefin copolymer having the repeating structural unit [I] represented by the general formula (1) and the repeating structural unit [II] represented by the following general formula (2) can solve the problem of the scratching of the film surface by introducing a rigid ring structure of the repeating structural unit [II] to improve the surface hardness such as a pencil hardness. If [I]/[II] is less than 95/5, the effect of improving the heat resistance and the effect of solving the problem of the scratch on the film surface are low, and the molar ratio is preferably [I]/[II]=90/10 to 25/75.

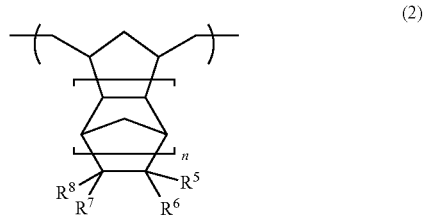

(2)

In the formula (2), at least one of $R^5$ to $R^8$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms. In the case where $R^5$ to $R^8$ are fluorine-free groups, $R^5$ to $R^8$ are selected from hydrogen, alkyl having 1 to 10 carbon atoms, alkoxy having 1 to 10 carbon atoms, and alkoxyalkyl having 2 to 10 carbon atoms. $R^5$ to $R^8$ may be the same as or different from each other. $R^5$ to $R^8$ may be combined with one another to form a ring structure. n represents an integer of 1 or 2.

In the present invention, with the fluorine-containing cyclic olefin polymer, $R^1$ to $R^4$ of the repeating structural unit represented by the general formula (1) and $R^5$ to $R^8$ of the repeating structural unit represented by the general formula (2) may be the same as or different from each other, and the fluorine-containing cyclic olefin polymer may be one including a combination of two or more structural units, in which $R^1$ to $R^4$ or $R^5$ to $R^8$ are different from one another.

In the present invention, specific examples of the fluorine-containing cyclic olefin copolymer containing the repeating structural unit represented by the general formula (2) include
poly(3-fluoro-4-trifluoromethyl-7,9-tricyclo[4.3.0.1$^{2,5}$]decanylene ethylene),
poly(3-fluoro-3-trifluoromethyl-7,9-tricyclo[4.3.0.1$^{2,5}$]decanylene ethylene),
poly(3-methyl-3-fluoro-4-trifluoromethyl-7,9-tricyclo[4.3.0.1$^{2,5}$]decanylene ethylene),
poly(3,3-difluoro-4-trifluoromethyl-7,9-tricyclo[4.3.0.1$^{2,5}$]decanylene ethylene),
poly(3,4-difluoro-4-trifluoromethyl-7,9-tricyclo[4.3.0.1$^{2,5}$]decanylene ethylene),
poly(3-perfluoroethyl-7,9-tricyclo[4.3.0.1$^{2,5}$]decanylene ethylene),
poly(3,3-bis(trifluoromethyl)-7,9-tricyclo[4.3.0.1$^{2,5}$]decanylene ethylene),
poly(3,3,4-trifluoro-4-trifluoromethyl-7,9-tricyclo[4.3.0.1$^{2,5}$]decanylene ethylene),
poly(3,4-bistrifluoromethyl-7,9-tricyclo[4.3.0.1$^{2,5}$]decanylene ethylene),
poly(3-perfluoropropyl-7,9-tricyclo[4.3.0.1$^{2,5}$]decanylene ethylene),
poly(3-methyl-4-perfluoropropyl-7,9-tricyclo[4.3.0.1$^{2,5}$]decanylene ethylene),
poly(3-butyl-4-perfluoropropyl-7,9-tricyclo[4.3.0.1$^{2,5}$]decanylene ethylene),
poly(3-perfluoro-iso-propyl-7,9-tricyclo[4.3.0.1$^{2,5}$]decanylene ethylene),
poly(3-methyl-9-perfluoro-iso-propyl-7,9-tricyclo[4.3.0.1$^{2,5}$]decanylene ethylene),
poly(3,4-difluoro-3,4-bis(trifluoromethyl)-7,9-tricyclo[4.3.0.1$^{2,5}$]decanylene ethylene),
poly(2,3,3,4,4,5,5,6-octafluoro-9,11-tetracyclo[5.5.1.0$^{2,6}$.0$^{8,12}$]tridecanylene ethylene),
poly(2,3,3,4,4,5,5,6,6,7-decafluoro-10,12-tetracyclo[6.5.1.0$^{2,7}$.0$^{9,13}$]tetradecanylene ethylene), poly(3-perfluorobutyl-7,9-tricyclo[4.3.0.1$^{2,5}$]decanylene ethylene),
poly(3-perfluoro-iso-butyl-7,9-tricyclo[4.3.0.1$^{2,5}$]decanylene ethylene),
poly(3-perfluoro-tert-butyl-7,9-tricyclo[4.3.0.1$^{2,5}$]decanylene ethylene),
poly(3-methyl-4-perfluoro-tert-butyl-7,9-tricyclo[4.3.0.1$^{2,5}$]decanylene ethylene),
poly(3-butyl-4-perfluoro-tert-butyl-7,9-tricyclo[4.3.0.1$^{2,5}$]decan ylene ethylene),
poly(3,4-dimethyl-3-perfluoro-tert-butyl-7,9-tricyclo[4.3.0.1$^{2,5}$]decanylene ethylene),
poly(3,3,4-trifluoro-4-perfluorobutyl-7,9-tricyclo[4.3.0.1$^{2,5}$]decanylene ethylene),
poly(3,4-difluoro-3-trifluoromethyl-4-perfluorobutyl-7,9-tricyclo[4.3.0.1$^{2,5}$]decanylene ethylene),
poly(3-fluoro-3-perfluoroethyl-4,4-bis(trifluoromethyl)-7,9-tricyclo[4.3.0.1$^{2,5}$]decanylene ethylene),
poly(3,4-difluoro-3-perfluoropropanyl-4-trifluoromethyl-7,9-tricyclo[4.3.0.1$^{2,5}$]decanylene ethylene),
poly(3-perfluorohexyl-7,9-tricyclo[4.3.0.1$^{2,5}$]decanylene ethylene),
poly(3-methyl-4-perfluorohexyl-7,9-tricyclo[4.3.0.1$^{2,5}$]decanylene ethylene),
poly(3-butyl-4-perfluorohexyl-7,9-tricyclo[4.3.0.1$^{2,5}$]decanylene ethylene),
poly(3-hexyl-4-perfluorohexyl-7,9-tricyclo[4.3.0.1$^{2,5}$]decanylene ethylene),
poly(3-octyl-4-perfluorohexyl-7,9-tricyclo[4.3.0.1$^{2,5}$]decanylene ethylene),
poly(3-perfluoroheptyl-7,9-tricyclo[4.3.0.1$^{2,5}$]decanylene ethylene),
poly(3-perfluorodecanyl-7,9-tricyclo[4.3.0.1$^{2,5}$]decanylene ethylene),
poly(3,3,4-trifluoro-4-perfluoropentyl-7,9-tricyclo[4.3.0.1$^{2,5}$]decanylene ethylene),
poly(3,4-difluoro-3-trifluoromethyl-4-perfluorobutyl-7,9-tricyclo[4.3.0.1$^{2,5}$]decanylene ethylene),
poly(3,3,4-trifluoro-3-perfluorohexyl-7,9-tricyclo[4.3.0.1$^{2,5}$]decanylene ethylene),
poly(3,4-difluoro-3-trifluoromethyl-4-perfluoropentyl-7,9-tricyclo[4.3.0.1$^{2,5}$]decanylene ethylene),
poly(3,4-bis(perfluorobutyl)-7,9-tricyclo[4.3.0.1$^{2,5}$]decanylene ethylene),
poly(3,4-bis(perfluorohexyl)-7,9-tricyclo[4.3.0.1$^{2,5}$]decanylene ethylene),
poly(3-methoxy-4-trifluoromethyl-7,9-tricyclo[4.3.0.1$^{2,5}$]decanylene ethylene),
poly(3-tert-butoxymethyl-4-trifluoromethyl-7,9-tricyclo[4.3.0.1$^{2,5}$]decanylene ethylene),
poly(4-fluoro-5-trifluoromethyl-10,12-pentacyclo[6.5.1.0$^{2,7}$.0$^{9,13}$.1$^{3,6}$]pentadecanylene ethylene),
poly(4-methyl-5-fluoro-5-trifluoromethyl-10,12-pentacyclo[6.5.1.0$^{2,7}$.0$^{9,13}$.1$^{3,6}$]pentadecanylene ethylene),
poly(4,4-difluoro-5-trifluoromethyl-10,12-pentacyclo[6.5.1.0$^{2,7}$.0$^{9,13}$.1$^{3,6}$]pentadecanylene ethylene),
poly(4-perfluoroethyl-10,12-pentacyclo[6.5.1.0$^{2,7}$.0$^{9,13}$.1$^{3,6}$]pentadecanylene ethylene),
poly(4,4-bis(trifluoromethyl)-10,12-pentacyclo[6.5.1.0$^{2,7}$.0$^{9,13}$.1$^{3,6}$]pentadecanylene ethylene),
poly(4,4,5-trifluoro-5-trifluoromethyl-10,12-pentacyclo[6.5.1.0$^{2,7}$.0$^{9,13}$.1$^{3,6}$]pentadecanylene ethylene),
poly(4,5-bis(trifluoromethyl)-10,12-pentacyclo[6.5.1.0$^{2,7}$.0$^{9,13}$.1$^{3,6}$]pentadecanylene ethylene),
poly(4-perfluoropropyl-10,12-pentacyclo[6.5.1.0$^{2,7}$.0$^{9,13}$.1$^{3,6}$]pentadecanylene ethylene),
poly(4-methyl-5-perfluoropropyl-10,12-pentacyclo[6.5.1.0$^{2,7}$.0$^{9,13}$.1$^{3,6}$]pentadecanylene ethylene),
poly(4-methyl-5-perfluoropropyl-10,12-pentacyclo[6.5.1.0$^{2,7}$.0$^{9,13}$.1$^{3,6}$]pentadecanylene ethylene),
poly(4-butyl-5-perfluoropropyl-10,12-pentacyclo[6.5.1.0$^{2,7}$.0$^{9,13}$.1$^{3,6}$]pentadecanylene ethylene),
poly(4-perfluoro-iso-propyl-10,12-pentacyclo[6.5.1.0$^{2,7}$.0$^{9,13}$.1$^{3,6}$]pentadecanylene ethylene),
poly(4-methyl-5-perfluoro-iso-propyl-10,12-pentacyclo[6.5.1.0$^{2,7}$.0$^{9,13}$.1$^{3,6}$]pentadecanylene ethylene),
poly(4,5-difluoro-4,5-bis(trifluoromethyl)-10,12-pentacyclo[6.5.1.0$^{2,7}$.0$^{9,13}$.1$^{3,6}$]pentadecanylene ethylene),
poly(3,4,4,5,5,6,6,7-octafluoro-12,14-hexacyclo[7.7.0.1$^{2,8}$.1$^{10,16}$.0$^{3,7}$.0$^{11,15}$]octadecanylene ethylene),
poly(3,4,4,5,5,6,6,7,7,8-decafluoro-13,15-hexacyclo[8.7.0.1$^{2,9}$1$^{11,17}$.0$^{3,8}$.0$^{12,16}$]nonadecanylene ethylene),
poly(4-perfluorobutyl-10,12-pentacyclo[6.5.1.0$^{2,7}$.0$^{9,13}$.1$^{3,6}$]pentadecanylene ethylene),
poly(4-perfluoro-iso-butyl-10,12-pentacyclo[6.5.1.0$^{2,7}$.0$^{9,13}$.1$^{3,6}$]pentadecanylene ethylene),
poly(4-methyl-5-tert-butyl-10,12-pentacyclo[6.5.1.0$^{2,7}$.0$^{9,13}$.1$^{3,6}$]pentadecanylene ethylene),
poly(4-butyl-5-tert-butyl-10,12-pentacyclo[6.5.1.0$^{2,7}$.0$^{9,13}$.1$^{3,6}$]pentadecanylene ethylene),
poly(4,5-methyl-4-tert-butyl-10,12-pentacyclo[6.5.1.0$^{2,7}$.0$^{9,13}$.1$^{3,6}$]pentadecanylene ethylene),
poly(4,4,5-trifluoro-6-perfluorobutyl-10,12-pentacyclo[6.5.1.0$^{2,7}$.0$^{9,13}$.0$^{3,6}$]pentadecanylene ethylene),
poly(4,6-difluoro-4-trifluoromethyl-5-perfluorobutyl-10,12-pentacyclo[6.5.1.0$^{2,7}$.0$^{9,13}$.1$^{3,6}$]pentadecanylene ethylene),
poly(4-fluoro-4-perfluoroethyl-5,5-bis(trifluoromethyl)-10,12-pentacyclo[6.5.1.0$^{2,7}$.0$^{9,13}$.1$^{3,6}$]pentadecanylene ethylene),
poly(4,5-difluoro-4-perfluoropropanyl-5-trifluoromethyl-10,12-pentacyclo[6.5.1.0$^{2,7}$.0$^{9,13}$.1$^{3,6}$]pentadecanylene ethylene),
poly(4-perfluorohexyl-10,12-pentacyclo[6.5.1.0$^{2,7}$.0$^{9,13}$.1$^{3,6}$]pentadecanylene ethylene),
poly(4-methyl-5-perfluorohexyl-10,12-pentacyclo[6.5.1.0$^{2,7}$.0$^{9,13}$.1$^{3,6}$]pentadecanylene ethylene),
poly(4-butyl-5-perfluorohexyl-10,12-pentacyclo[6.5.1.0$^{2,7}$.0$^{9,13}$.1$^{3,6}$]pentadecanylene ethylene),
poly(4-hexyl-5-perfluorohexyl-10,12-pentacyclo[6.5.1.0$^{2,7}$.0$^{9,13}$.1$^{3,6}$]pentadecanylene ethylene),
poly(4-octyl-5-perfluorohexyl-10,12-pentacyclo[6.5.1.0$^{2,7}$.0$^{9,13}$.1$^{3,6}$]pentadecanylene ethylene),
poly(4-perfluoroheptyl-10,12-pentacyclo[6.5.1.0$^{2,7}$.0$^{9,13}$.1$^{3,6}$]pentadecanylene ethylene),
poly(4-perfluorooctyl-10,12-pentacyclo[6.5.1.0$^{2,7}$.0$^{9,13}$.1$^{3,6}$]pentadecanylene ethylene),
poly(4-perfluorodecanyl-10,12-pentacyclo[6.5.1.0$^{2,7}$.0$^{9,13}$.1$^{3,6}$]pentadecanylene ethylene),
poly(4,4,5-trifluoro-6-perfluoropentyl-10,12-pentacyclo[6.5.1.0$^{2,7}$.0$^{9,13}$.1$^{3,6}$]pentadecanylene ethylene),
poly(4,5-difluoro-4-trifluoromethyl-6-perfluorobutyl-10,12-pentacyclo[6.5.1.0$^{2,7}$.0$^{9,13}$.1$^{3,6}$]pentadecanylene ethylene),
poly(4,4,5-trifluoro-12-perfluorohexyl-10,12-pentacyclo[6.5.1.0$^{2,7}$.0$^{9,13}$.1$^{3,6}$]pentadecanylene ethylene),
poly(4,5-difluoro-4-trifluoromethyl-5-perfluoropentyl-10,12-pentacyclo[6.5.1.0$^{2,7}$.0$^{9,13}$.1$^{3,6}$]pentadecanylene ethylene),
poly(4,4,5-tris(trifluoromethyl)-5-perfluoro-tert-butyl-10,12-pentacyclo[6.5.1.0$^{2,7}$.0$^{9,13}$.1$^{3,6}$]pentadecanylene ethylene), poly(4,5-bis(perfluorohexyl)-10,12-pentacyclo[6.5.1.0$^{2,7}$.0$^{9,13}$.1$^{3,6}$]pentadecanylene ethylene),
poly(4-methoxy-5-trifluoromethyl-10,12-pentacyclo[6.5.1.0$^{2,7}$.0$^{9,13}$.1$^{3,6}$]pentadecanylene ethylene),
poly(3-fluoro-4-trifluoromethoxy-7,9-tricyclo[4.3.0.1$^{2,5}$]decanylene ethylene),
poly(3-fluoro-4-trifluoromethoxy-7,9-tricyclo[4.3.0.1$^{2,5}$]decanylene ethylene),
poly(3-methyl-3-fluoro-4-trifluoromethoxy-7,9-tricyclo[4.3.0.1$^{2,5}$]decanylene ethylene),
poly(3,3-difluoro-4-trifluoromethoxy-7,9-tricyclo[4.3.0.1$^{2,5}$]decanylene ethylene),
poly(3,4-difluoro-4-trifluoromethoxy-7,9-tricyclo[4.3.0.1$^{2,5}$]decanylene ethylene),
poly(3-perfluoroethoxy-7,9-tricyclo[4.3.0.1$^{2,5}$]decanylene ethylene),
poly(3,3,4-trifluoro-4-trifluoromethoxy-7,9-tricyclo[4.3.0.1$^{2,5}$]decanylene ethylene),
poly(3,4-bis(trifluoromethoxy)-7,9-tricyclo[4.3.0.1$^{2,5}$]decanylene ethylene),
poly(3-perfluoropropoxy-7,9-tricyclo[4.3.0.1$^{2,5}$]decanylene ethylene),
poly(3-methyl-4-perfluoropropoxy-7,9-tricyclo[4.3.0.1$^{2,5}$]decanylene ethylene),
poly(3-butyl-4-perfluoropropoxy-7,9-tricyclo[4.3.0.1$^{2,5}$]decanylene ethylene),
poly(3-perfluoro-iso-propoxy-7,9-tricyclo[4.3.0.1$^{2,5}$]decanylene ethylene),
poly(3-methyl-4-perfluoro-iso-propoxy-7,9-tricyclo[4.3.0.1$^{2,5}$]decanylene ethylene),
poly(3,4-difluoro-3,4-bis(trifluoromethoxy)-7,9-tricyclo[4.3.0.1$^{2,5}$]decanylene ethylene),
poly(3-perfluorobutoxy-7,9-tricyclo[4.3.0.1$^{2,5}$]decanylene ethylene),
poly(3-perfluoro-iso-butoxy-7,9-tricyclo[4.3.0.1$^{2,5}$]decanylene ethylene),
poly(3-perfluoro-tert-7,9-tricyclo[4.3.0.1$^{2,5}$]decanylene ethylene),
poly(3-methyl-4-perfluoro-iso-butoxy-7,9-tricyclo[4.3.0.1$^{2,5}$]decanylene ethylene),
poly(3-butyl-4-perfluoro-iso-butoxy-7,9-tricyclo[4.3.0.1$^{2,5}$]decanylene ethylene),
poly(3,4-difluoro-3-trifluoromethoxy-4-perfluoroethoxy-7,9-tricyclo[4.3.0.1$^{2,5}$]decanylene ethylene),
poly((3,3,4-trifluoro-4-perfluorobutoxy)-7,9-tricyclo[4.3.0.1$^{2,5}$]decanylene ethylene),
poly(3,4-difluoro-3-trifluoromethoxy-4-perfluorobutoxy-7,9-tricyclo[4.3.0.1$^{2,5}$]decanylene ethylene),
poly(3-fluoro-3-perfluoroethoxy-2,2-bis(trifluoromethoxy)-7,9-tricyclo[4.3.0.1$^{2,5}$]decanylene ethylene),
poly(3,4-difluoro-3-perfluoropropoxy-4-trifluoromethoxy)-7,9-tricyclo[4.3.0.1$^{2,5}$]decanylene ethylene),
poly(3-perfluorohethoxy-7,9-tricyclo[4.3.0.1$^{2,5}$]decanylene ethylene),
poly(3-methyl-4-perfluorohethoxy-7,9-tricyclo[4.3.0.1$^{2,5}$]decanylene ethylene),
poly(3-butyl-4-perfluorohethoxy-7,9-tricyclo[4.3.0.1$^{2,5}$]decanylene ethylene),
poly(3-hexyl-4-perfluorohethoxy-7,9-tricyclo[4.3.0.1$^{2,5}$]decanylene ethylene),
poly(3-octyl-4-perfluorohethoxy-7,9-tricyclo[4.3.0.1$^{2,5}$]decanylene ethylene),
poly(3-perfluoroheptoxy-7,9-tricyclo[4.3.0.1$^{2,5}$]decanylene ethylene),
poly(3-perfluorooctoxy-7,9-tricyclo[4.3.0.1$^{2,5}$]decanylene ethylene),
poly(3-perfluorodecoxy-7,9-tricyclo[4.3.0.1$^{2,5}$]decanylene ethylene),
poly(3,3,4-trifluoro-perfluoropentoxy-7,9-tricyclo[4.3.0.1$^{2,5}$]decanylene ethylene),
poly(3,4-difluoro-3-trifluoromethoxy-4-perfluorobutoxy-7,9-tricyclo[4.3.0.1$^{2,5}$]decanylene ethylene),
poly(3,3,4-trifluoro-4-perfluorohethoxy-7,9-tricyclo[4.3.0.1$^{2,5}$]decanylene ethylene),
poly(3,4-difluoro-3-trifluoromethoxy-4-perfluoropentyl-7,9-tricyclo[4.3.0.1$^{2,5}$]decanylene ethylene),
poly(3,4-bis(perfluorobutoxy)-7,9-tricyclo[4.3.0.1$^{2,5}$]decanylene ethylene),
poly(3,4-bis(perfluorohethoxy)-7,9-tricyclo[4.3.0.1$^{2,5}$]decanylene ethylene),
poly(3-methoxy-4-trifluoromethoxy-7,9-tricyclo[4.3.0.1$^{2,5}$]decanylene ethylene),
poly(3-tert-butoxymethyl-4-trifluoromethoxy-7,9-tricyclo[4.3.0.1$^{2,5}$]decanylene ethylene),
poly(3-(2',2',2',-trifluoroethoxy)-7,9-tricyclo[4.3.0.1$^{2,5}$]decanylene ethylene),
poly(3-(2',2',3',3',3'-pentafluoropropoxy)-7,9-tricyclo[4.3.0.1$^{2,5}$]decanylene ethylene),
poly(3-methyl-4-(2',2',3',3',3'-pentafluoropropoxy)-7,9-tricyclo[4.3.0.1$^{2,5}$]decanylene ethylene),
poly(3-butyl-4-(2',2',3',3',3'-pentafluoropropoxy)-7,9-tricyclo[4.3.0.1$^{2,5}$]decanylene ethylene),
poly(3-(1',1',1'-trifluoro-iso-propoxy)-7,9-tricyclo[4.3.0.1$^{2,5}$]decanylene ethylene),
poly(3-methyl-(1',1',1'-trifluoro-iso-propoxy)-7,9-tricyclo[4.3.0.1$^{2,5}$]decanylene ethylene),
poly(3-(2',2',3',3',4',4',4'-heptafluorobutoxy)-7,9-tricyclo[4.3.0.1$^{2,5}$]decanylene ethylene),
poly(3-(1',1',1'-trifluoro-iso-butoxy)-7,9-tricyclo[4.3.0.1$^{2,5}$]decanylene ethylene),
poly(3-(1',1',1'-trifluoro-iso-butoxy)-7,9-tricyclo[4.3.0.1$^{2,5}$]decanylene ethylene),
poly(3-methyl-4-(1',1',1'-trifluoro-iso-butoxy)-7,9-tricyclo[4.3.0.1$^{2,5}$]decanylene ethylene),
poly(3-butyl-4-(1',1',1'-trifluoro-iso-butoxy)-7,9-tricyclo[4.3.0.1$^{2,5}$]decanylene ethylene),
poly(3,4-difluoro-3-trifluoromethoxy-4-(2',2',2'-trifluoroethoxy)-7,9-tricyclo[4.3.0.1$^{2,5}$]decanylene ethylene),
poly(3,3,4-trifluoro-4-(2',2',3',3',4',4',4'-heptafluorobutoxy)-7,9-tricyclo[4.3.0.1$^{2,5}$]decanylene ethylene),
poly(3,4-difluoro-3-trifluoromethoxy-4-(2',2',3',3',4',4',4'-heptafluorobutoxy)-7,9-tricyclo[4.3.0.1$^{2,5}$]decanylene ethylene),
poly(3-fluoro-3-(2',2',2',-trifluoroethoxy)-4,4-bis(trifluoromethoxy)-7,9-tricyclo[4.3.0.1$^{2,5}$]decanylene ethylene),
poly(3,4-difluoro-3-(2',2',3',3',3'-pentafluoropropoxy)-4-trifluoromethoxy-7,9-tricyclo[4.3.0.1$^{2,5}$]decanylene ethylene),
poly(3-(2',2',3',3',4',4',5',5',6',6',6'-undecafluorohethoxy)-7,9-tricyclo[4.3.0.1$^{2,5}$]decanylene ethylene),
poly(3-methyl-4-(2',2',3',3',4',4',5',5',6',6',6'-undecafluorohethoxy)-7,9-tricyclo[4.3.0.1$^{2,5}$]decanylene ethylene),
poly(3-butyl-4-(2',2',3',3',4',4',5',5',6',6',6'-undecafluorohethoxy)-7,9-tricyclo[4.3.0.1$^{2,5}$]decanylene ethylene),
poly(3-hexyl-4-(2',2',3',3',4',4',5',5',6',6',6'-undecafluorohethoxy)-7,9-tricyclo[4.3.0.1$^{2,5}$]decanylene ethylene),
poly(3-octyl-4-(2',2',3',3',4',4',5',5',6',6',6'-undecafluorohethoxy)-7,9-tricyclo[4.3.0.1$^{2,5}$]decanylene ethylene),
poly(3-(2',2',3',3',4',4',5',5',6',6',7',7',7'-tridecafluoroheptoxy)-7,9-tricyclo[4.3.0.1$^{2,5}$]decanylene ethylene),
poly(3-(2',2',3',3',4',4',5',5',6',6',7',7',8',8',8'-pentadecafluorooctoxy)-7,9-tricyclo[4.3.0.1$^{2,5}$]decanylene ethylene), poly(3-(2',2',3',3',4',4',5',5',6',6',7',7',8',8',9',9',9'-heptadecafluorodecoxy)-7,9-tricyclo[4.3.0.1$^{2,5}$]decanylene ethylene),
poly(3,3,4-trifluoro-4-(1',1',1'-trifluoro-iso-propoxy)-7,9-tricyclo[4.3.0.1$^{2,5}$]decanylene ethylene),
poly(3,4-difluoro-3-trifluoromethoxy-4-(2',2',3',3',4',4',4'-heptafluorobutoxy)-7,9-tricyclo[4.3.0.1$^{2,5}$]decanylene ethylene),
poly(3,3,4-trifluoro-(2',2',3',3',4',4',5',5',6',6',6'-undecafluorohethoxy)-7,9-tricyclo[4.3.0.1$^{2,5}$]decanylene ethylene),
poly(3,4-bis(2',2',3',3',4',4',4'-heptafluorobutoxy)-7,9-tricyclo[4.3.0.1$^{2,5}$]decanylene ethylene),
poly(3,4-bis(2',2',3',3',4',4',5',5',6',6',6'-undecafluorohethoxy)-7,9-tricyclo[4.3.0.1$^{2,5}$]decanylene ethylene),
poly(4-fluoro-5-trifluoromethoxy-10,12-pentacyclo[6.5.1.0$^{2,7}$.0$^{9,13}$.1$^{3,6}$]pentadecanylene ethylene),
poly(4-fluoro-5-trifluoromethoxy-10,12-pentacyclo[6.5.1.0$^{2,7}$.0$^{9,13}$.1$^{3,6}$]pentadecanylene ethylene),
poly(4-methyl-4-fluoro-5-trifluoromethoxy-10,12-pentacyclo[6.5.1.0$^{2,7}$.0$^{9,13}$.1$^{3,6}$]pentadecanylene ethylene),
poly(4,4-difluoro-5-trifluoromethoxy-10,12-pentacyclo[6.5.1.0$^{2,7}$.0$^{9,13}$.1$^{3,6}$]pentadecanylene ethylene),
poly(4,5-difluoro-5-trifluoromethoxy-10,12-pentacyclo[6.5.1.0$^{2,7}$.0$^{9,13}$.1$^{3,6}$]pentadecanylene ethylene),
poly(4-perfluoroethoxy-7,9-tricyclo[4.3.0.1$^{2,5}$]decanylene ethylene),
poly(4,4,5-trifluoro-5-trifluoromethoxy-10,12-pentacyclo[6.5.1.0$^{2,7}$.0$^{9,13}$.1$^{3,6}$]pentadecanylene ethylene),
poly(4,5-bis(trifluoromethoxy)-10,12-pentacyclo[6.5.1.0$^{2,7}$.0$^{9,13}$.1$^{3,6}$]pentadecanylene ethylene),
poly(4-perfluoropropoxy-10,12-pentacyclo[6.5.1.0$^{2,7}$.0$^{9,13}$.1$^{3,6}$]pentadecanylene ethylene),
poly(4-methyl-5-perfluoropropoxy-10,12-pentacyclo[6.5.1.0$^{2,7}$.0$^{9,13}$.1$^{3,6}$]pentadecanylene ethylene),
poly(4-butyl-5-perfluoropropoxy-10,12-pentacyclo[6.5.1.0$^{2,7}$.0$^{9,13}$.1$^{3,6}$]pentadecanylene ethylene),
poly(4-perfluoro-iso-propoxy-10,12-pentacyclo[6.5.1.0$^{2,7}$.0$^{9,13}$.1$^{3,6}$]pentadecanylene ethylene),
poly(4-methyl-5-perfluoro-iso-propoxy-10,12-pentacyclo[6.5.1.0$^{2,7}$.0$^{9,13}$.1$^{3,6}$]pentadecanylene ethylene),
poly(4,5-difluoro-4,5-bis(trifluoromethoxy)-10,12-pentacyclo[6.5.1.0$^{2,7}$.0$^{9,13}$.1$^{3,6}$]pentadecanylene ethylene),
poly(4-perfluorobutoxy-10,12-pentacyclo[6.5.1.0$^{2,7}$.0$^{9,13}$.1$^{3,6}$]pentadecanylene ethylene),
poly(4-perfluoro-iso-butoxy-10,12-pentacyclo[6.5.1.0$^{2,7}$.0$^{9,13}$.1$^{3,6}$]pentadecanylene ethylene),
poly(4-perfluoro-tert-10,12-pentacyclo[6.5.1.0$^{2,7}$.0$^{9,13}$.1$^{3,6}$]pentadecanylene ethylene),
poly(4-methyl-5-perfluoro-iso-butoxy-10,12-pentacyclo[6.5.1.0$^{2,7}$.0$^{9,13}$.1$^{3,6}$]pentadecanylene ethylene),
poly(4-butyl-5-perfluoro-iso-butoxy-10,12-pentacyclo[6.5.1.0$^{2,7}$.0$^{9,13}$.1$^{3,6}$]pentadecanylene ethylene),
poly(4,5-difluoro-4-trifluoromethoxy-5-perfluoroethoxy-10,12-pentacyclo[6.5.1.0$^{2,7}$.0$^{9,13}$.1$^{3,6}$]pentadecanylene ethylene),
poly((4,4,5-trifluoro-5-perfluorobutoxy)-10,12-pentacyclo[6.5.1.0$^{2,7}$.0$^{9,13}$.1$^{3,6}$]pentadecanylene ethylene),
poly(4,5-difluoro-4-trifluoromethoxy-5-perfluorobutoxy-10,12-pentacyclo[6.5.1.0$^{2,7}$.0$^{9,13}$.1$^{3,6}$]pentadecanylene ethylene),
poly(4-fluoro-4-perfluoroethoxy-5,5-bis(trifluoromethoxy)-10,12-pentacyclo[6.5.1.0$^{2,7}$.0$^{9,13}$.1$^{3,6}$]pentadecanylene ethylene),
poly(4,5-difluoro-4-perfluoropropoxy-5-trifluoromethoxy-10,12-pentacyclo[6.5.1.0$^{2,7}$.0$^{9,13}$.1$^{3,6}$]pentadecanylene ethylene),
poly(4-perfluorohethoxy-10,12-pentacyclo[6.5.1.0$^{2,7}$.0$^{9,13}$.1$^{3,6}$]pentadecanylene ethylene),
poly(4-methyl-5-perfluorohethoxy-10,12-pentacyclo[6.5.1.0$^{2,7}$.0$^{9,13}$.1$^{3,6}$]pentadecanylene ethylene),
poly(4-butyl-5-perfluorohethoxy-10,12-pentacyclo[6.5.1.0$^{2,7}$.0$^{9,13}$.1$^{3,6}$]pentadecanylene ethylene),
poly(4-hexyl-5-perfluorohethoxy-10,12-pentacyclo[6.5.1.0$^{2,7}$.0$^{9,13}$.1$^{3,6}$]pentadecanylene ethylene),
poly(4-octyl-5-perfluorohethoxy-10,12-pentacyclo[6.5.1.0$^{2,7}$.0$^{9,13}$.1$^{3,6}$]pentadecanylene ethylene),
poly(4-perfluoroheptoxy-10,12-pentacyclo[6.5.1.0$^{2,7}$.0$^{9,13}$.1$^{3,6}$]pentadecanylene ethylene),
poly(4-perfluorooctoxy-10,12-pentacyclo[6.5.1.0$^{2,7}$.0$^{9,13}$.1$^{3,6}$]pentadecanylene ethylene),
poly(4-perfluorodecoxy-10,12-pentacyclo[6.5.1.0$^{2,7}$.0$^{9,13}$.1$^{3,6}$]pentadecanylene ethylene),
poly(4,4,5-trifluoroperfluoro-pentoxy-10,12-pentacyclo[6.5.1.0$^{2,7}$.0$^{9,13}$.1$^{3,6}$]pentadecanylene ethylene),
poly(4,5-difluoro-4-trifluoromethoxy-5-perfluorobutoxy-10,12-pentacyclo[6.5.1.0$^{2,7}$.0$^{9,13}$.1$^{3,6}$]pentadecanylene ethylene),
poly(4,4,5-trifluoro-5-perfluorohethoxy-10,12-pentacyclo[6.5.1.0$^{2,7}$.0$^{9,13}$.1$^{3,6}$]pentadecanylene ethylene),
poly(4,5-difluoro-4-trifluoromethoxy-5-perfluoropentyl-10,12-pentacyclo[6.5.1.0$^{2,7}$.0$^{9,13}$.1$^{3,6}$]pentadecanylene ethylene),
poly(4,5-bis(perfluorobutoxy)-10,12-pentacyclo[6.5.1.0$^{2,7}$.0$^{9,13}$.1$^{3,6}$]pentadecanylene ethylene),
poly(4,5-bis(perfluorohethoxy)-10,12-pentacyclo[6.5.1.0$^{2,7}$.0$^{9,13}$.1$^{3,6}$]pentadecanylene ethylene),
poly(4-methoxy-5-trifluoromethoxy-10,12-pentacyclo[6.5.1.0$^{2,7}$.0$^{9,13}$.1$^{3,6}$]pentadecanylene ethylene), poly(4-tert-butoxymethyl 5-trifluoromethoxy-10,12-pentacyclo[6.5.1.0$^{2,7}$.0$^{9,13}$.1$^{3,6}$]pentadecanylene ethylene),
poly(4-(2',2',2',-trifluoroethoxy)-10,12-pentacyclo[6.5.1.0$^{2,7}$.0$^{9,13}$.1$^{3,6}$]pentadecanylene ethylene),
poly(4-(2',2',3',3',3'-pentafluoropropoxy)-10,12-pentacyclo[6.5.1.0$^{2,7}$.0$^{9,13}$.1$^{3,6}$]pentadecanylene ethylene),
poly(4-methyl-5-(2',2',3',3',3'-pentafluoropropoxy)-10,12-pentacyclo[6.5.1.0$^{2,7}$.0$^{9,13}$.1$^{3,6}$]pentadecanylene ethylene),
poly(4-butyl-5-(2',2',3',3',3'-pentafluoropropoxy)-10,12-pentacyclo[6.5.1.0$^{2,7}$.0$^{9,13}$.1$^{3,6}$]pentadecanylene ethylene),
poly(4-(1',1',1'-trifluoro-iso-propoxy)-10,12-pentacyclo[6.5.1.0$^{2,7}$.0$^{9,13}$.1$^{3,6}$]pentadecanylene ethylene),
poly(4-methyl-(1',1',1'-trifluoro-iso-propoxy)-10,12-pentacyclo[6.5.1.0$^{2,7}$.0$^{9,13}$.1$^{3,6}$]pentadecanylene ethylene),
poly(4-(2',2',3',3',4',4',4'-heptafluorobutoxy)-10,12-pentacyclo[6.5.1.0$^{2,7}$.0$^{9,13}$.1$^{3,6}$]pentadecanylene ethylene),
poly(4-(1',1',1'-trifluoro-iso-butoxy)-10,12-pentacyclo[6.5.1.0$^{2,7}$.0$^{9,13}$.1$^{3,6}$]pentadecanylene ethylene),
poly(4-(1',1',1'-trifluoro-iso-butoxy)-10,12-pentacyclo[6.5.1.0$^{2,7}$.0$^{9,13}$.1$^{3,6}$]pentadecanylene ethylene),
poly(4-methyl-5-(1',1',1'-trifluoro-iso-butoxy)-10,12-pentacyclo[6.5.1.0$^{2,7}$.0$^{9,13}$.1$^{3,6}$]pentadecanylene ethylene),
poly(4-butyl-5-(1',1',1'-trifluoro-iso-butoxy)-10,12-pentacyclo[6.5.1.0$^{2,7}$.0$^{9,13}$.1$^{3,6}$]pentadecanylene ethylene),
poly(4,5-difluoro-4-trifluoromethoxy-5-(2',2',2'-trifluoroethoxy)-10,12-pentacyclo[6.5.1.0$^{2,7}$.0$^{9,13}$.1$^{3,6}$]pentadecanylene ethylene),
poly(4,4,5-trifluoro-5-(2',2',3',3',4',4',4'-heptafluorobutoxy)-10,12-pentacyclo[6.5.1.0$^{2,7}$.0$^{9,13}$.1$^{3,6}$]pentadecanylene ethylene),
poly(4,5-difluoro-4-trifluoromethoxy-4-(2',2',3',3',4',4',4'-heptafluorobutoxy)-10,12-pentacyclo[6.5.1.0$^{2,7}$.0$^{9,13}$.1$^{3,6}$]pentadecanylene ethylene), poly(4-fluoro-4-(2',2',2',-trifluoroethoxy)-5,5-bis(trifluoromethoxy)-10,12-pentacyclo[6.5.1.0$^{2,7}$.0$^{9,13}$.1$^{3,6}$]pentadecanylene ethylene),
poly(4,5-difluoro-4-(2',2',3',3',3'-pentafluoropropoxy)-5-trifluoromethoxy)-10,12-pentacyclo[6.5.1.0$^{2,7}$.0$^{9,13}$.1$^{3,6}$]pentadecanylene ethylene),
poly(4-(2',2',3',3',4',4',5',5',6',6'-undecafluorohethoxy)-10,12-pentacyclo[6.5.1.0$^{2,7}$.0$^{9,13}$.1$^{3,6}$]pentadecanylene ethylene),
poly(4-methyl-5-(2',2',3',3',4',4',5',5',6',6'-undecafluorohethoxy)-10,12-pentacyclo[6.5.1.0$^{2,7}$.0$^{9,13}$.1$^{3,6}$]pentadecanylene ethylene),
poly(4-butyl-5-(2',2',3',3',4',4',5',5',6',6'-undecafluorohethoxy)-10,12-pentacyclo[6.5.1.0$^{2,7}$.0$^{9,13}$.1$^{3,6}$]pentadecanylene ethylene),
poly(4-hexyl-5-(2',2',3',3',4',4',5',5',6',6'-undecafluorohethoxy)-10,12-pentacyclo[6.5.1.0$^{2,7}$.0$^{9,13}$.1$^{3,6}$]pentadecanylene ethylene),
poly(4-octyl-5-(2',2',3',3',4',4',5',5',6',6'-undecafluorohethoxy)-10,12-pentacyclo[6.5.1.0$^{2,7}$.0$^{9,13}$.1$^{3,6}$]pentadecanylene ethylene),
poly(4-(2',2',3',3',4',4',5',5',6',6',7',7',7'-tridecafluoroheptoxy)-10,12-pentacyclo[6.5.1.0$^{2,7}$.0$^{9,13}$.1$^{3,6}$]pentadecanylene ethylene),
poly(4-(2',2',3',3',4',4',5',5',6',6',7',7',8',8',8'-pentadecafluorooctoxy)-10,12-pentacyclo[6.5.1.0$^{2,7}$.0$^{9,13}$.1$^{3,6}$]pentadecanylene ethylene),
poly(4-(2',2',3',3',4',4',5',5',6',6',7',7',8',8',9',9',9'-heptadecafluorodecoxy-10,12-pentacyclo[6.5.1.0$^{2,7}$.0$^{9,13}$.1$^{3,6}$]pentadecanylene ethylene),
poly(4,4,5-trifluoro-5-(1',1',1'-trifluoro-iso-propoxy)-10,12-pentacyclo[6.5.1.0$^{2,7}$.0$^{9,13}$.1$^{3,6}$]pentadecanylene ethylene),
poly(4,5-difluoro-4-trifluoromethoxy-5-(2',2',3',3',4',4',4'-heptafluorobutoxy)-10,12-pentacyclo[6.5.1.0$^{2,7}$.0$^{9,13}$.1$^{3,6}$]pentadecanylene ethylene),
poly(4,4,5-trifluoro-(2',2',3',3',4',4',5',5',6',6'-undecafluorohethoxy)-10,12-pentacyclo[6.5.1.0$^{2,7}$.0$^{9,13}$.1$^{3,6}$]pentadecanylene ethylene),
poly(4,5-bis(2',2',3',3',4',4',4'-heptafluorobutoxy)-10,12-pentacyclo[6.5.1.0$^{2,7}$.0$^{9,13}$.1$^{3,6}$]pentadecanylene ethylene),
poly(4,5-bis(2',2',3',3',4',4',5',5',6',6'-undecafluorohethoxy)-10,12-pentacyclo[6.5.1.0$^{2,7}$.0$^{9,13}$.1$^{3,6}$]pentadecanylene ethylene), and the like.

Furthermore, within a range which does not impair the effect of the present invention, in addition to the repeating structural units represented by the general formulae (1) and (2), other repeating structural units may be contained with a fluorine atom content rate in the range from 40 to 75% by mass, but the repeating structural unit of the general formula (1) or the general formula (1) or (2) is usually from 30 to 100% by mass, preferably from 70 to 100% by mass, and more preferably from 90 to 100% by mass.

Furthermore, in the present invention, the fluorine-containing cyclic olefin polymer (A) containing the repeating structural unit represented by the general formula (1) preferably has a storage modulus or loss modulus by the measurement of a dynamic mechanical analysis by tensile mode (a frequency of 1 Hz and a temperature increase rate of 3° C./minute) having a variable region in the range from −1 to 0 MPa/° C. with respect to a temperature varying in the temperature region of the glass transition temperature or higher. The characteristics are induced from formation of hydrogen bonds between the polymers or in the molecule of the polymer by incorporating the main chain of the repeating structural unit with a hydrocarbon structure and by incorporating the side chain of the repeating structural unit with a substituent selected from fluorine, fluorine-containing alkyl, fluorine-containing alkoxy having 1 to 10 carbon atoms, and fluorine-containing alkoxyalkyl having 2 to 10 carbon atoms, as at least one of $R^1$ to $R^4$, not from crystallinity or crosslink due to chemical bonds. By the hydrogen bonds generated by such a specific structure, the change in the storage modulus or loss modulus with respect to the change in the temperature in the temperature region of the glass transition temperature or higher has a flat region ranging from −1 to 0 MPa/° C., preferably from −0.5 to 0 MPa/° C., and more preferably from −0.2 to 0 MPa/° C.

Moreover, in the present invention, the fluorine-containing cyclic olefin copolymer containing the repeating structural unit [I] represented by the general formula (1) and the repeating structural unit [II] represented by the general formula (2) has a molar ratio of the structural unit [I] to the structural unit [II] of [I]/[II]=95/5 to 25/75. Further, the structural unit [I] does not contain the repeating structural unit represented by the general formula (2).

As described above, the change in the storage modulus or loss modulus has a flat region, which is induced from formation of hydrogen bonds between the polymers or in the molecule of the polymer by incorporating the main chain of the repeating structural unit with a hydrocarbon structure or by incorporating the side chain of the repeating structural unit with a substituent selected from fluorine, fluorine-containing alkyl, fluorine-containing alkoxy having 1 to 10 carbon atoms, and fluorine-containing alkoxyalkyl having 2 to 10 carbon atoms, as at least one of $R^1$ to $R^4$ and $R^5$ to $R^8$. By the hydrogen bonds generated by such a specific structure, the change in the storage modulus or loss modulus with respect to the change in the temperature in the temperature region of the glass transition temperature or higher has a flat region ranging from −1 to 0 MPa/° C. If the molar ratio is more than 25/75, the flat variable region of the storage modulus or the loss modulus is lost, and thus, the effect due to the hydrogen bond is not exhibited.

The fluorine-containing cyclic olefin polymer and the fluorine-containing cyclic olefin copolymer of the present invention are amorphous transparent polymers.

Generally, in the case where the amorphous thermoplastic polymer does not have such a hydrogen bond or chemical crosslinking present therein, it shows a drastically lowered modulus in the temperature region of the glass transition temperature or higher, and a change in the storage modulus or loss modulus with respect to the change in the temperature of at least −10 MPa/° C. or less. On the other hand, the above-described characteristics of the fluorine-containing cyclic olefin polymer (A) of the present invention are derived from reversible interactions between the physical hydrogen bonds with respect to the change in the temperature.

Moreover, in the present invention, the fluorine-containing cyclic olefin polymer containing the repeating structural unit represented by the general formula (1), or the fluorine-containing cyclic olefin copolymer containing the repeating structural units represented by the general formulae (1) and (2) preferably has the above-described flat variable region of the storage modulus or the loss modulus in a region of the storage modulus or the loss modulus of 0.1 MPa or more, more preferably 0.1 to 10000 MPa, and even more preferably 0.1 to 1000 MPa, in the temperature region of the glass transition temperature or higher, in the measurement of a dynamic mechanical analysis by tensile mode (frequency 1 Hz, temperature increase rate of 3° C./minute). With 0.1 MPa or more, the shape of an imprint product can be maintained, the shrinkage change during cooling is small, and the dimensional precision of the transcription improves in the heating and cooling processes in the step of production of the imprint product.

In this regard, the change in the modulus and shrinkage rate in the heating and cooling processes in the step of production of the nanoimprint film by solution-coating, heating, and drying, or heating and pressing is inhibited to a minimal degree and optimized, and as a result, an imprint product having a fine pattern transcribed over its surface with high dimensional precision can be formed. Further, incorporation of fluorine makes it possible to produce a film having a small surface tension and an excellent releasing property from a mold. Particularly, a nanoimprint method by solution-coating, heating, and drying is suitable for production of an imprint product having a high degree of freedom of the film thickness and a large area.

In the present invention, the glass transition temperature is a maximum value of the loss modulus/the storage modulus (=tan δ) obtained by measuring the dynamic mechanical change with a constant rise or fall of the temperature of a sample, or it includes a change point obtained by endothermic or exothermic measurement by means of differential scanning calorimetry, and the like.

The glass transition temperature is usually in the range from 30 to 250° C., preferably from 50 to 200° C., and more preferably from 60 to 160° C. If the glass transition temperature is 30° C. or higher, it is easy to maintain the imprint product shape with high precision, that is a pattern shape molded after releasing, whereas if the glass transition temperature is 250° C. or lower, the heating treatment temperature can be lowered to perform melt-fluidizing, and thus, yellowing or deterioration of a support does not easily occur.

In the present invention, the fluorine atom content rate in the fluorine-containing cyclic olefin polymer containing the repeating structural unit represented by the general formula (1), and, the fluorine-containing cyclic olefin copolymer containing the repeating structural units represented by the general formulae (1) and (2) can be determined by the following equation (1).

$$\text{Content rate of fluorine atoms(\% by mass)} = (Fn \times 19) \times 100 / Fw \quad (1)$$

In equation (1), Fn represents the number of fluorine atoms in consideration of its molar proportion in the structural unit represented by the general formula (1) and the repeating structural unit represented by the general formula (2), Fw represents a formula weight in consideration of its molar proportion in the repeating structural unit represented by the general formula (1) and the repeating structural unit represented by the general formula (2), and the fluorine atom content rate is 40 to 75% by mass, and preferably 42 to 68% by mass. If the fluorine atom content rate is less than 40% by mass, the flat variable region of the storage modulus or the loss modulus is small or not shown, and the effect due to the hydrogen bonds is not exerted, whereas if the fluorine atom content rate is more than 75% by mass, the number of hydrogen atoms in the structural unit is small, and similarly, the effect due to the hydrogen bonds is not exerted.

In the present invention, the fluorine-containing cyclic olefin polymer or fluorine-containing cyclic olefin copolymer has a weight average molecular weight (Mw) in terms of polystyrene, as measured by means of gel permeation chromatography (GPC), with a sample concentration of 3.0 to 9.0 mg/ml of usually 5,000 to 1,000,000, and preferably 10,000 to 300,000. If this weight average molecular weight (Mw) is 5,000 or more, it is possible to exert physical properties having a region in which the change of the storage modulus or loss modulus with respect to the change in the temperature is from −1 to 0 MPa/° C.

In addition, if this weight average molecular weight (Mw) is 1,000,000 or less, the solvent solubility or the fluidity during heating and pressing molding is good. Further, the ratio of the weight average molecular weight (Mw) to the average molecular weight (Mn), that is, the molecular weight distribution (Mw/Mn) is usually in the range from 1.0 to 5.0.

For example, in order to form a coating film having uniform thickness and obtain a good heating molding property, a wide molecular weight distribution is preferred, and it is more preferably from 1.4 to 5.0, or from 1.5 to 3.0.

In the fluorine-containing cyclic olefin polymer (A) of the present invention, by incorporating specific structures represented by the general formula (1) and the general formula (2), an extremely low refractive index with respect to D-rays can be obtained.

The refractive index with respect to light having a wavelength of D-rays is usually from 1.48 or less, and preferably from 1.30 to 1.48, and in this range of the refractive index, light shows superior linearity. For this reason, the light transmittance in the visible light region is preferably 80% or more, and more preferably from 85 to 100%.

Furthermore, the fluorine-containing cyclic olefin polymer or the fluorine-containing cyclic olefin copolymer of the present invention has a mass decrease ratio of usually less than 0.1%, and preferably less than 0.07% when heated at 300° C. for 5 minutes, and its thermoplasticity and thermal stability are excellent, thus making it possible to heating and pressing molding.

In the present invention, the fluorine-containing cyclic olefin polymer (A) can be synthesized by polymerizing the fluorine-containing cyclic olefin monomer represented by the general formula (3) with a ring-opening metathesis polymerization catalyst, and hydrogenating an olefin portion in the main chain of the resulting polymer.

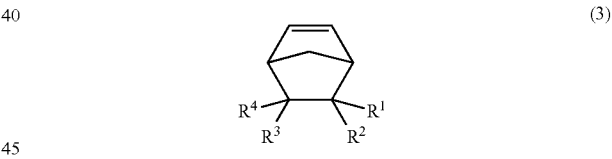

In the formula (3), at least one of $R^1$ to $R^4$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms. In the case where $R^1$ to $R^4$ are fluorine-free groups, $R^1$ to $R^4$ are selected from hydrogen, alkyl having 1 to 10 carbon atoms, alkoxy having 1 to 10 carbon atoms, and alkoxyalkyl having 2 to 10 carbon atoms. $R^1$ to $R^4$ may be the same as or different from each other. $R^1$ to $R^4$ may be combined with one another to form a ring structure.

More specifically, in the general formula (3), examples of $R^1$ to $R^4$ include fluorine; or alkyl having 1 to 10 carbon atoms, in which apart or all of hydrogen atoms of the alkyl group is (are) substituted with fluorine atom(s), such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methylisopropyl, perfluoro-2-methylisopropyl, n-perfluorobutyl, n-perfluoropentyl, perfluorocyclopentyl; alkoxy having 1 to 10 carbon atoms in which a part or all of hydrogen atoms of the alkoxy group is (are) substituted with fluorine atom(s), such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methylisopropoxy, perfluoro-2-methylisopropoxy, n-perfluorobutoxy, n-perfluoropentoxy, perfluorocyclopentoxy; and alkoxyalkyl having 2 to 10 carbon atoms in which a part or all of hydrogen atoms of the alkoxy group is (are) substituted with fluorine atom(s), such as fluoromethoxymethyl, difluoromethoxymethyl, trifluoromethoxymethyl, trifluoroethoxymethyl, pentafluoroethoxymethyl, heptafluoropropoxymethyl, hexafluoroisopropoxymethyl, heptafluoroisopropoxymethyl, hexafluoro-2-methylisopropoxymethyl, perfluoro-2-methylisopropoxymethyl, n-perfluorobutoxymethyl, n-perfluoropentoxymethyl, perfluorocyclopentoxymethyl, and the like.

Furthermore, $R^1$ to $R^4$ may be combined with one another to form a ring structure or to form a ring such as perfluorocycloalkyl, perfluorocycloether, which is formed through oxygen.

Furthermore, examples of other $R^1$ to $R^4$ containing no fluorine include hydrogen, or alkyl having 1 to 10 carbon atoms, for example, alkyl such as methyl, ethyl, propyl, isopropyl, 2-methylisopropyl, n-butyl, n-pentyl, cyclopentyl; alkoxy having 1 to 10 carbon atoms, such as methoxy, ethoxy, propoxy, butoxy, pentoxy; and alkoxyalkyl having 2 to 10 carbon atoms, such as methoxymethyl, ethoxymethyl, propoxymethyl, butoxymethyl, pentoxymethyl.

Moreover, in the present invention, the monomer used for the production of the fluorine-containing cyclic olefin polymer (A) may be a fluorine-containing cyclic olefin monomer represented by the general formula (3) individually or a combination of two or more structural units, in which at least one of $R^1$ to $R^4$ of the general formula (1) is different from the others.

Furthermore, in the present invention, the monomer used for the production of the fluorine-containing cyclic olefin copolymer may be copolymerized with the fluorine-containing cyclic olefin comonomer represented by the general formula (4).

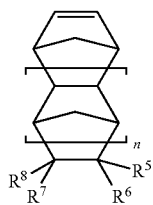

(4)

In the formula (4), at least one of $R^5$ to $R^8$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms. In the case where $R^5$ to $R^8$ are fluorine-free groups, $R^5$ to $R^8$ are selected from hydrogen, alkyl having 1 to 10 carbon atoms, alkoxy having 1 to 10 carbon atoms, and alkoxyalkyl having 2 to 10 carbon atoms. $R^5$ to $R^8$ may be the same as or different from each other. $R^5$ to $R^8$ may be combined with one another to form a ring structure. n represents an integer of 1 or 2.

More specifically, in the general formula (4), examples of $R^5$ to $R^8$ include fluorine; or alkyl having 1 to 10 carbon atoms in which apart or all of hydrogen atoms of the alkyl group is (are) substituted with fluorine atom(s), such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methylisopropyl, perfluoro-2-methylisopropyl, n-perfluorobutyl, n-perfluoropentyl, perfluorocyclopentyl; alkoxy having 1 to 10 carbon atoms in which a part or all of hydrogen atoms of the alkoxy group is (are) substituted with fluorine atom(s), such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methylisopropoxy, perfluoro-2-methylisopropoxy, n-perfluorobutoxy, n-perfluoropentoxy, perfluorocyclopentoxy; and alkoxyalkyl having 2 to 10 carbon atoms in which a part or all of hydrogen atoms of the alkoxy group is (are) substituted with fluorine atom(s), such as fluoromethoxymethyl, difluoromethoxymethyl, trifluoromethoxymethyl, trifluoroethoxymethyl, pentafluoroethoxymethyl, heptafluoropropoxymethyl, hexafluoroisopropoxymethyl, heptafluoroisopropoxymethyl, hexafluoro-2-methylisopropoxymethyl, perfluoro-2-methylisopropoxymethyl, n-perfluorobutoxymethyl, n-perfluoropentoxymethyl, perfluorocyclopentoxymethyl, and the like.

Furthermore, $R^5$ to $R^8$ may be combined with one another to form a ring structure or to form a ring such as perfluorocycloalkyl, perfluorocycloether, which is formed through oxygen, and the like.

Furthermore, examples of other $R^5$ to $R^8$ containing no fluorine include hydrogen, or alkyl having 1 to 10 carbon atoms, for example, alkyl such as methyl, ethyl, propyl, isopropyl, 2-methylisopropyl, n-butyl, n-pentyl, cyclopentyl, alkoxy having 1 to 10 carbon atoms, such as methoxy, ethoxy, propoxy, butoxy, pentoxy, and alkoxyalkyl having 2 to 10 carbon atoms, such as methoxymethyl, ethoxymethyl, propoxymethyl, butoxymethyl, pentoxymethyl.

Furthermore, in the present invention, the monomer used for the production of the fluorine-containing cyclic olefin copolymer may be a fluorine-containing cyclic olefin monomer represented by the general formula (4) individually or a combination of two or more structural units, in which at least one of $R^5$ to $R^8$ is different from the others.

The ring-opening metathesis polymerization catalyst used for the polymerization of fluorine-containing cyclic olefin monomer is not limited as long as it can perform ring-opening metathesis polymerization, but examples thereof include tungsten-based alkylidene catalysts such as $W(N-2,6-Pr^i_2C_6H_3)(CHBu^t)(OBu^t)_2$.

$W(N-2,6-Pr^i_2C_6H_3)(CHBu^t)(OCMe_2CF_3)_2$,
$W(N-2,6-Pr^i_2C_6H_3)(CHBu^t)(OCMe(CF_3)_2)_2$,
$W(N-2,6-Pr^i_2C_6H_3)(CHBu^t)(OC(CF_3)_3)_2$,
$W(N-2,6-(Me)_2C_6H_3)(CHBu^t)(OC(CF_3)_3)_2$,
$W(N-2,6-Pr^i_2C_6H_3)(CHCMe_2Ph)(OBu^t)_2$,
$W(N-2,6-Pr^i_2C_6H_3)(CHCMe_2Ph)(OCMe_2CF_3)_2$,
$W(N-2,6-Pr^i_2C_6H_3)(CHCMe_2Ph)(OCMe(CF_3)_2)_2$,
$W(N-2,6-Pr^i_2C_6H_3)(CHCMe_2Ph)(OC(CF_3)_3)_2$,
$W(N-2,6-Me_2C_6H_3)(CHCMe_2Ph)(OC(CF_3)_3)_2$, or
$W(N-2,6-Me_2C_6H_3)(CHCHCMePh)(OBu^t)_2(PR_3)$,
$W(N-2,6-Me_2C_6H_3)(CHCHCMe_2)(OBu^t)_2(PR_3)$,
$W(N-2,6-Me_2C_6H_3)(CHCHCPh_2)(OBu^t)_2(PR_3)$,
$W(N-2,6-Me_2C_6H_3)(CHCHCMePh)(OCMe_2(CF_3)_2)_2(PR_3)$,
$W(N-2,6-Me_2C_6H_3)(CHCHCMe_2)(OCMe_2(CF_3)_2)_2(PR_3)$,
$W(N-2,6-Me_2C_6H_3)(CHCHCPh_2)(OCMe_2(CF_3)_2)_2(PR_3)$,
$W(N-2,6-Me_2C_6H_3)(CHCHCMePh)(OCMe(CF_3)_2)_2(PR_3)$,
$W(N-2,6-Me_2C_6H_3)(CHCHCMe_2)(OCMe(CF_3)_2)_2(PR_3)$,
$W(N-2,6-Me_2C_6H_3)(CHCHCPh_2)(OCMe(CF_3)_2)_2(PR_3)$,
$W(N-2,6-Me_2C_6H_3)(CHCHCMePh)(OC(CF_3)_3)_2(PR_3)$,
$W(N-2,6-Me_2C_6H_3)(CHCHCMe_2)(OC(CF_3)_3)_2(PR_3)$,
$W(N-2,6-Me_2C_6H_3)(CHCHCPh_2)(OC(CF_3)_3)_2(PR_3)$,
$W(N-2,6-Pr^i_2C_6H_3)(CHCHCMePh)(OCMe_2(CF_3)_2)_2(PR_3)$,
$W(N-2,6-Pr^i_2C_6H_3)(CHCHCMePh)(OCMe(CF_3)_2)_2(PR_3)$,

W(N-2,6-Pr$^i_2$C$_6$H$_3$)(CHCHCMePh)(OC(CF$_3$)$_3$)$_2$(PR$_3$),
W(N-2,6-Pr$^i_2$C$_6$H$_3$)(CHCHCMePh)(OPh)$_2$(PR$_3$), or
W(N-2,6-Me$_2$C$_6$H$_3$)(CHCHCMePh)(OBu$^t$)$_2$(Py),
W(N-2,6-Me$_2$C$_6$H$_3$)(CHCHCMe$_2$)(OBu$^t$)$_2$ (Py),
W(N-2,6-Me$_2$C$_6$H$_3$)(CHCHCPh$_2$)(OBu$^t$)$_2$(Py),
W(N-2,6-Me$_2$C$_6$H$_3$)(CHCHCMePh)(OCMe$_2$(CF$_3$)$_2$)$_2$ (Py),
W(N-2,6-Me$_2$C$_6$H$_3$)(CHCHCMe$_2$)(OCMe$_2$(CF$_3$)$_2$)$_2$(Py),
W(N-2,6-Me$_2$C$_6$H$_3$)(CHCHCPh$_2$)(OCMe$_2$(CF$_3$)$_2$)$_2$(Py),
W(N-2,6-Me$_2$C$_6$H$_3$)(CHCHCMePh)(OCMe(CF$_3$)$_2$)$_2$ (Py),
W(N-2,6-Me$_2$C$_6$H$_3$)(CHCHCMe$_2$)(OCMe(CF$_3$)$_2$)$_2$(Py),
W(N-2,6-Me$_2$C$_6$H$_3$)(CHCHCPh$_2$)(OCMe(CF$_3$)$_2$)$_2$(Py),
W(N-2,6-Me$_2$C$_6$H$_3$)(CHCHCMePh)(OC(CF$_3$)$_3$)$_2$(Py),
W(N-2,6-Me$_2$C$_6$H$_3$)(CHCHCMe$_2$)(OC(CF$_3$)$_3$)$_2$(Py),
W(N-2,6-Me$_2$C$_6$H$_3$)(CHCHCPh$_2$)(OC(CF$_3$)$_3$)$_2$(Py),
W(N-2,6-Pr$^i_2$C$_6$H$_3$)(CHCHCMePh)(OCMe$_2$(CF$_3$))$_2$(Py),
W(N-2,6-Pr$^i_2$C$_6$H$_3$)(CHCHCMePh)(OCMe(CF$_3$)$_2$)$_2$ (Py),
W(N-2,6-Pr$^i_2$C$_6$H$_3$)(CHCHCMePh)(OC(CF$_3$)$_3$)$_2$(Py),
W(N-2,6-Pr$^i_2$C$_6$H$_3$)(CHCHCMePh)(OPh)$_2$(Py);
molybdenum-based alkylidene catalysts such as
Mo(N-2,6-Pr$^i_2$C$_6$H$_3$)(CHBu$^t$)(OBu$^t$)$_2$, Mo(N-2,6-Pr$^i_2$C$_6$H$_3$)(CHBu$^t$)(OCMe$_2$CF$_3$)$_2$,
Mo(N-2,6-Pr$^i_2$C$_6$H$_3$)(CHBu$^t$)(OCMe(CF$_3$)$_2$)$_2$,
Mo(N-2,6-Pr$^i_2$C$_6$H$_3$)(CHBu$^t$)(OC(CF$_3$)$_3$)$_2$,
Mo(N-2,6-Me$_2$C$_6$H$_3$)(CHBu$^t$)(OC(CF$_3$)$_3$)$_2$,
Mo(N-2,6-Pr$^i_2$C$_6$H$_3$)(CHCMe$_2$Ph)(OCMe$_3$)$_2$,
Mo(N-2,6-Pr$^i_2$C$_6$H$_3$)(CHCMe$_2$Ph)(OCMe$_2$(CF$_3$)$_2$)$_2$,
Mo(N-2,6-Pr$^i_2$C$_6$H$_3$)(CHCMe$_2$Ph)(OCMe (CF$_3$)$_2$)$_2$,
Mo(N-2,6-Pr$^i_2$C$_6$H$_3$)(CHCMe$_2$Ph)(OC(CF$_3$)$_3$)$_2$,
Mo(N-2,6-Me$_2$C$_6$H$_3$)(CHCMe$_2$Ph)(OC(CF$_3$)$_3$)$_2$,
Mo(N-2,6-Pr$^i_2$C$_6$H$_3$)(CHCMe$_2$Ph)(OBu$^t$)$_2$(PR$_3$),
Mo(N-2,6-Pr$^i_2$C$_6$H$_3$)(CHCMe$_2$Ph)(OCMe$_2$CF$_3$)$_2$(PR$_3$),
Mo(N-2,6-Pr$^i_2$C$_6$H$_3$)(CHCMe$_2$Ph)(OCMe (CF$_3$)$_2$)$_2$(PR$_3$),
Mo(N-2,6-Pr$^i_2$C$_6$H$_3$)(CHCMe$_2$Ph)(OC(CF$_3$)$_3$)$_2$ (PR$_3$),
Mo(N-2,6-Me$_2$C$_6$H$_3$)(CHCMe$_2$Ph)(OC(CF$_3$)$_3$)$_2$(PR$_3$),
Mo(N-2,6-Pr$^i_2$C$_6$H$_3$)(CHCMe$_2$Ph)(OBu$^t$)$_2$(Py),
Mo(N-2,6-Pr$^i_2$C$_6$H$_3$)(CHCMe$_2$Ph)(OCMe$_2$CF$_3$)$_2$(Py),
Mo(N-2,6-Pr$^i_2$C$_6$H$_3$)(CHCMe$_2$Ph)(OCMe(CF$_3$)$_2$)$_2$(Py),
Mo(N-2,6-Pr$^i_2$C$_6$H$_3$)(CHCMe$_2$Ph)(OC(CF$_3$)$_3$)$_2$(Py),
Mo(N-2,6-Me$_2$C$_6$H$_3$)(CHCMe$_2$Ph)(OC(CF$_3$)$_3$)$_2$(Py)

(wherein Pr$^i$ in the formula represents an iso-propyl group, R represents an alkyl group such as a methyl group, an ethyl group, or an alkoxy group such as a methoxy group, an ethoxy group, Bu$^t$ represents a tert-butyl group, Me represents a methyl group, Ph represents a phenyl group, and Py represents a pyridine group); and ruthenium-based alkylidene catalysts such as Ru(CHCHCPh$_2$)(PPh$_3$)$_2$Cl$_2$ (wherein Ph in the formula represents a phenyl group), and the like, and can be preferably used. In addition, these ring-opening metathesis polymerization catalysts may be used individually or in combination of two or more kinds thereof.

On the other hand, in addition to the ring-opening metathesis polymerization catalyst, a ring-opening metathesis polymerization catalyst including a combination of an organic transition metal complex, a transition metal halide, or a transition metal oxide with a Lewis acid as a co-catalyst may be used, but it has a low catalyst activity and is undesirable industrially.

In the ring-opening metathesis polymerization of the fluorine-containing cyclic olefin monomer, the molar ratio of the fluorine-containing cyclic olefin monomer to the ring-opening metathesis polymerization catalyst is, in the case of a transition metal alkylidene catalyst such as tungsten, molybdenum, or ruthenium, and the like, usually 100 to 30,000 moles, and preferably 1,000 to 20,000 moles of the monomer, with respect to one mole of the transition metal alkylidene catalyst.

Furthermore, in order to control the molecular weight and its distribution, an olefin can be used as a chain transfer agent. Examples of the olefin include α-olefins such as ethylene, propylene, 1-butene, 1-pentene, 1-hexene, 1-octene, or fluorine-containing olefins thereof, silicon-containing olefins such as vinyltrimethylsilane, allyltrimethylsilane, allyltriethylsilane, allyltriisopropylsilane, or fluorine- and silicon-containing olefins thereof, and examples of the diene include non-conjugated dienes such as 1,4-pentadiene, 1,5-hexadiene, 1,6-heptadiene, or fluorine-containing non-conjugated dienes. Further, these olefins, fluorine-containing olefins, dienes, or fluorine-containing dienes may be each used individually or in combination of two or more kinds thereof.

The amount of the olefin, fluorine-containing olefin, diene, or fluorine-containing diene to be used is such that the amount of the olefin or diene is in the range from usually 0.001 to 1,000 moles, and preferably 0.01 to 100 moles, with respect to one mole of the fluorine-containing cyclic olefin monomer. Further, the amount of the olefin or diene is in the range from usually 0.1 to 1,000 moles, and preferably 1 to 500 moles, with respect to one mole of the transition metal alkylidene catalyst.

Furthermore, the ring-opening metathesis polymerization of the fluorine-containing cyclic olefin monomer can be performed in a solvent or without a solvent, but examples of the particularly used solvent include ethers such as tetrahydrofuran, diethyl ether, dibutyl ether, dimethoxyethane, dioxane, esters such as ethyl acetate, propyl acetate, butyl acetate, aromatic hydrocarbons such as benzene, toluene, xylene or ethyl benzene, and the like, aliphatic hydrocarbons such as pentane, hexane, heptane, aliphatic cyclic hydrocarbons such as cyclopentane, cyclohexane, methylcyclohexane, dimethylcyclohexane, decalin, halogenated hydrocarbons such as methylene dichloride, dichloroethane, dichloroethylene, tetrachloroethane, chlorobenzene, trichlorobenzene, fluorine-containing aromatic hydrocarbons such as fluorobenzene, difluorobenzene, hexafluorobenzene, trifluoromethylbenzene, meta-xylene hexafluoride, fluorine-containing aliphatic hydrocarbons such as perfluorohexane, fluorine-containing aliphatic cyclic hydrocarbons such as perfluorocyclodecalin, and fluorine-containing ethers such as perfluoro-2-butyl tetrahydrofuran. These may be used in combination of two or more kinds thereof.

Although varying depending on the reactivity of the monomer and the solubility in solvent used for the polymerization, the ring-opening metathesis polymerization of the fluorine-containing cyclic olefin monomer can be carried out under the condition where the concentration of the fluorine-containing cyclic olefin monomer relative to the monomer solution is usually in the range from 5 to 100% by mass, and preferably in the range from 10 to 60% by mass, the reaction temperature is usually in the range from −30 to 150° C., and preferably in the range from 30 to 100° C., and the reaction time is usually in the range from 10 minutes to 120 hours, and preferably in the range from 30 minutes to 48 hours. Further, the reaction can be stopped with an inactivating agent including aldehydes such as butyl aldehyde, ketones such as acetone and the like, alcohols such as methanol and the like, or water, thereby obtaining a solution of the polymer.

The fluorine-containing cyclic olefin polymer or the fluorine-containing cyclic olefin copolymer of the present invention can be obtained by subjecting the fluorine-containing cyclic olefin monomer to ring-opening metathesis polymerization, and then subjecting the olefin portion in the main chain of the resulting polymer to a hydrogenation reaction. Further, the hydrogenation catalyst may be either a homogeneous metal complex catalyst or a heterogeneous metal-supported catalyst, which does not cause a hydrogenation reaction of the solvent used and is capable of subjecting the olefin portion in the main chain of the resulting polymer to hydrogenation reaction. Examples of the homogeneous metal complex catalyst include chlorotris(triphenylphosphine)rhodium, dichlorotris(triphenylphosphine)osmium, dichlorohydridobis(triphenylphosphine)iridium, dichlorotris(triphenylphosphine)ruthenium, dichlorotetrakis(triphenylphosphine)ruthenium, chlorohydridocarbonyltris(triphenylphosphine)ruthenium, dichlorotris(trimethylphosphine)ruthenium, and the like, and examples of the heterogeneous metal-supported catalyst include activated carbon-supported palladium, alumina-supported palladium, activated carbon-supported rhodium, alumina-supported rhodium, and the like. These hydrogenation catalysts may be used individually or in combination of two or more kinds thereof.

When the olefin portion in the main chain is subjected to a hydrogenation treatment, in the case of using a known heterogeneous or homogeneous hydrogenation catalyst, the amount of the hydrogenation catalyst to be used is one such that the amount of the metal component in the hydrogenation catalyst is usually from $5 \times 10^{-4}$ parts by mass to 100 parts by mass, and preferably from $1 \times 10^{-2}$ parts by mass to 30 parts by mass, with respect to 100 parts by mass of the polymer before the hydrogenation treatment.

The solvent used for hydrogenation is not particularly limited as long as it is one in which a fluorine-containing cyclic olefin polymer or a fluorine-containing cyclic olefin copolymer is dissolved and the solvent itself is not hydrogenated, and examples thereof include ethers such as tetrahydrofuran, diethyl ether, dibutyl ether, dimethoxyethane, esters such as ethyl acetate, propyl acetate, butyl acetate, aromatic hydrocarbons such as benzene, toluene, xylene, ethyl benzene, aliphatic hydrocarbons such as pentane, hexane, heptane, aliphatic cyclic hydrocarbons such as cyclopentane, cyclohexane, methylcyclohexane, dimethylcyclohexane, decalin, halogenated hydrocarbons such as methylene dichloride, chloroform, dichloroethane, dichloroethylene, tetrachloroethane, chlorobenzene, trichlorobenzene, fluorine-containing aromatic hydrocarbons such as fluorobenzene, difluorobenzene, hexafluorobenzene, trifluoromethylbenzene, meta-xylene hexafluoride, fluorine-containing aliphatic hydrocarbons such as perfluorohexane, fluorine-containing aliphatic cyclic hydrocarbons such as perfluorocyclodecalin, and fluorine-containing ethers such as perfluoro-2-butyltetrahydrofuran and the like. These solvents may be used in combination of two or more kinds thereof.

The hydrogenation reaction of the olefin portion in the main chain is carried out at a hydrogen pressure in the range from normal pressure to 30 MPa, preferably from 0.5 to 20 MPa, and particularly preferably from 2 to 15 MPa, the reaction temperature is a temperature in the range from usually 0 to 300° C., preferably room temperature to 250° C., and particularly preferably 50 to 200° C. The mode in which the hydrogenation reaction is carried out is not particularly limited, but examples thereof include a method in which a catalyst is dispersed and dissolved in a solvent to carry out a hydrogenation reaction, a method in which a catalyst is charged into a column or the like, and then a polymer solution is flowed as a mobile phase, and the like.

Furthermore, the hydrogenation treatment of the olefin portion in the main chain is not particularly limited, and thus it may be carried out by precipitating the polymerization solution of the fluorine-containing cyclic olefin polymer (A) before the hydrogenation treatment into a poor solvent, isolating the polymer, and then dissolving the polymer in a solvent to carry out a hydrogenation treatment, or the hydrogenation treatment may be carried out with a hydrogenation catalyst while not isolating the polymer from the polymerization solution.

Moreover, the hydrogenation rate of the olefin portion of the fluorine-containing cyclic olefin polymer (A) is 50% or more, preferably from 70 to 100%, and more preferably from 90 to 100%. If the hydrogenation rate is less than 50%, the olefin portion may cause deterioration of heat resistance or weather resistance due to oxidation or deterioration by light absorption.

In the present invention, in the case where the polymer solution (resin composition for transcription) is brought into contact with a mold, the fluorine-containing cyclic olefin polymer (A) may be dissolved in a solvent after recovered from the hydrogenated polymer solution, and then brought into contact with mold; while not recovering the fluorine-containing cyclic olefin polymer (A), the hydrogenated polymer solution may be brought into contact with a mold; or two or more kinds of solvents are mixed with the hydrogenated polymer solution and brought into contact with a mold. A method for recovering the fluorine-containing cyclic olefin polymer (A) from the hydrogenated polymer solution is not particularly limited, but examples thereof include a method in which a reaction solution is discharged into a poor solvent under stirring, a method in which a polymer is precipitated by a process such as a steam-stripping process for blowing steam into a reaction solution, and recovered by a process of filtration, centrifugation, decantation or the like, or a method in which a solvent is evaporated off from a reaction solution by heating or the like, and the like. Further, within a range not impairing the purpose of the present invention, known various additives such as an ultraviolet absorber, an antioxidant, a flame retardant, an antistatic agent can be blended with the recovered polymer.

<Photocurable Compound (B)>

In the present invention, the composition of the fluorine-containing cyclic olefin polymer (A) and the photocurable compound (B) is one such that the mass ratio (A)/(B) is in the range from usually 99.9/0.1 to 80/20, preferably 99.9/0.1 to 90/10, and more preferably 99.9/0.1 to 95/5. If the percentage by mass of the photocurable compound (B) is more than 20%, the light transmittance in the visible light region may be less than 80% in some cases.

Examples of the photocurable compound (B) include a compound having a reactive double bond group, a cationically ring-opening polymerizable compound, and the like. These compounds may have one or plural reactive groups in one molecule, but the compounds having two or more reactive groups in one molecule are preferably used. The compounds having different numbers of the reactive groups may be mixed at any ratio and then used, or a compound having a reactive double bond group and a cationically ring-opening polymerizable compound may be mixed at any ratio and then used. By this these, the coatability when coating the fluorine-containing cyclic olefin polymer composition on a pattern surface of the mold and curability during curing with light irradiation are optimized, and as a result, a three-dimensional network structure can be formed with high efficiency inside and over the surface of the imprint product, and thus, a nanoimprint film having a fine pattern formed over its surface, having a high surface hardness, can be formed.

Among the photocurable compounds (B), examples of the compound having a reactive double bond group include olefins such as fluorodienes ($CF_2$=$CFOCF_2CF_2CF$=$CF_2$, $CF_2$=$CFOCF_2CF$ ($CF_3$)$CF$=$CF_2$, $CF_2$=$CFCF_2C(OH)$($CF_3$)$CH_2CH$=$CH_2$, $CF_2$=$CFCF_2C(OH)(CF_3)CH$=$CH_2$, CF$_2$=CFCF$_2$C(CF$_3$)(OCH$_2$OCH$_3$)CH$_2$CH=CH$_2$,
CF$_2$=CFCH$_2$C(C(CF$_3$)$_2$OH)(CF$_3$)CH$_2$CH=CH$_2$, and the like);

cyclic olefins such as norbornene, norbornadiene;

alkyl vinyl ethers such as cyclohexylmethyl vinyl ether, isobutyl vinyl ether, cyclohexyl vinyl ether, ethyl vinyl ether;

vinyl esters such as vinyl acetate; and (meth)acrylic acids and derivatives thereof, or fluorine-containing acrylates thereof, such as (meth)acrylic acid, phenoxyethyl acrylate, benzyl acrylate, stearyl acrylate, lauryl acrylate, 2-ethyl hexyl acrylate, allyl acrylate, 1,3-butanediol diacrylate, 1,4-butanediol diacrylate, 1,6-hexanediol diacrylate, trimethylolpropane triacrylate, pentaerythritol triacrylate, dipentaerythritol hexaacrylate, ethoxyethyl acrylate, methoxyethyl acrylate, glycidyl acrylate, tetrahydrofurfurylacrylate, diethylene glycol diacrylate, neopentyl glycol diacrylate, polyoxyethylene glycol diacrylate, tripropylene glycol diacrylate, 2-hydroxyethyl acrylate, 2-hydroxypropyl acrylate, 4-hydroxybutyl vinyl ether, N,N-diethylaminoethyl acrylate, N,N-dimethylaminoethyl acrylate, N-vinyl pyrrolidone, dimethylaminoethyl methacrylate, and the like.

More preferable examples thereof include trifunctional or higher acrylates represented by the general formulae (5), (6), (7), and (8). These may be used individually or in combination of two or more kinds thereof. By using a (meth)acrylate monomer having a trifunctional or higher reactive double bond group, it is possible to form a three-dimensional network structure with high efficiency after curing with light irradiation.

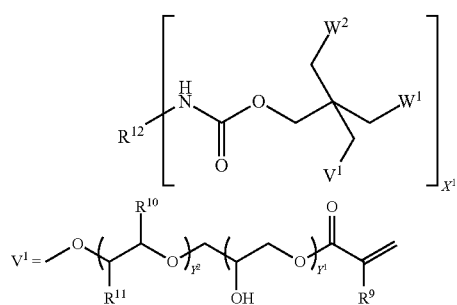

(5)

In the formula (5), R$^{12}$ represents tolylene, diphenylmethane, hexamethylene, norbornane dimethylene, dicyclohexylenemethane, trimethylcyclohexylene, cyclohexane dimethylene, N,N',N''-tris(hexamethylene)-isocyanurate, N,N'-dihexamethyleneurea, N,N,N'-tris(hexamethylene)-urea, N,N,N',N'-tetrakis(hexamethylene)-urea, or xylene. R$^9$, R$^{10}$, and R$^{11}$ independently represent H or CH$_3$. W$^1$ and W$^2$ represent H, CH$_3$, OH, or V$^1$. X$^1$ represents an integer of 2 to 4. Y$^1$ represents an integer of 0 to 2 and Y$^2$ represents an integer of 0 to 5.

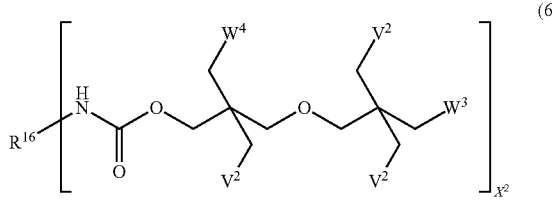

(6)

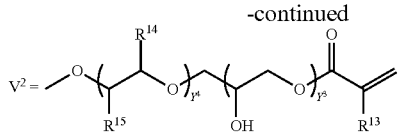

In the formula (6), R$^{16}$ represents tolylene, diphenyl methane, hexamethylene, norbornanedimethylene, dicyclohexylenemethane, trimethylcyclohexylene, cyclohexane dimethylene, N,N',N''-tris(hexamethylene)-isocyanurate, N,N'-dihexamethyleneurea, N,N,N'-tris(hexamethylene)-urea, N,N,N',N'-tetrakis(hexamethylene)-urea, or xylene. R$^{13}$, R$^{14}$, and R$^{15}$ independently represent H or CH$_3$. W$^3$ and W$^4$ represent H, CH$_3$, OH, or V$^2$. X$^2$ represents an integer of 2 to 4. Y$^3$ represents an integer of 0 to 2, and Y$^4$ represents an integer of 0 to 5.

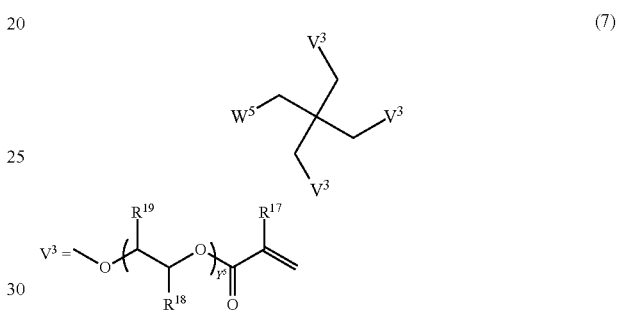

(7)

In the formula (7), W$^5$ represents H, CH$_3$, OH, or V$^3$. R$^{17}$, R$^{18}$, and R$^{19}$ independently represent H or CH$_3$, and Y$^5$ represents an integer of 0 to 20.

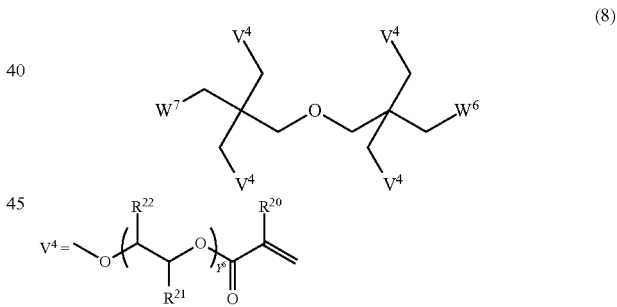

(8)

In the formula (8), W$^6$ and W$^7$ represent H, CH$_3$, OH, or V$^4$. R$^{20}$, R$^{21}$, and R$^{22}$ represent H or CH$_3$, and Y$^6$ represents an integer of 0 to 3.

Furthermore, among the photocurable compounds (B), examples of the cationically ring-opening polymerizable compound include epoxy compounds such as cyclohexene epoxide, dicyclopentadiene oxide, limonene dioxide, 4-vinylcyclohexene dioxide, 3,4-epoxycyclohexylmethyl-3',4'-epoxycyclohexanecarboxylate, di(3,4-epoxycyclohexyl)adipate, (3,4-epoxycyclohexyl)methyl alcohol, (3,4-epoxy-6-methylcyclohexyl)methyl-3,4-epoxy-6-methylcyclohexanecarboxylate, ethylene 1,2-di(3,4-epoxycyclohexanecarboxylic acid) ester, (3,4-epoxycyclohexyl)ethyltrimethoxysilane, phenyl glycidyl ether, dicyclohexyl-3,3'-diepoxide, a bisphenol A type epoxy resin, a halogenated bisphenol A type epoxy resin, a bisphenol F type epoxy resin, an o-, m-, or p-cresol novolak type epoxy resin, a phenol novolak type epoxy resin, a polyglycidyl ether of a polyhydric alcohol, an alicyclic epoxy resin such as 3,4-epoxycyclohexenylmethyl-3',4'-epoxycyclohexenecarboxylate, glycidyl ether of hydrogenation bisphenol A, and the like. Further examples thereof include oxetane compounds such as
3-methyl-3-(butoxymethyl)oxetane,
3-methyl-3-(pentyloxymethyl)oxetane,
3-methyl-3-(hexyloxymethyl)oxetane,
3-methyl-3-(2-ethylhexyloxymethyl)oxetane,
3-methyl-3-(octyloxymethyl)oxetane,
3-methyl-3-(decanoloxymethyl)oxetane,
3-methyl-3-(dodecanoloxymethyl)oxetane,
3-methyl-3-(phenoxymethyl)oxetane,
3-ethyl-3-(butoxymethyl)oxetane,
3-ethyl-3-(pentyloxymethyl)oxetane,
3-ethyl-3-(hexyloxymethyl)oxetane,
3-ethyl-3-(2-ethylhexyloxymethyl)oxetane,
3-ethyl-3-(octyloxymethyl)oxetane,
3-ethyl-3-(decanoloxymethyl)oxetane,
3-ethyl-3-(dodecanoloxymethyl)oxetane,
3-(cyclohexyloxymethyl)oxetane,
3-methyl-3-(cyclohexyloxymethyl)oxetane,
3-ethyl-3-(cyclohexyloxymethyl)oxetane,
3-ethyl-3-(phenoxymethyl)oxetane, 3,3-dimethyloxetane,
3-hydroxymethyloxetane, 3-methyl-3-hydroxymethyloxetane,
3-ethyl-3-hydroxymethyloxetane, 3-ethyl-3-phenoxymethyloxetane,
3-n-propyl-3-hydroxymethyloxetane,
3-isopropyl-3-hydroxymethyloxetane,
3-n-butyl-3-hydroxymethyloxetane,
3-isobutyl-3-hydroxymethyloxetane,
3-sec-butyl-3-hydroxymethyloxetane,
3-tert-butyl-3-hydroxymethyloxetane, 3-ethyl-3-(2-ethyl hexyl)oxetane, and the like, and for the compounds having two or more oxetanyl groups, bis(3-ethyl-3-oxetanylmethyl)ether,
1,2-bis[(3-ethyl-3-oxetanylmethoxy)]ethane,
1,3-bis[(3-ethyl-3-oxetanylmethoxy)]propane,
1,3-bis[(3-ethyl-3-oxetanylmethoxy)]-2,2-dimethyl-propane,
1,4-bis(3-ethyl-3-oxetanylmethoxy)butane,
1,6-bis(3-ethyl-3-oxetanylmethoxy)hexane,
1,4-bis[(3-methyl-3-oxetanyl)methoxy]benzene,
1,3-bis[(3-methyl-3-oxetanyl)methoxy]benzene,
1,4-bis{[(3-methyl-3-oxetanyl)methoxy]methyl}benzene,
1,4-bis{[(3-methyl-3-oxetanyl)methoxy]methyl}cyclohexane,
4,4'-bis{[(3-methyl-3-oxetanyl)methoxy]methyl}biphenyl,
4,4'-bis{[(3-methyl-3-oxetanyl)methoxy]methyl}bicyclohexane,
2,3-bis[(3-methyl-3-oxetanyl)methoxy]bicyclo[2.2.1]heptane,
2,5-bis[(3-methyl-3-oxetanyl)methoxy]bicyclo[2.2.1]heptane,
2,6-bis[(3-methyl-3-oxetanyl)methoxy]bicyclo[2.2.1]heptane,
1,4-bis[(3-ethyl-3-oxetanyl)methoxy]benzene,
1,3-bis[(3-ethyl-3-oxetanyl)methoxy]benzene,
1,4-bis{[(3-ethyl-3-oxetanyl)methoxy]methyl}benzene,
1,4-bis{[(3-ethyl-3-oxetanyl)methoxy]methyl}cyclohexane,
4,4'-bis{[(3-ethyl-3-oxetanyl)methoxy]methyl}biphenyl,
4,4'-bis{[(3-ethyl-3-oxetanyl)methoxy]methyl}bicyclohexane,
2,3-bis[(3-ethyl-3-oxetanyl)methoxy]bicyclo[2.2.1]heptane,
2,5-bis[(3-ethyl-3-oxetanyl)methoxy]bicyclo[2.2.1]heptane,
2,6-bis[(3-ethyl-3-oxetanyl)methoxy]bicyclo[2.2.1]heptane, and the like. Further, these may be used individually or in combination of two or more kinds thereof.

Examples of the cationically ring-opening polymerizable compound include a trifunctional or higher epoxy compound represented by the general formula (9). These may be used individually or in combination of two or more kinds thereof. By using an epoxy monomer having a trifunctional or higher epoxy group, it is possible to form a three-dimensional network structure with high efficiency after curing with light irradiation.

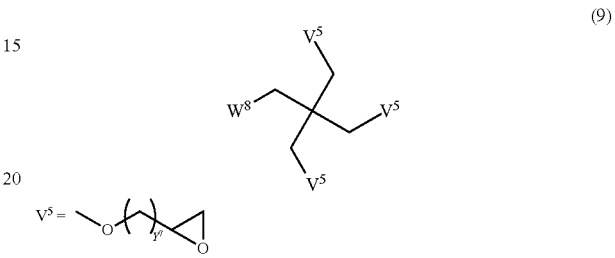

(9)

In the formula (9), $W^8$ represents H, alkyl having 1 to 3 carbon atoms, OH, or $V^5$, and $Y^7$ represents an integer of 1 to 20.

Furthermore, examples of the photoradical initiator generating radicals by light irradiation in the photocurable compound (B) include acetophenones such as acetophenone, p-tert-butyltrichloroacetophenone, chloroacetophenone, 2,2-diethoxyacetophenone, hydroxyacetophenone, 2,2-dimethoxy-2'-phenylacetophenone, 2-aminoacetophenone, dialkylaminoacetophenone; benzoins such as benzoin, benzoin methyl ether, benzoin ethyl ether, benzoin isopropyl ether, benzoin isobutyl ether, 1-hydroxycyclohexylphenyl ketone, 2-hydroxy-2-methyl-1-phenyl-2-methylpropan-1-one, 1-(4-isopropylphenyl)-2-hydroxy-2-methyl propan-1-one; benzophenones such as benzophenone, benzoyl benzoic acid, methyl benzoyl benzoate, methyl-o-benzoyl benzoate, 4-phenylbenzophenone, hydroxybenzophenone, hydroxypropylbenzophenone, acrylbenzophenone, 4,4'-bis(dimethylamino)benzophenone; thioxanthones such as thioxanthone, 2-chlorothioxanthone, 2-methylthioxanthone, diethylthioxanthone, dimethylthioxanthone; and fluorinated peroxides such as perfluoro(tert-butyl peroxide), perfluorobenzoyl peroxide; α-acyl oxime ester, benzyl-(o-ethoxycarbonyl)-α-monooxime, acylphosphine oxide, glyoxyester, 3-ketocoumarin, 2-ethylanthraquinone, camphorquinone, tetramethylthiuram sulfide, azobisisobutyronitrile, benzoyl peroxide, dialkyl peroxide, tert-butylperoxy pivalate, and the like.

Specific examples of the more preferably used photoradical initiator include Irgacure 651 (manufactured by Ciba Specialty Chemicals Corporation), Irgacure 184 (manufactured by Ciba Specialty Chemicals Corporation), Darocur 1173 (manufactured by Ciba Specialty Chemicals Corporation), benzophenone, 4-phenylbenzophenone, Irgacure 500 (manufactured by Ciba Specialty Chemicals Corporation), Irgacure 2959 (manufactured by Ciba Specialty Chemicals Corporation), Irgacure 127 (manufactured by Ciba Specialty Chemicals Corporation), Irgacure 907 (manufactured by Ciba Specialty Chemicals Corporation), Irgacure 369 (manufactured by Ciba Specialty Chemicals Corporation), Irgacure 1300 (manufactured by Ciba Specialty Chemicals Corporation), Irgacure 819 (manufactured by Ciba Specialty Chemicals Corporation), Irgacure 1800 (manufactured by Ciba Specialty Chemicals Corporation), Darocur TPO (manufactured by Ciba Specialty Chemicals Corporation), Darocur 4265 (manufactured by Ciba Specialty Chemicals Corporation), Irgacure OXE01 (manufactured by Ciba Specialty Chemicals Corporation), Irgacure OXE02 (manufactured by Ciba Specialty Chemicals Corporation), Esacure-KT55 (manufactured by Lamberti S. P. A.), Esacure-KIP150 (manufactured by Lamberti S. P. A.), Esacure-KIP100F (manufactured by Lamberti S. P. A.), Esacure-KT37 (manufactured by Lamberti S. P. A.), Esacure-KT046 (manufactured by Lamberti S. P. A.), Esacure-1001 M (manufactured by Lamberti S. P. A.), Esacure-KIP/EM (manufactured by Lamberti S. P. A.), Esacure-DP250 (manufactured by Lamberti S. P. A.), Esacure-KB1 (manufactured by Lamberti S. P. A.), and 2,4-diethylthioxanthone. Among these, examples of the even more preferably used photoradical polymerization initiator include Irgacure 184 (manufactured by Ciba Specialty Chemicals Corporation), Darocur 1173 (manufactured by Ciba Specialty Chemicals Corporation), Irgacure 500 (manufactured by Ciba Specialty Chemicals Corporation), Irgacure 819 (manufactured by Ciba Specialty Chemicals Corporation), Darocur TPO (manufactured by Ciba Specialty Chemicals Corporation), Esacure-KIP100F (manufactured by Lamberti S. P. A.), Esacure-KT37 (manufactured by Lamberti S. P. A.), and Esacure-KT046 (manufactured by Lamberti S. P. A.). Further, these photoradical initiators may be used individually or in combination of two or more kinds thereof.

<Photocuring Initiator (C)>

Examples of the photocuring initiator (photopolymerization initiator) (C) include a photoradical initiator that generates radicals by light irradiation, a photocationic initiator that generates cations by light irradiation, and the like. The amount of the photocuring initiator (C) to be used is usually preferably 0.05 parts by mass or more, and more preferably from 0.1 to 10 parts by mass, with respect to 100 parts by mass of the photocurable compound (B).

Among the photocuring initiators (C), the photocationic initiator that generates cations by light irradiation is not particularly limited as long as it is a compound that initiates the cation polymerization of the above-described ring-opening polymerizable compounds that are cationically polymerizable with light irradiation, but, for example, a compound that discharges Lewis acids by performing a photoreaction, as with an onium salt with an anion that pairs with an onium cation is preferable.

Specific examples of the onium cation include diphenyliodonium, 4-methoxydiphenyliodonium, bis(4-methylphenyl)iodonium, bis(4-tert-butylphenyl)iodonium, bis(dodecylphenyl)iodonium, triphenylsulfonium, diphenyl-4-thiophenoxyphenylsulfonium, bis[4-(diphenylsulfonio)-phenyl]sulfide, bis[4-(di(4-(2-hydroxyethyl)phenyl)sulfonio)-phenyl]sulfide, η5-2,4-(cyclopentadienyl)[1,2,3,4,5,6-η-(methylethyl)benzene]-iron (1+), and the like, and further include, in addition to the onium cations, perchlorate ions, trifluoromethane sulfonate ions, toluene sulfonate ions, trinitrotoluene sulfonate ions, and the like. Further, these photocationic initiators may be used individually or in combination of two or more kinds thereof.

On the other hand, specific examples of the anion include tetrafluoroborate, hexafluorophosphate, hexafluoroantimonate, hexafluoroarsenate, hexachloroantimonate, tetra (fluorophenyl)borate, tetra(difluorophenyl)borate, tetra(trifluorophenyl)borate, tetra(tetrafluorophenyl)borate, tetra (pentafluorophenyl)borate, tetra(perfluorophenyl)borate, tetra(trifluoromethylphenyl)borate, tetra(di(trifluoromethyl) phenyl)borate, and the like. Further, these photocationic initiators may be used individually or in combination of two or more kinds thereof.

Specific examples of the more preferably used photocationic initiator include Irgacure 250 (manufactured by Ciba Specialty Chemicals Corporation), Irgacure 784 (manufactured by Ciba Specialty Chemicals Corporation), Esacure-1064 (manufactured by Lamberti S. P. A.), CYRAURE UV16990 (manufactured by Union Carbide Corporation), ADEKA OPTOMER SP-172 (manufactured by Adeka Corporation), ADEKA OPTOMER SP-170 (manufactured by Adeka Corporation), ADEKA OPTOMER SP-152 (manufactured by Adeka Corporation), and ADEKA OPTOMER SP-150 (manufactured by Adeka Corporation). Further, these photocationic initiators may be used individually or in combination of two or more kinds thereof.

The photocurable compound (B) and the photocuring initiator (C) can be used in the form of a photocurable composition containing them. The photocurable composition can be obtained by dissolving the photocuring initiator (C) in the photocurable compound (B) itself or by dissolving both the photocurable compound (B) and the photocuring initiator (C) in an organic solvent. In addition, if necessary, other known components, for example, modifiers such as an anti-aging agent, a leveling agent, a wettability improver, a surfactant, a plasticizer, stabilizers such as an ultraviolet absorber, a preservative, an antimicrobial agent, a photosensitizing agent, a silane coupling agent, and the like may be used as a third component.

The organic solvent used for the preparation of a photocurable composition is not particularly limited, but examples thereof include fluorine-containing aromatic hydrocarbons such as meta-xylene hexafluoride, benzotrifluoride, fluorobenzene, difluorobenzene, hexafluorobenzene, trifluoromethyl benzene, bis(trifluoromethyl)benzene, meta-xylene hexafluoride, fluorine-containing aliphatic hydrocarbons such as perfluorohexane, perfluorooctane, fluorine-containing aliphatic cyclic hydrocarbons such as perfluorocyclodecalin, fluorine-containing ethers such as perfluoro-2-butyl tetrahydrofuran, halogenated hydrocarbons such as chloroform, chlorobenzene, trichlorobenzene, ethers such as tetrahydrofuran, dibutyl ether, 1,2-dimethoxyethane, dioxane, propylene glycol mono methyl ether, dipropylene glycol monomethyl ether, propylene glycol monomethyl ether acetate, esters such as ethyl acetate, propyl acetate, butyl acetate, ketones such as methylethyl ketone, methylisobutyl ketone, cyclohexanone, and alcohols such as methanol, ethanol, isopropyl alcohol, 2-methoxyethanol, 3-methoxypropanol, and the like. The organic solvent can be selected from these allowing for a dissolving property and a film-forming property, and may be the same as or different from the organic solvent in which the fluorine-containing cyclic olefin polymer (A) is dissolved. Particularly, from the viewpoint of a film-forming property, a solvent having a boiling point of 70° C. or higher at atmospheric pressure is preferred. If the boiling point of the solvent is low, for example, the evaporation speed is high and the solvent starts to dry partially during coating, which causes deterioration of film thickness precision or generation of fish eyes on the film surface.

The fluorine-containing cyclic olefin polymer composition in the present invention can make to form a hydrogen bond between the molecules or in the molecule due to using a specific fluorine-containing cyclic olefin polymer having a hydrocarbon structure in the main chain and a fluorine-containing aliphatic ring structure in the side chain. Further, it can form a three-dimensional network structure inside and over the surface of the imprint product after curing with light irradiation since a photocurable compound and a photocuring initiator are used. By these action, the change in the elastic modulus and the shrinkage rate of the resin can be optimized when heating, cooling, and curing in the processes for producing a nanoimprint product, and also, the hardness can be further improved. Accordingly, by the fluorine-containing cyclic olefin polymer of the present invention, an imprint product having a fine pattern over its surface can be formed, in which a fine pattern of the mold surface is transcribed with high dimensional precision and which has a high surface hardness, and further, an imprint product having a large area can be obtained by a simple process, in which the imprint product has an excellent releasability.

Moreover, in the case where an imprint product having a three-dimensional network structure inside or over its surface is implemented in a device or the like, deformation and scratching of an imprint pattern on the stress applied from the outside can be suppressed effectively, and it is possible to impart an important function in practical use.

[Method for Preparing Fluorine-Containing Cyclic Olefin Polymer Composition]

As for the method for preparing the fluorine-containing cyclic olefin polymer composition in the present invention, the fluorine-containing cyclic olefin polymer composition can be obtained simply by preparing the fluorine-containing cyclic olefin polymer (A) in a solution at any concentration in advance, and then adding a photocurable composition to give a mass ratio (A)/(B) of the fluorine-containing cyclic olefin polymer (A) to the photocurable compound (B) in the range from usually 99.9/0.1 to 5/95, preferably 99.9/0.1 to 10/90, more preferably 99.9/0.1 to 80/20, and particularly preferably 99.9/0.1 to 50/50, and uniformly mixing them.

Furthermore, the photocurable composition can be prepared using the photocurable compound (B) as a substitute for a solvent, while not using the organic solvent. In the case where the composition is prepared using the organic solvent, the concentration of the fluorine-containing cyclic olefin polymer (A) with respect to the solution is in the range from usually 5 to 90% by mass, and preferably 10 to 60% by mass, and a concentration that is efficiently and highly suitable for a polymer thickness optimal or coatability, or the like for the mold after evaporation of the solvent.

The organic solvent used in the preparation of the fluorine-containing cyclic olefin polymer composition is not particularly limited, and thus the same as the organic solvent used in the preparation of the photocurable monomer composition may be used. Particularly, from the point of view of a film-forming property, a solvent having a boiling point of 70° C. or higher at atmospheric pressure is preferable, and if the boiling point of the solvent is low, for example, the evaporation speed is high and the solvent starts to dry partially during coating, which causes deterioration of film thickness precision or generation of fish eyes on the film surface.

In addition, in a similar way to the above-described photocurable composition, if necessary, other known components, for example, modifiers such as an anti-aging agent, a leveling agent, a wettability improver, a surfactant, a plasticizer, stabilizers such as an ultraviolet absorber, a preservative, an antimicrobial agent, a photosensitizing agent, and a silane coupling agent may be added as a third component.

[Method for Producing Imprint Product]

The shapes of the convex portion and the concave portion of the mold having a fine pattern over its surface, which is used in the method for producing a imprint product of the present invention, is not particularly limited, but examples thereof include a rectangular shape, a cylindrical shape, a prismatic shape, a triangular cone shape, a polyhedral shape, a hemispherical shape, and the like. Further, examples of the cross-sectional shape of the convex portion and the concave portion include a rectangular cross-sectional shape, a triangular cross-sectional shape, a semi-circular cross-sectional shape, and the like. Specific examples of the fine pattern of the imprint product of the mold preferably include a pattern in which a shape satisfying the above-described conditions has a concavity and convexity structure, and the like. These patterns are not particularly limited, and thus, may be arranged in a row at regular intervals or in any combination of non-contiguous arrangement and non-uniformly spaced arrangement.

The width of the convex portion and/or concave portion of the fine pattern is usually from 10 nm to 50 µm, and preferably from 20 nm to 1 µm. Further, the depth of the concave portion is usually from 30 nm to 50 µm, and preferably from 50 nm to 1 µm. Further, the ratio of the width of the convex portion to the depth of the concave portion, that is, the aspect ratio, is usually from 0.1 to 500, and preferably from 0.5 to 20.

Examples of the material for the mold base material used for the producing of the nanoimprint product by using the fluorine-containing cyclic olefin polymer composition (solution) of the present invention include metal materials such as nickel, iron, stainless steel, germanium, titanium, silicone, inorganic materials such as glass, quartz, alumina resin materials such as polyimide, polyamide, polyester, polycarbonate, polyphenylene ether, polyphenylene sulfide, polyacrylate, polymethacrylate, polyarylate, an epoxy resin, a silicone resin, and carbon materials such as diamond, graphite, and the like.

Moreover, the method for bringing the fluorine-containing cyclic olefin polymer composition (solution) of the present invention into contact with the mold is not particularly limited, but it may be, for example, either a method in which a polymer solution is coated on the fine pattern surface of a mold by a process of table coating, spin coating, dip coating, die coating, spray coating, bar coating, roll coating, curtain flow coating, or the like, or a method in which a polymer solution is coated on a base material including metal materials such as stainless steel, silicone, inorganic materials such as glass, quartz, and resin materials such as polyimide, polyamide, polyester, polycarbonate, polyphenylene ether, polyphenylene sulfide, polyacrylate, polymethacrylate, polyarylate, an epoxy resin, a silicone resin, by a process of table coating, spin coating, dip coating, die coating, spray coating, bar coating, roll coating, curtain flow coating, or the like, on which the fine pattern surface of the mold is then covered, thereby bringing them into contact with each other.

Specific examples of the method comprise:

(1) a method comprising a step of coating the fluorine-containing cyclic olefin polymer composition of the present invention over the surface of a mold having a fine pattern over its surface, and a step of heating the coated composition, followed by light irradiation, to cure the composition, (2) a method comprising coating a fluorine-containing cyclic olefin polymer composition over a support (base material) to form a coating film, a step of pressing the upper surface of the coating film over the mold surface having a fine pattern thereon, and a step of heating the coating film pressed over the mold surface, followed by light irradiation, to cure the coating film, and the like. In addition, in the (2) method, it is also possible for the solvent to be evaporated from the coating film, and then the coating film be pressed onto the mold.

The film thickness on the mold after bringing the fluorine-containing cyclic olefin polymer composition into contact with the mold, followed by heating and curing with light irradiation is not particularly limited, but it is preferably from 1 µm to 10 mm, more preferably from 5 µm to 1 mm, and most preferably from 10 µm to 0.5 mm. Within these ranges, an independent imprint product can be obtained.

The heating of the film on the mold at that time can be carried out at a temperature in the range from usually 10 to 300° C., and preferably 50 to 200° C. and a pressure in the range from 133 Pa to atmospheric pressure, for a heating time in the range from usually 10 minutes to 120 hours, and preferably in the range from 30 minutes to 48 hours. Further, the heating temperature, pressure, and time may each vary stepwise by setting each of them.

The light to be irradiated is not particularly limited as long as light irradiation can give energy for causing a radical reaction or an ion reaction with a photocuring initiator. As this light source, a light beam having a wavelength of 400 nm or less, for example, a low-pressure mercury lamp, a medium-pressure mercury lamp, a high-pressure mercury lamp, an ultrahigh pressure mercury lamp, a chemical lamp, a black light lamp, a microwave excitation mercury lamp, and a metal halide lamp, i-rays, G-rays, KrF excimer laser light, or ArF excimer laser light can be used.

The irradiation intensity to the fluorine-containing cyclic olefin polymer composition is controlled according to a product to be targeted, and thus, is not particularly limited. For example, the light irradiation intensity of the light wavelength region effective for activation of the photopolymerization initiator as described later (although varying depending on the photopolymerization initiator, but light having a light irradiation intensity of 300 to 420 nm is usually used) is preferably 0.1 to 100 mW/cm$^2$. If the irradiation intensity for the composition is less than 0.1 mW/cm$^2$, the reaction time is too long, whereas if it is more than 100 mW/cm$^2$, there is a concern that heat radiated from a lamp and heat generated during polymerization of the composition may reduce the cohesive force of the resulting cured product, cause yellowing, or cause deterioration of the support.

The light irradiation time is controlled according to a product to be targeted, and thus, is not particularly limited. However, an integrated light quantity which is represented by a product of the light irradiation intensity of a light wavelength region and a light irradiation time can be usually set at 3 to 1000 mJ/cm$^2$, more preferably 5 to 500 mJ/cm$^2$, and particularly preferably 10 to 300 mJ/cm$^2$. If the integrated light quantity for the composition is less than 3 mJ/cm$^2$, generation of active species from the photopolymerization initiator is not sufficient, and there is a concern that the characteristics of the resulting cured product may be deteriorated, whereas if the integrated light quantity for the composition is more than 1000 mJ/cm$^2$, improvement of productivity may be at disadvantage. In addition, it is sometimes preferable to use heating together with the process as above in order to promote the polymerization reaction. Further, the temperature in the case of curing a curable resin by light irradiation is usually preferably from 0 to 150° C., and more preferably from 0 to 60° C.

In the present invention, an imprint product can be formed on a mold by bringing the fluorine-containing cyclic olefin polymer composition (solution) into contact with a mold having a fine pattern over its surface, and evaporating volatile components such as a solvent by heating, followed by curing with light irradiation. The release of the imprint product from the mold is carried out at a temperature that is preferably no higher than the glass transition temperature of the fluorine-containing cyclic olefin polymer (A), and more preferably, no higher than (glass transition temperature −20° C.). By this, a pattern shape formed on the imprint product with high precision can be maintained and easily released. As for the releasing method, the imprint product can be released from the mold by peeling-off, or the mold and the imprint product are brought into contact by a process of dipping, spraying, or the like, using a medium such as, for example, water and then be released from each other using surface tension. In addition, a resin material or an inorganic material such as glass, may be attached to the back side of the imprint product, and the substrate may be released as a support.

<Method for Producing Cured Body>

Moreover, a cured body can be obtained using an imprint product obtained by using the fluorine-containing cyclic olefin polymer composition of the present invention as a replica mold.

Examples of the method for obtaining a cured body include a method comprising a step of bringing a surface having the fine pattern of the imprint product into contact with a photocurable monomer composition, a step of curing the photocurable monomer composition with light irradiation to obtain a cured product, and a step of releasing the cured product from the imprint product.

The method for bringing the surface having the fine pattern of the imprint product into contact with the photocurable monomer composition is not particularly limited, but it may be, for example, either a method in which the photocurable monomer composition is coated on the fine pattern surface of the imprint product by a process of table coating, spin coating, dip coating, die coating, spray coating, bar coating, roll coating, curtain flow coating, or the like, or a method in which the photocurable monomer composition is coated on a base material including the above-described metal materials, inorganic materials such as glass, quartz, and the like, resin materials, and the like, by a process of table coating, spin coating, dip coating, die coating, spray coating, bar coating, roll coating, curtain flow coating, or the like, on which the fine pattern surface of the imprint product is then covered, thereby bringing them into contact with each other.

The light to be irradiated to the photocurable monomer composition is not particularly limited as long as light irradiation can give energy for causing a radical reaction or an ion reaction with a photocuring initiator in a similar way to the fluorine-containing cyclic olefin polymer composition. As this light source, a light beam having a wavelength of 400 nm or less, for example, a low-pressure mercury lamp, a medium-pressure mercury lamp, a high-pressure mercury lamp, an ultrahigh pressure mercury lamp, a chemical lamp, a black light lamp, a microwave excitation mercury lamp, and a metal halide lamp, i-rays, G-rays, KrF excimer laser light, or ArF excimer laser light can be used.

In a similar way to the fluorine-containing cyclic olefin polymer composition, the irradiation intensity to the photocurable monomer composition is controlled according to a product to be targeted, and thus, is not particularly limited. For example, the light irradiation intensity of the light wavelength region effective for activation of the photopolymerization initiator as described later (although varying depending on the photopolymerization initiator, but light having a light irradiation intensity of 300 to 420 nm is usually used) is preferably from 0.1 to 100 mW/cm$^2$. If the irradiation intensity for the composition is less than 0.1 mW/cm$^2$, the reaction time is too long, whereas if it is more than 100 mW/cm$^2$, there is a concern that heat radiated from a lamp and heat generated during polymerization of the composition may reduce the cohesive force of the resulting cured product, cause yellowing, or cause deterioration of the support.

In a similar way to the fluorine-containing cyclic olefin polymer composition, the light irradiation time is controlled according to a product to be targeted, and thus, is not particularly limited. However, an integrated light quantity which is represented by a product of the light irradiation intensity of a light wavelength region and a light irradiation time can be usually set at 3 to 1000 mJ/cm$^2$, more preferably 5 to 500 mJ/cm$^2$, and particularly preferably 10 to 300 mJ/cm$^2$. If the integrated light quantity for the composition is less than 3 mJ/cm$^2$, generation of active species from the photopolymerization initiator is not sufficient, and there is a concern that the characteristics of the resulting cured product may be deteriorated, whereas if the integrated light quantity for the composition is more than 1000 mJ/cm$^2$, improvement of productivity may be reduced. In addition, it is sometimes preferable to use heating together with the process as above in order to promote the polymerization reaction. Further, the temperature in the case of curing a curable resin by light irradiation is usually preferably 0 to 150° C., and more preferably 0 to 60° C.

The film thickness of the cured resin (cured product) obtained by light irradiation is not particularly limited, but is preferably from 1 μm to 10 mm, more preferably from 5 μm to 1 mm, and most preferably from 10 μm to 0.5 mm. Within these ranges, an independent cured product can be obtained.

Regarding releasing the cured product, the cured product may be released from the replica mold by peeling-off, or the imprint product of the replica mold may be dissolved in the organic solvent, and then released therefrom. In addition, a resin material an inorganic material, such as glass may be attached to the back side of the cured product or the back side of the imprint product of the replica mold, and the substrate may be released as a support.

The release of the cured product by peeling-off is not particularly limited, but the cured product and the imprint product can be brought into contact by a process of dipping, spraying, or the like, using a medium such as, for example, water, and then be released using surface tension. Further, in the case of dissolving the imprint product in an organic solvent and then separating, the organic solvent for the separation is not particularly limited, but can be selected from, for example, fluorine-containing aromatic hydrocarbons such as meta-xylene hexafluoride, benzotrifluoride, fluorobenzene, difluorobenzene, hexafluorobenzene, trifluoromethyl benzene, bis(trifluoromethyl)benzene, meta-xylene hexafluoride, fluorine-containing aliphatic hydrocarbons such as perfluorohexane, perfluorooctane, fluorine-containing aliphatic cyclic hydrocarbons such as perfluorocyclodecalin, fluorine-containing ethers such as perfluoro-2-butyltetrahydrofuran, halogenated hydrocarbons such as chloroform, chlorobenzene, trichlorobenzene, ethers such as tetrahydrofuran, dibutyl ether, 1,2-dimethoxyethane, dioxane, esters such as ethyl acetate, propyl acetate, butyl acetate, and ketones such as methylisobutyl ketone, cyclohexanone, and the like, considering the solubility.

Examples of the photocurable monomer in the present invention include resins including, for example, a compound having a reactive double bond group, a cationically ring-opening polymerizable compound, and the like, in a similar way to the photocurable compound component constituting the fluorine-containing cyclic olefin polymer composition. These compounds may have one or plural reactive groups in one molecule. In addition, examples of the photopolymerization initiator include a photoradical initiator that generates radicals by light irradiation, a photocationic initiator that generates cations by light irradiation, and the like.

In the case of using a composition in which the photocurable compound and the photocuring initiator are mixed, the amount of the photocuring initiator to be used is preferably 0.05 parts by mass or more, and more preferably 0.1 to 10 parts by mass, with respect to 100 parts by mass of the photocurable compound.

Specific examples of the compound having a reactive double bond group include:

cyclic olefins such as norbornene, norbornadiene;

alkyl vinyl ethers such as cyclohexylmethyl vinyl ether, isobutyl vinyl ether, cyclohexyl vinyl ether, ethyl vinyl ether;

vinyl esters such as vinyl acetate;

(meth)acrylic acids and derivatives thereof, or fluorine-containing acrylates thereof, such as (meth)acrylic acid, phenoxyethyl acrylate, benzyl acrylate, stearyl acrylate, lauryl acrylate, 2-ethyl hexyl acrylate, allyl acrylate, 1,3-butanediol diacrylate, 1,4-butanediol diacrylate, 1,6-hexane diol diacrylate, trimethylolpropane triacrylate, pentaerythritol triacrylate, dipentaerythritol hexaacrylate, ethoxyethyl acrylate, methoxyethyl acrylate, glycidyl acrylate, tetrahydrofurfuryl acrylate, diethylene glycol diacrylate, neopentyl glycol diacrylate, polyoxyethylene glycol diacrylate, tripropylene glycol diacrylate, 2-hydroxyethyl acrylate, 2-hydroxypropyl acrylate, 4-hydroxybutyl vinyl ether, N,N-diethylaminoethyl acrylate, N,N-dimethylaminoethyl acrylate, N-vinyl pyrrolidone, dimethylaminoethyl methacrylate; and fluorodienes ($CF_2$=$CFOCF_2CF_2CF$=$CF_2$, $CF_2$=$CFOCF_2CF(CF_3)CF$=$CF_2$, $CF_2$=$CFCF_2C(OH)(CF_3)CH_2CH$=$CH_2$, $CF_2$=$CFCF_2C(OH)(CF_3)CH$=$CH_2$, $CF_2$=$CFCF_2C(CF_3)(OCH_2OCH_3)CH_2CH$=$CH_2$, $CF_2$=$CFCH_2C(C(CF_3)_2OH)(CF_3)$ $CH_2CH$=$CH_2$, and the like). These may be used individually or in combination of two or more kinds thereof.

Furthermore, specific examples of the cationically ring-opening polymerizable compound include epoxy compounds such as cyclohexene epoxide, dicyclopentadiene oxide, limonene dioxide, 4-vinylcyclohexene dioxide, 3,4-epoxycyclohexylmethyl-3',4'-epoxycyclohexanecarboxylate, di(3,4-epoxycyclohexyl)adipate, (3,4-epoxycyclohexyl)methyl alcohol, (3,4-epoxy-6-methylcyclohexyl)methyl-3,4-epoxy-6-methylcyclohexane carboxylate, ethylene 1,2-di(3,4-epoxycyclohexanecarboxylic acid) ester, (3,4-epoxycyclohexyl)ethyltrimethoxysilane, phenyl glycidyl ether, dicyclohexyl-3,3'-diepoxide, a bisphenol A type epoxy resin, a halogenated bisphenol A type epoxy resin, a bisphenol F type epoxy resin, an o-, m-, or p-cresol novolak type epoxy resin, a phenol novolak type epoxy resin, a polyglycidyl ether of a polyhydric alcohol, an alicyclic epoxy resin such as 3,4-epoxycyclohexenylmethyl-3',4'-epoxycyclohexene carboxylate, or epoxy compounds such as glycidyl ether of hydrogenation bisphenol A, and the like;

oxetane compounds such as 3-methyl-3-(butoxymethyl) oxetane, 3-methyl-3-(pentyloxymethyl)oxetane, 3-methyl-3-(hexyloxymethyl)oxetane, 3-methyl-3-(2-ethylhexyloxymethyl)oxetane, 3-methyl-3-(octyloxymethyl)oxetane, 3-methyl-3-(decanoloxymethyl)oxetane, 3-methyl-3-(dodecanoloxymethyl)oxetane, 3-methyl-3-(phenoxymethyl)oxetane, 3-ethyl-3-(butoxymethyl)oxetane, 3-ethyl-3-(pentyloxymethyl)oxetane, 3-ethyl-3-(hexyloxymethyl)oxetane, 3-ethyl-3-(2-ethylhexyloxymethyl)oxetane, 3-ethyl-3-(octyloxymethyl)oxetane, 3-ethyl-3-(decanoloxymethyl)oxetane, 3-ethyl-3-(dodecanoloxymethyl)oxetane,
3-(cyclohexyloxymethyl)oxetane,
3-methyl-3-(cyclohexyloxymethyl)oxetane,
3-ethyl-3-(cyclohexyloxymethyl)oxetane,
3-ethyl-3-(phenoxymethyl)oxetane, 3,3-dimethyloxetane,
3-hydroxymethyloxetane, 3-methyl-3-hydroxymethyloxetane,
3-ethyl-3-hydroxymethyloxetane, 3-ethyl-3-phenoxymethyloxetane,
3-n-propyl-3-hydroxymethyloxetane,
3-isopropyl-3-hydroxymethyloxetane,
3-n-butyl-3-hydroxymethyloxetane,
3-isobutyl-3-hydroxymethyloxetane,
3-sec-butyl-3-hydroxymethyloxetane,
3-tert-butyl-3-hydroxymethyloxetane, 3-ethyl-3-(2-ethyl hexyl)oxetane, and the like;

compounds having two or more oxetanyl groups, such as oxetane compounds including bis(3-ethyl-3-oxetanylmethyl) ether,
1,2-bis[(3-ethyl-3-oxetanylmethoxy)]ethane,
1,3-bis[(3-ethyl-3-oxetanylmethoxy)]propane,
1,3-bis[(3-ethyl-3-oxetanylmethoxy)]-2,2-dimethyl-propane,
1,4-bis(3-ethyl-3-oxetanylmethoxy)butane,
1,6-bis(3-ethyl-3-oxetanylmethoxy)hexane,
1,4-bis[(3-methyl-3-oxetanyl)methoxy]benzene,
1,3-bis[(3-methyl-3-oxetanyl)methoxy]benzene,
1,4-bis{[(3-methyl-3-oxetanyl)methoxy]methyl}benzene,
1,4-bis{[(3-methyl-3-oxetanyl)methoxy] methyl}cyclohexane,
4,4'-bis{[(3-methyl-3-oxetanyl)methoxy]methyl}biphenyl,
4,4'-bis{[(3-methyl-3-oxetanyl)methoxy] methyl}bicyclohexane,
2,3-bis[(3-methyl-3-oxetanyl)methoxy]bicyclo[2.2.1]heptane,
2,5-bis[(3-methyl-3-oxetanyl)methoxy]bicyclo[2.2.1]heptane,
2,6-bis[(3-methyl-3-oxetanyl)methoxy]bicyclo[2.2.1]heptane,
1,4-bis[(3-ethyl-3-oxetanyl)methoxy]benzene,
1,3-bis[(3-ethyl-3-oxetanyl)methoxy]benzene,
1,4-bis{[(3-ethyl-3-oxetanyl)methoxy]methyl}benzene,
1,4-bis{[(3-ethyl-3-oxetanyl)methoxy]methyl}cyclohexane,
4,4'-bis{[(3-ethyl-3-oxetanyl)methoxy]methyl}biphenyl,
4,4'-bis{[(3-ethyl-3-oxetanyl)methoxy] methyl}bicyclohexane,
2,3-bis[(3-ethyl-3-oxetanyl)methoxy]bicyclo[2.2.1]heptane,
2,5-bis[(3-ethyl-3-oxetanyl)methoxy]bicyclo[2.2.1]heptane,
2,6-bis[(3-ethyl-3-oxetanyl)methoxy]bicyclo[2.2.1]heptane.

Further, these may be used individually or in combination of two or more kinds thereof.

Furthermore, examples of the photoradical initiator that generates radicals by light irradiation include acetophenones such as acetophenone, p-tert-butyltrichloroacetophenone, chloroacetophenone, 2,2-diethoxyacetophenone, hydroxyacetophenone, 2,2-dimethoxy-2'-phenylacetophenone, 2-aminoacetophenone, dialkylaminoacetophenone;

benzoins such as benzoin, benzoin methyl ether, benzoin ethyl ether, benzoin isopropyl ether, benzoin isobutyl ether, 1-hydroxycyclohexylphenyl ketone,
2-hydroxy-2-methyl-1-phenyl-2-methyl propan-1-one,
1-(4-isopropylphenyl)-2-hydroxy-2-methyl propan-1-one;

benzophenones such as benzophenone, benzoyl benzoic acid, methyl benzoyl benzoate, methyl-o-benzoyl benzoate, 4-phenylbenzophenone, hydroxybenzophenone, hydroxypropylbenzophenone, acrylbenzophenone, 4,4'-bis(dimethylamino)benzophenone;

thioxanthones such as thioxanthone, 2-chlorothioxanthone, 2-methylthioxanthone, diethylthioxanthone, dimethylthioxanthone;

fluorine-based peroxides such as perfluoro(tert-butyl peroxide), perfluorobenzoyl peroxide;

α-acyloxime ester, benzyl-(o-ethoxycarbonyl)-α-monooxime, acylphosphine oxide, glyoxyester, 3-ketocoumarin, 2-ethylanthraquinone, camphorquinone, tetramethylthiuram sulfide, azobisisobutyronitrile, benzoyl peroxide, dialkyl peroxide, tert-butylperoxy pivalate, and the like. Further, these photoradical initiators may be used individually or in combination of two or more kinds thereof.

The photocationic initiator that generates cations by light irradiation is not particularly limited as long as it is a compound that initiates the cation polymerization of the above-described ring-opening polymerizable compounds that are cationically polymerizable with light irradiation, but, for example, a compound that discharges Lewis acids by performing a photoreaction, as with an onium salt with an anion that pairs with an onium cation is preferable.

Specific examples of the onium cation include diphenyliodonium, 4-methoxydiphenyliodonium, bis(4-methylphenyl)iodonium, bis(4-tert-butylphenyl)iodonium, bis(dodecylphenyl)iodonium, triphenylsulfonium, diphenyl-4-thiophenoxyphenylsulfonium, bis[4-(diphenylsulfonio)-phenyl]sulfide, bis[4-(di(4-(2-hydroxyethyl)phenyl)sulfonio)-phenyl]sulfide, η5-2,4-(cyclopentadienyl)[1,2,3,4,5,6-η-(methylethyl)benzene]-iron (1+), and the like and further include, in addition to the onium cations, perchlorate ions, trifluoromethane sulfonate ions, toluene sulfonate ions, trinitrotoluene sulfonate ions, and the like.

On the other hand, specific examples of the anion include tetrafluoroborate, hexafluorophosphate, hexafluoroantimonate, hexafluoroarsenate, hexachloroantimonate, tetra(fluorophenyl)borate, tetra(difluorophenyl)borate, tetra(trifluorophenyl)borate, tetra(tetrafluorophenyl)borate, tetra(pentafluorophenyl)borate, tetra(perfluorophenyl)borate, tetra(trifluoromethylphenyl)borate, tetra(di(trifluoromethyl)phenyl)borate, and the like. Further, these photocationic initiators may be used individually or in combination of two or more kinds thereof.

Furthermore, in the present invention, in addition to the monomer having a photocurable group and the photopolymerization initiator, other known components may be added, if necessary. Examples of such other components include modifiers such as an anti-aging agent, a leveling agent, a wettability improver, a surfactant, a plasticizer, stabilizers such as an ultraviolet absorber, a preservative, an antimicrobial agent, a photosensitizing agent, a silane coupling agent, a solvent.

In the present invention, it is also possible to use a thermosetting monomer composition instead of the photocurable monomer composition. In the case of using the thermosetting monomer composition, it is preferable to cure at a temperature that is no higher than the glass transition temperature of the fluorine-containing cyclic olefin polymer (A), and if curing is performed at a temperature equal to or higher than the above temperature, the fine pattern may be deformed in some cases.

EXAMPLES

Hereinafter, the present invention will be described with reference to the Examples, but is by no means limited thereto. Further, the measurement method for analytical values of the prepared polymers, the nanoimprint molding method, and the observation method thereof in Examples will be described below.

[Weight Average Molecular Weight (Mw), Molecular Weight Distribution (Mw/Mn)]

By means of gel permeation chromatography (GPC) under the following condition, the weight average molecular weight (Mw) and the number average molecular weight (Mn) of the polymer dissolved in tetrahydrofuran (THF) or trifluoromethyltoluene (TFT) were measured with molecular-weight calibration relative to polystyrene standards.

Detector: RI-2031 and 875-UV manufactured by JASCO Corp. or Model 270 manufactured by Viscotec Corp., columns connected in series: Shodex K-806 M, 804, 803, 802.5, column temperature: 40° C., flow rate: 1.0 ml/minute, sample concentration: 3.0 to 9.0 mg/ml

[Hydrogenation Rate of Fluorine-Containing Cyclic Olefin Polymer (A)]

A powder of a ring-opening metathesis polymer which had been subjected to a hydrogenation reaction was dissolved in deuterated chloroform, or deuterated tetrahydrofuran, or a mixed solvent of hexafluorobenzene and deuterated chloroform, and the hydrogenation rate was calculated from the integral value of the absorption spectrum derived from hydrogen bonded to the double bond carbons in the main chain at $\delta=4.5$ to 7.0 ppm, using a 270 MHz-$^1$H-NMR spectrum.

[Compositional Ratio of Fluorine-Containing Cyclic Olefin Copolymer]

A powder of a ring-opening metathesis polymer which had been subjected to a hydrogenation reaction was dissolved in deuterated tetrahydrofuran, or a mixed solvent of hexafluorobenzene and deuterated chloroform, followed by addition of orthodifluorobenzene thereto as a reference substance, and the composition ratio was calculated from the integral value of the signals derived from —CF at $\delta=-150$ to $-200$ ppm, —CF$_2$ at $\delta=-100$ to $-150$ ppm, and —CF$_3$ at $\delta=-60$ to $-100$ ppm in the respective unit structures of the general formula (1) and the general formula (2) with the orthodifluorobenzene at $\delta=-139$ ppm set as the reference signal, using a 373 MHz-$^{19}$F-NMR spectrum.

[Fluorine Atom Content Rate]

The fluorine atom content rate was calculated by the following equation (1).

$$\text{Fluorine atom content rate}(\% \text{ by mass}) = (Fn \times 19) \times 100 / Fw \quad (1)$$

Herein, in equation (1), Fn represents $Fn^1 \times (1-m) + Fn^2 \times m$, wherein m represents a molar proportion of the general formula (2), $Fn^1$ and $Fn^2$ represent the number of fluorine atoms in the structural unit represented by the general formula (1) and the general formula (2), respectively; Fw represents $Fw^1 \times (1-m) + Fw^2 \times m$, wherein $Fw^1$ and $Fw^2$ represent the formula weight of the structural unit represented by the general formula (1) and the general formula (2), respectively.

[Glass Transition Temperature]

A measurement sample was analyzed using DSC-50 manufactured by Shimadzu Corp., at 10° C./min as the heating rate of increase in temperature under a nitrogen atmosphere.

[Measurement of Dynamic Mechanical Analysis]

A measurement sample was analyzed using RSA-III manufactured by TA Instruments in a tensile mode and under a nitrogen atmosphere, under the conditions of a rate of temperature increase of 3° C./min, an analysis frequency of 1 Hz, and a measurable distance of a sample deformation between chucks in dynamic mechanical analyzer was set in the range of 0 to 4.2 mm.

[Observation of SEM Pattern]

The observation of the line-and-space and the cross-section of a imprint film product to which a fine pattern had been transcribed, and the measurement of film thickness were carried out by using a scanning electron microscope JSM-6701F manufactured by JASCO Corp. (hereinafter, indicated as SEM). The width of the lines and spaces was obtained by selecting arbitrary the pattern of three points from a cross-sectional photograph of SEM, measuring the lines and spaces with the measurement position set at one-half of the height, and calculating the average value.

[Mold Used in Imprint]

A silicone mold manufactured by Kyodo International Inc. was used, and for the mold dimensions, the width of a convex portion was denoted as L1, the equal distance between the convexes was denoted as L2, and the height of the convex portion was denoted as L3, and portions including a pattern having the dimensions of the mold A of L1=420 nm, L2=570 nm, and L3=1600 nm, respectively, and the dimensions of the mold B of L1=200 nm, L2=100 nm, and L3=160 nm, were used for evaluation of the transcription ability.

[UV Curing]

For curing of the coating film, blue light at 320 to 390 nm (electrode less discharge lamp•D bulb) was irradiated to cure, using the UV irradiator manufactured by Fusion UV Systems Japan K. K. as a light source.

[Measurement of Scratch Hardness of Film According to Pencil Method]

The scratch hardness under a load of 100 g was measured using a film spin-coated on a glass substrate, in accordance with JIS K5600-5-4 (pencil scratch test method).

[Measurement of Linear Expansion Coefficient of Film]

Using a TMASS120 manufactured by SII (Seiko Instrument Company), a sample with dimensions of 4 mm (width)× 10 mm (distance between the chucks) was cut from a film having a thickness of 9 to 10 μm peeled from a glass substrate on which the film had been coated, and by a tensile mode, the sample was heated from 20° C. to a temperature at which the sample was extended by 1 mm under a load of 1.0 g, at a temperature increase rate of 5 mm/min, and then measured. The linear expansion coefficient was analyzed from the temperature in the range from a softening point to a temperature at which the sample was extended by 1 mm and the extension rate of the film.

[Measurement of UV Transmittance]

An independent film having a thickness of 7 to 9 μm, peeled from a glass substrate, on which the film had been coated, using a UV-3100S manufactured by Shimadzu Corporation, and measured.

Example 1

Synthesis of poly(1,1,2-trifluoro-2-trifluoromethyl-3,5-cyclopentylene ethylene)

To a solution of 5,5,6-trifluoro-6-(trifluoromethyl)bicyclo [2.2.1]hept-2-ene (100 g) and 1-hexene (268 mg) in tetrahydrofuran was added a solution of Mo(N-2,6-Pr$^i_2$C$_6$H$_3$)(CHCMe$_2$Ph)(OCMe(CF$_3$)$_2$)$_2$ (70 mg) in tetrahydrofuran solution, followed by carrying out ring-opening metathesis polymerization at 70° C. The olefin portion of the polymer thus obtained was subjected to a hydrogenation reaction at 160° C. with palladium alumina (5 g) to obtain a solution of poly(1,1,2-trifluoro-2-trifluoromethyl-3,5-cyclopentylene ethylene) in tetrahydrofuran.

The solution was added to methanol, and a white polymer was separated by filtration and dried to obtain 99 g of a polymer. The hydrogenation rate was 100%, the weight average molecular weight (Mw) was 127000, the molecular weight distribution (Mw/Mn) was 1.70, the glass transition temperature was 109° C., and the fluorine atom content rate was 52.3% by mass.

Subsequently, the obtained polymer powder after the hydrogenation was hot-pressed to produce a hot-pressed sheet having a thickness of 0.37 mm. As seen from the results of the measurement of the dynamic mechanical analysis by tensile mode, the storage modulus in the range from 113° C. to 152° C. was from 5.81 to 0.57 MPa, the loss modulus in the range from 117° C. to 152° C. was from 3.05 to 0.27 MPa, and the change in the storage modulus and the change in the loss modulus with respect to the temperature were −0.13 MPa/° C. and −0.08 MPa/° C., respectively, in the flat variable region of the storage modulus or the loss modulus, at a temperature equal to or higher than the glass transition temperature.

Example 2

Synthesis of poly(1,1,2-trifluoro-2-trifluoromethyl-3, 5-cyclopentylene ethylene)

In the same manner as in Example 1 except that the catalyst was changed to Mo(N-2,6-Pr$^i_2$C$_6$H$_3$)(CHCMe$_2$Ph)(OBu$^t$)$_2$ (50 mg), poly(1,1,2-trifluoro-2-trifluoromethyl-3,5-cyclopentyleneethylene) was obtained (98 g). The hydrogenation rate was 100%, the weight average molecular weight (Mw) was 83000, the molecular weight distribution (Mw/Mn) was 1.73, the glass transition temperature was 108° C., and the fluorine atom content rate was 52.3% by mass.

Subsequently, the obtained polymer powder after the hydrogenation was hot-pressed to produce a hot-pressed sheet having a thickness of 0.37 mm. As seen from the results of the measurement of the dynamic mechanical analysis by tensile mode, the storage modulus in the range from 109° C. to 150° C. was from 4.98 to 0.58 MPa, the loss modulus in the range from 113° C. to 150° C. was from 2.96 to 0.31 MPa, and the change in the storage modulus and the change in the loss modulus with respect to the temperature were −0.12 MPa/° C. and −0.07 MPa/° C., respectively, in the flat variable region of the storage modulus or the loss modulus, at a temperature equal to or higher than the glass transition temperature.

Example 3

Synthesis of poly(1,2-difluoro-1-trifluoromethyl-2-perfluoroethyl-3,5-cyclopentylene ethylene)

In the same manner as in Example 1 except that the monomer was changed to 5,6-difluoro-5-trifluoromethyl-6-perfluoroethylbicyclo[2.2.1]hept-2-ene (50 g) and the catalyst was changed to Mo(N-2,6-Pr$^i_2$C$_6$H$_3$)(CHCMe$_2$Ph)(OBu$^t$)$_2$ (17 mg), poly(1,2-difluoro-1-trifluoromethyl-2-perfluoroethyl-3,5-cyclopentyleneethylene) was obtained (49 g). The hydrogenation rate was 100%, the weight average molecular weight (Mw) was 95000, the molecular weight distribution (Mw/Mn) was 1.52, the glass transition temperature was 110° C., and the fluorine atom content rate was 59.7% by mass.

Subsequently, the obtained polymer powder after the hydrogenation was hot-pressed to produce a hot-pressed sheet having a thickness of 0.37 mm. As seen from the results of the measurement of the dynamic mechanical analysis by tensile mode, the storage modulus in the range from 115° C. to 160° C. was from 5.01 to 0.55 MPa, the loss modulus in the range from 119° C. to 160° C. was from 3.10 to 0.24 MPa, and the change in the storage modulus and the change in the loss modulus with respect to the temperature were −0.12 MPa/° C. and −0.07 MPa/° C., respectively, in the flat variable region of the storage modulus or the loss modulus, at a temperature equal to or higher than the glass transition temperature.

Example 4

Synthesis of 5,5,6-trifluoro-6-(trifluoromethyl)bicyclo[2.2.1]hept-2-ene and 8,8,9-trifluoro-9-(trifluoromethyl)-tetracyclo[4.4.0.1$^{2,5}$.1$^{7,10}$]-3-dodecene copolymer To a solution of 5,5,6-trifluoro-6-(trifluoromethyl)bicyclo[2.2.1]hept-2-ene (50 g) and 8,8,9-trifluoro-9-(trifluoromethyl)-tetracyclo[4.4.0.1$^{2,5}$.1$^{7,10}$]-3-dodecene (22 g) and 1-hexene (0.462 g) in tetrahydrofuran was added a solution of Mo(N-2,6-Pr$^i_2$C$_6$H$_3$)(CHCMe$_2$Ph)(OBu$^t$)$_2$ (33.9 mg) in tetrahydrofuran, followed by carrying out ring-opening metathesis polymerization at 70° C. The olefin portion of the polymer thus obtained was subjected to a hydrogenation reaction at 160° C. with palladium alumina (3.6 g) to obtain a solution of a 5,5,6-trifluoro-6-(trifluoromethyl)bicyclo[2.2.1]hept-2-ene and 8,8,9-trifluoro-9-(trifluoromethyl)-tetracyclo[4.4.0.1$^{2,5}$.1$^{7,10}$]-3-dodecene copolymer in tetrahydrofuran. The solution was added to methanol, and the white polymer was separated by filtration and dried to obtain 71 g of the polymer. The hydrogenation rate was 100%, the weight average molecular weight (Mw) was 98000, the molecular weight distribution (Mw/Mn) was 2.51, the glass transition temperature was 129° C., the compositional ratio [I]/[II] was 75/25, and the fluorine atom content was 49.2% by mass.

Subsequently, the obtained polymer powder after the hydrogenation was hot-pressed to produce a hot-pressed sheet having a thickness of 0.37 mm. As seen from the results of the measurement of the dynamic mechanical analysis by tensile mode, the storage modulus in the range from 149° C. to 175° C. was from 4.78 to 0.39 MPa, the loss modulus in the range from 154° C. to 175° C. was from 4.80 to 0.19 MPa, and the change in the storage modulus and the change in the loss modulus with respect to the temperature were −0.17 MPa/° C. and −0.22 MPa/° C., respectively, in the flat variable region of the storage modulus or the loss modulus, at a temperature equal to or higher than the glass transition temperature.

Example 5

Producing of Imprint Product

To 50 g of a solution in which poly(1,1,2-trifluoro-2-trifluoromethyl-3,5-cyclopentylene ethylene) with Mw=127000 synthesized in Example 1 was dissolved at a concentration of 27% by mass in cyclohexanone was added 13.5 g of a solution including 1.0% by mass of a UV-curable resin monomer represented by the general formula (10) (U15-HA, manufactured by Shin-Nakamura Chemical Co., Ltd.) and 0.03% by mass of a photopolymerization initiator (Esacure-KT046, manufactured by Lamberti Co.) in 2-methoxyethanol, and 20 mg of the solution thus obtained was added dropwise onto the pattern of the mold A, and uniformly coated by spin coating.

Subsequently, it was dried at room temperature for 30 minutes under nitrogen gas flow, then dried at 180° C. for 30 minutes, and was cooled to room temperature. The curable resin was cured with UV irradiation at a light quantity of 500 mJ/cm$^2$, and then peeled from the mold to obtain an imprint product in the form of a film having a film thickness of 8 μm, having a fine pattern transcribed thereon. The pattern was observed by means of SEM, and the results were as follows: L1=569 nm, L2=421 nm, and L3=1595 nm.

Furthermore, the pencil hardness of the film formed from the solution coated on the glass substrate was HB, the average transmittance at 345 to 385 nm of the peeled film having a thickness of 9 μm was 92.9%, and the linear expansion coefficient at a softening point in the range from 107° C. to 124° C. of the film having a thickness of 9 μm was 0.52%/° C.

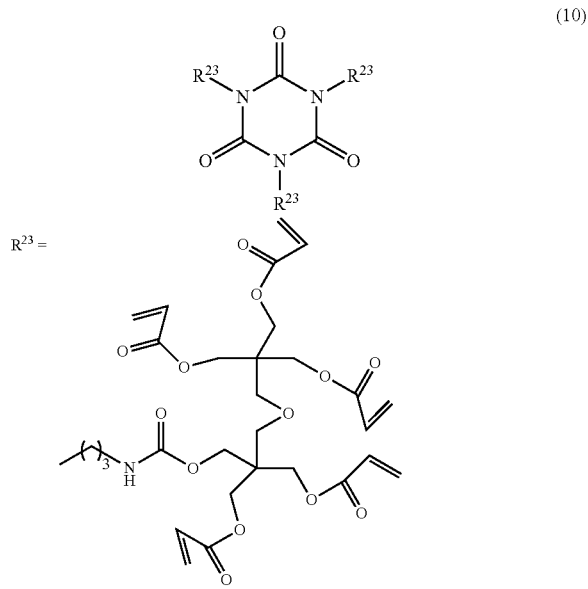

(10)

Example 6

To 50 g of a solution in which poly(1,1,2-trifluoro-2-trifluoromethyl-3,5-cyclopentylene ethylene) with Mw=83000 synthesized in Example 2 was dissolved at a concentration of 27% by mass in cyclohexanone was added 13.5 g of a solution including 1.0% by mass of the UV-curable resin monomer and 0.03% by mass of the photopolymerization initiator, each described in Example 5, in 2-methoxyethanol, and 20 mg of the solution thus obtained was added dropwise onto the pattern of the mold A, and uniformly coated by spin coating. Subsequently, it was dried at room temperature for 30 minutes under nitrogen gas flow, then dried at 180° C. for 30 minutes, and was cooled to room temperature. The curable resin was cured with UV irradiation at a light quantity of 500 mJ/cm², and then peeled from the mold to obtain an imprint product in the form of a film having a film thickness of 7 μm and a fine pattern transcribed thereon. The pattern was observed by means of SEM, and the results were as follows: L1=571 nm, L2=419 nm, and L3=1594 nm. Furthermore, the pencil hardness of the film formed from the solution coated on the glass substrate was HB, and the average transmittance at 345 to 385 nm of the peeled film having a thickness of 7 μm was 93.0%.

Example 7

In the same manner as in Example 5 except that the mold A was changed to the mold B in Example 5, an imprint product in the form of a film was produced. The film thickness was 7 μm, and the results from SEM observation of the pattern were as follows: L1=101 nm, L2=199 nm, and L3=161 nm.

Example 8

To 50 g of a solution in which poly(1,1,2-trifluoro-2-trifluoromethyl-3,5-cyclopentylene ethylene) with Mw=127000 synthesized in Example 1 was dissolved at a concentration of 27% by mass in cyclohexanone was added 13.5 g of a solution including 3.0% by mass of the UV-curable resin monomer and 0.09% by mass of the photopolymerization initiator, each described in Example 5, in 2-methoxyethanol, and 20 mg of the solution thus obtained was added dropwise onto the pattern of the mold A, and uniformly coated by spin coating.

Subsequently, it was dried at room temperature for 30 minutes under nitrogen gas flow, then dried at 180° C. for 30 minutes, and was cooled to room temperature. The curable resin was cured with UV irradiation at a light quantity of 500 mJ/cm², and then peeled from the mold to obtain an imprint product in the form of a film having a film thickness of 9 μm and a fine pattern transcribed thereon. The pattern was observed by means of SEM, and the results were as follows: L1=571 nm, L2=419 nm, and L3=1594 nm. Furthermore, the pencil hardness of the film formed from the solution coated on the glass substrate was F, the average transmittance at 345 to 385 nm of the peeled film having a thickness of 10 μm was 88.9%, and the linear expansion coefficient at a softening point in the range from 108° C. to 139° C. of the film having a thickness of 10 μm was 0.31%/° C.

Example 9

By the same method as in Example 5 except that the UV-curable resin monomer was changed to a monomer represented by the general formula (11) (PE-4A, manufactured by Kyoeisha Chemical Co., Ltd.), an imprint product in the form of a film having a film thickness of 8 μm and a fine pattern transcribed thereon was obtained. The pattern was observed by means of SEM, and the results were as follows: L1=570 nm, L2=420 nm, and L3=1595 nm. Furthermore, the pencil hardness of the film formed from the solution coated on the glass substrate was HB, and the average transmittance at 345 to 385 nm of the peeled film having a thickness of 8 μm was 94.2%.

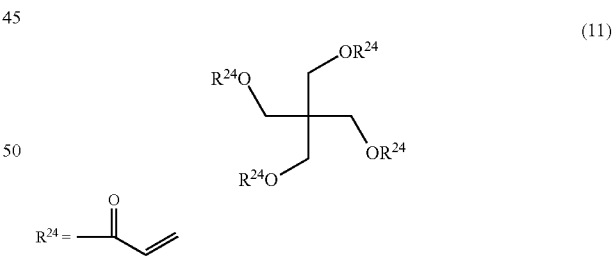

(11)

Example 10

By the same method as in Example 5 except that the UV-curable resin monomer was changed to a monomer represented by the general formula (12) (A-9530, manufactured by Shin-Nakamura Chemical Co., Ltd.), an imprint product in the form of a film having a film thickness of 9 μm and a fine pattern transcribed thereon was obtained. The pattern was observed by means of SEM, and the results were as follows: L1=571 nm, L2=419 nm, and L3=1594 nm. Furthermore, the pencil hardness of the film formed from the solution coated on the glass substrate was HB, and the average transmittance at 345 to 385 nm of the peeled film having a thickness of 9 μm was 93.2%.

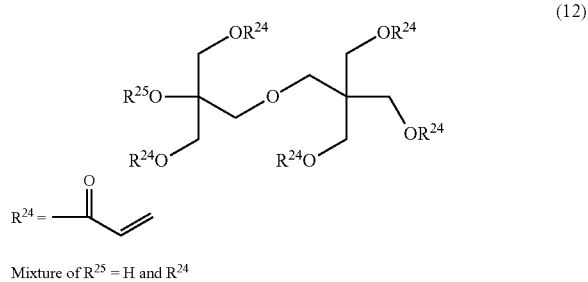

(12)

Mixture of $R^{25}$ = H and $R^{24}$

Example 11

By the same method as in Example 5 except that the UV-curable resin monomer was changed to a UV-curable hard coating agent (FH-900, manufactured by DIC), an imprint product in the form of a film having a film thickness of 8 μm and a fine pattern transcribed thereon was obtained. The pattern was observed by means of SEM, and the results were as follows: L1=570 nm, L2=420 nm, and L3=1595 nm. Furthermore, the pencil hardness of the film formed from the solution coated on the glass substrate was HB, and the average transmittance at 345 to 385 nm of the peeled film having a thickness of 8 μm was 94.8%.

Example 12

To 50 g of a solution in which poly(1,2-difluoro-1-trifluoromethyl-2-perfluoroethyl-3,5-cyclopentylene ethylene) with Mw=95000 synthesized in Example 3 was dissolved at a concentration of 20% by mass in cyclohexanone was added 13.5 g of a solution including 1.0% by mass of the UV-curable resin monomer and 0.03% by mass of the photopolymerization initiator, each described in Example 5, in 2-methoxyethanol, and 20 mg of the solution thus obtained was added dropwise onto the pattern of the mold A, and uniformly coated by spin coating.

Subsequently, it was dried at room temperature for 30 minutes under nitrogen gas flow, then dried at 180° C. for 30 minutes, and was cooled to room temperature. The curable resin was cured with UV irradiation at a light quantity of 500 mJ/cm$^2$, and then peeled from the mold to obtain an imprint product in the form of a film having a film thickness of 8 μm and a fine pattern transcribed thereon. The pattern was observed by means of SEM, and the results were as follows: L1=569 nm, L2=421 nm, and L3=1594 nm. Furthermore, the pencil hardness of the film formed from the solution coated on the glass substrate was HB, and the average transmittance at 345 to 385 nm of the peeled film having a thickness of 8 μm was 95.4%.

Example 13

To 50 g of a solution in which the 5,5,6-trifluoro-6-(trifluoromethyl)bicyclo[2.2.1]hept-2-ene and 8,8,9-trifluoro-9-(trifluoromethyl)-tetracyclo[4.4.0.1$^{2,5}$.1$^{7,19}$]-3-dodecene copolymer with Mw=98000 synthesized in Example 4 was dissolved at a concentration of 27% by mass in cyclohexanone was added 13.5 g of a solution including 1.0% by mass of the UV-curable resin monomer and 0.03% by mass of the photopolymerization initiator, each described in Example 5, in 2-methoxyethanol, and 20 mg of the solution thus obtained was added dropwise onto the pattern of the mold A, and uniformly coated by spin coating.

Subsequently, it was dried at room temperature for 30 minutes under nitrogen gas flow, then dried at 180° C. for 30 minutes, and was cooled to room temperature. The curable resin was cured with UV irradiation at a light quantity of 500 mJ/cm$^2$, and then peeled from the mold to obtain an imprint product in the form of a film having a film thickness of 9 μm and a fine pattern transcribed thereon. The pattern was observed by means of SEM, and the results were as follows: L1=570 nm, L2=420 nm, and L3=1595 nm. Furthermore, the pencil hardness of the film formed from the solution coated on the glass substrate was F, and the average transmittance at 345 to 385 nm of the peeled film having a thickness of 9 μm was 92.1%.

Example 14

Production of Curable Acrylic Resin Imprint Product by Replica Mold 60 mg of a UV-curable acrylic resin (ARONIX, manufactured by Toagosei Co., Ltd.) was uniformly coated on a quartz glass by bar coating.

Subsequently, the imprint product in the form of a film, obtained from the poly(1,1,2-trifluoro-2-trifluoromethyl-3,5-cyclopentylene ethylene) composition produced in Example 5 as a replica mold was pressed and covered so as to put its pattern surface onto the coated liquid film, and then irradiated with UV for 15 minutes from the back side of the replica mold at room temperature (radiation quantity: 34 mJ/cm$^2$). By performing the peeling from the mold after irradiation, an imprint product in the form of a film having a film thickness of 70 μm and a fine pattern transcribed thereon, was obtained. The pattern was observed by means of SEM, and the results were as follows: L1=420 nm, L2=570 nm, and L3=1595 nm.

Example 15

Production of Curable Epoxy-Based Resin Imprint Product by Replica Mold 45 mg of a curable epoxy-based resin (a mixture of 40% by mass of 4,4'-bis(7-oxabicyclo[4.1.0]heptan-3-yl), 50% by mass of 3-ethyl-3-(phenoxymethyl)oxetane, and 10% by mass of 1,4-bis[((3-ethyloxetan-3-yl)methoxy)methyl]benzene) with a sulfonium salt being used as an initiator was uniformly coated on a quartz glass by bar coating.

Subsequently, the imprint product in the form of a film, obtained from the poly(1,1,2-trifluoro-2-trifluoromethyl-3,5-cyclopentylene ethylene) composition produced in Example 5 as a replica mold was pressed and covered so as to put its pattern surface onto the coated liquid film, and then irradiated with UV for 15 minutes from the back side of the replica mold at room temperature (radiation quantity: 34 mJ/cm$^2$). By performing the peeling from the mold after irradiation, an imprint product in the form of a film having a film thickness of 60 μm and a fine pattern transcribed thereon, was obtained. The pattern was observed by means of SEM, and the results were as follows: L1=421 nm, L2=569 nm, and L3=1596 nm.

Example 16

To 42 g of a solution in which poly(1,1,2-trifluoro-2-trifluoromethyl-3,5-cyclopentylene ethylene) with Mw=83000 synthesized in Example 2 was dissolved at a concentration of 60% by mass in methylethyl ketone was added 8 g of a solution including 0.8 g (1.6% by mass) of a UV-curable resin monomer represented by the general formula (13) (DENACOL EX-411, manufactured by Nagase Chemtex Corporation), 7.0 g (14% by mass) of di[2-(3-oxetanyl)butyl]ether (manufactured by Toagosei Co., Ltd.), and 0.016 g (0.3% by mass) of a photocation initiator (ADEKA OPTOMER SP-172, manufactured by Adeka Corporation) as a photopolymerization initiator in methylethyl ketone, and 20 mg of the coating liquid thus obtained was added dropwise onto the pattern of the mold A, and uniformly coated by spin coating.

Subsequently, it was dried at 60° C. for 5 minutes and was cooled to room temperature. The curable resin was cured with UV irradiation at a light quantity of 500 mJ/cm$^2$, and then peeled from the mold to obtain an imprint product in the form of a film having a film thickness of 9 μm and a fine pattern transcribed thereon. The pattern was observed by means of SEM, and the results were as follows: L1=570 nm, L2=420 nm, and L3=1595 nm. Furthermore, the pencil hardness of the film having the solution coated on the glass substrate was B, and the average transmittance at 345 to 385 nm of the peeled film having a thickness of 8 μm was 94.2%.

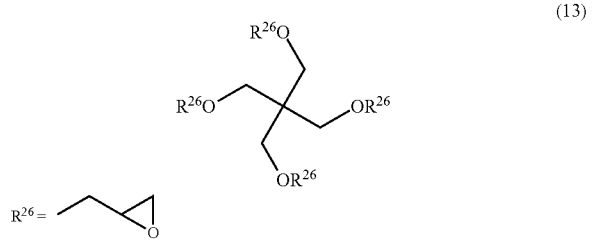

(13)

Comparative Example 1

20 mg of a solution in which poly(1,1,2-trifluoro-2-trifluoromethyl-3,5-cyclopentylene ethylene) with Mw=127000 synthesized in Example 1 was dissolved at a concentration of 20% by mass in cyclohexanone was added dropwise onto the pattern of the mold A, and uniformly coated by spin coating.

Subsequently, it was dried at room temperature for 30 minutes under nitrogen gas flow, and then dried at 180° C. for 30 minutes. The mold was cooled to room temperature under nitrogen, followed by performing the peeling from the mold, to obtain an imprint product in the form of a film having a film thickness of 8 μm and a fine pattern transcribed thereon. The pattern was observed by means of SEM, and the results were as follows: L1=568 nm, L2=422 nm, and L3=1594 nm. Furthermore, the pencil hardness of the film having the solution coated on the glass substrate was 4B, the average transmittance at 345 to 385 nm of the peeled film having a thickness of 10 μm was 95.1%, and the linear expansion coefficient at a softening point in the range from 108° C. to 118° C. of the film having a thickness of 9 μm was 0.93%/° C.

Comparative Example 2

Synthesis of poly(1-trifluoromethyl-3,5-cyclopentylene ethylene) and production of imprint product by coating method In the same manner as in Example 1 except that the monomer was changed to 5-(trifluoromethyl)bicyclo[2.2.1]hept-2-ene (10 g), poly(1-trifluoromethyl-3,5-cyclopentylene ethylene) (9 g) was obtained. The hydrogenation rate was 100%, the weight average molecular weight (Mw) was 98000, the molecular weight distribution (Mw/Mn) was 1.17, the glass transition temperature was 47° C., and the fluorine atom content rate was 34.7% by mass.

From the results of the dynamic mechanical analysis by tensile mode using a hot-press sheet having a thickness of 0.37 mm, the flat variable region of the storage modulus or the loss modulus was not seen in the temperature region of the glass transition temperature or higher, the storage modulus and the loss modulus in the range from 48° C. to 57° C. were from 92.3 to 0.11 MPa and from 97.1 to 0.13 MPa, respectively, and the change in the storage modulus and the change in the loss modulus with respect to the temperature were −10.2 MPa/° C. and −10.8 MPa/° C., respectively.

Subsequently, 23 mg of a solution in which poly(1-trifluoromethyl-3,5-cyclopentylene ethylene) thus obtained was dissolved at a concentration of 20% by mass in cyclohexanone was added dropwise onto the pattern of the mold A, and uniformly coated by bar coating. It was dried at room temperature for 30 minutes under nitrogen gas flow, and then dried at 180° C. for 30 minutes. The mold was cooled to 5° C. under nitrogen, followed by performing the peeling from the mold, to obtain an imprint product in the form of a film having a film thickness of 7 μm and a fine pattern transcribed thereon. The pattern was observed by means of SEM, and found to be in the shape of a distorted line with L1=569 to 598 nm.

Comparative Example 3

Production of imprint product using coating liquid of composition including poly(1-trifluoromethyl-3,5-cyclopentylene ethylene) and UV-curable resin To 5 g of a solution in which poly(1-trifluoromethyl-3,5-cyclopentyleneethylene) with Mw=98000 synthesized in Comparative Example 2 was dissolved at a concentration of 27% by mass in cyclohexanone was added 1.35 g of a solution including 1.0% by mass of the UV-curable resin monomer and 0.03% by mass of the photopolymerization initiator, each described in Example 4, in 2-methoxyethanol, and 20 mg of the solution thus obtained was added dropwise onto the pattern of the mold A and uniformly coated by spin coating.

Subsequently, it was dried at room temperature for 30 minutes under nitrogen gas flow, and then dried at 180° C. for 30 minutes. The curable resin was cured with UV irradiation at a light quantity of 500 mJ/cm$^2$, and then peeled from the mold to obtain an imprint product in the form of a film having a film thickness of 9 μm and a fine pattern transcribed thereon. The pattern was observed by means of SEM, and found to be in the shape of a distorted line with L1=570 to 592 nm.

Comparative Example 4

Production of Imprint Product with UV-Curable Resin 30 mg of a solution in which the UV-curable resin monomer and the photopolymerization initiator, each described in Example 5 were dissolved at concentrations of 30% by mass and 0.9% by mass, respectively, in 2-methoxyethanol was added dropwise onto the pattern of the mold A, and uniformly coated by spin coating.

Subsequently, it was dried at room temperature for 30 minutes under nitrogen gas flow, then dried at 180° C. for 30 minutes, and was cooled to room temperature. After the curable resin was cured with UV irradiation at a light quantity of 500 mJ/cm², peeling it from the mold was tried but it could not be done since the film was brittle and thus, cracked. Furthermore, the pencil hardness of the film having the solution coated on the glass substrate was equal to or higher than 9H, and the average transmittance at 345 to 385 nm of the peeled film having a thickness of 9 μm was 83.2%.

INDUSTRIAL APPLICABILITY

An imprint product obtained from the fluorine-containing cyclic olefin polymer composition of the present invention including a fluorine-containing cyclic olefin polymer (A) having a specific structure, a photocurable compound (B), and a photocuring initiator (C) is useful as an imprint product itself or as a replica mold in a nanoimprint method, and is of a high industrial value. An imprint product having a fine pattern obtained using the production method of the present invention, or a cured product produced using the imprint product as a replica mold are useful as an optical element (a micro lens array, an optical waveguide, an optical switching, a Fresnel zone plate, a binary optical element, a blaze optical element, a photonics crystal, or the like), an anti-reflection filter, a biochip, a microreactor chip, a recording medium, a display material, a carrier for a catalyst, or the like.

The present invention may include the following embodiments.

(a) A fluorine-containing cyclic olefin polymer composition, including a fluorine-containing cyclic olefin polymer (A) containing a repeating structural unit represented by the general formula (1) and having a fluorine atom content rate of 40 to 75% by mass; a photocurable compound (B); and a photocuring initiator (C).

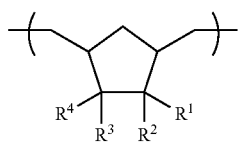

(1)

(in the formula (1), $R^1$ to $R^4$ are selected from the group consisting of fluorine, fluorine-containing alkyl having 1 to 10 carbon atoms, hydrogen, and alkyl having 1 to 10 carbon atoms, and at least one of $R^1$ to $R^4$ is fluorine or fluorine-containing alkyl having 1 to 10 carbon atoms; $R^1$ to $R^4$ may be combined with one another to form a ring structure.)

(b) The fluorine-containing cyclic olefin polymer composition as described in (a),
wherein the mass ratio (A)/(B) of the fluorine-containing cyclic olefin polymer (A) and the photocurable compound (B) is in the range from 99.9/0.1 to 80.0/20.0.

(c) The fluorine-containing cyclic olefin polymer composition as described in (a) or (b),
wherein the fluorine-containing cyclic olefin polymer (A) is a fluorine-containing cyclic olefin polymer having a region in which the change in the storage modulus or loss modulus with respect to the change in the temperature in the temperature region equal to or higher than the glass transition temperature is from −1 to 0 MPa/° C.

(d) The fluorine-containing cyclic olefin polymer composition as described in (c),
wherein the fluorine-containing cyclic olefin polymer (A) is a fluorine-containing cyclic olefin polymer in which the flat variable region of the storage modulus or the loss modulus in the temperature in the temperature region equal to or higher than the glass transition temperature is in the storage modulus or loss modulus region of 0.1 MPa or more.

(e) An imprint product to which a fine pattern of a mold is transcribed, obtained by bringing the fluorine-containing cyclic olefin polymer composition as described in any one of (a) to (d) into contact with the mold surface of a mold having a fine pattern over its surface, irradiating it with light to perform curing, and then transcribing the fine pattern of the mold surface.

(f) A method for producing an imprint product, comprising bringing the fluorine-containing cyclic olefin polymer composition as described in any one of (a) to (d) into contact with a mold having a fine pattern formed over its surface, heating and irradiating with light to perform curing, transcribing the pattern of the mold.

(g) A method for producing a cured product having a fine pattern transcribed over its surface, obtained by bringing the surface having the fine pattern of the imprint product as described in (e) into contact with a photocurable monomer composition, irradiating with light to perform curing, and then releasing the imprint product.

The invention claimed is:
1. A fluorine-containing cyclic olefin polymer composition, wherein the composition comprises:
a fluorine-containing cyclic olefin polymer (A) comprising a repeating structural unit represented by the general formula (1) and having a fluorine atom content rate of 40 to 75% by mass; a photocurable compound (B); and a photocuring initiator (C);

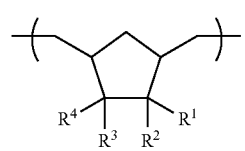

(1)

wherein at least one of $R^1$ to $R^4$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms; wherein when $R^1$ to $R^4$ are fluorine-free groups, $R^1$ to $R^4$ are selected from hydrogen, alkyl having 1 to 10 carbon atoms, alkoxy having 1 to 10 carbon atoms, and alkoxyalkyl having 2 to 10 carbon atoms; $R^1$ to $R^4$ are the same as or different from each other; and $R^1$ to $R^4$ are optionally combined with one another to form a ring structure;
wherein the mass ratio (A)/(B) of said fluorine-containing cyclic olefin polymer (A) and said photocurable compound (B) is in the range from 99.9/0.1 to 80/20; and
wherein said photocurable compound (B) is at least one kind selected from the group consisting of compounds represented by the following general formulate (5), (6), (7), (8) and (9);

(5)

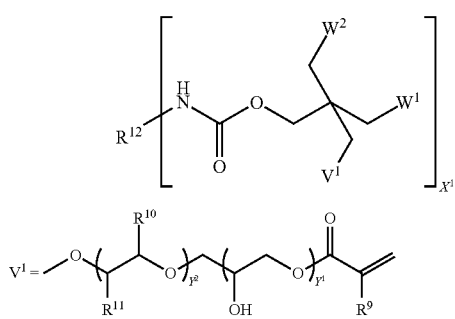

wherein, in the formula (5), $R^{12}$ represents tolylene, diphenylmethane, hexamethylene, norbornane dimethylene, dicyclohexylenemethane, trimethylcyclohexylene, cyclohexane dimethylene, N,N',N"-tris(hexamethylene)-isocyanurate, N,N'-dihexamethyleneurea, N,N,N'-tris(hexamethylene)-urea, N,N,N',N'-tetrakis(hexamethylene)-urea, or xylene; $R^9$, $R^{10}$, and $R^{11}$ independently represent H or $CH_3$; $W^1$ and $W^2$ represent H, $CH_3$, OH, or $V^1$; $X^1$ represents an integer of 2 to 4; $Y^1$ represents an integer of 0 to 2 and $Y^2$ represents an integer of 0 to 5;

(6)

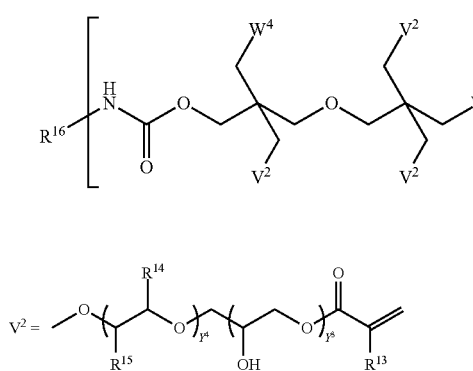

wherein, in the formula (6); $R^{16}$ represents tolylene, diphenyl methane, hexamethylene, norbornanedimethylene, dicyclohexylenemethane, trimethylcyclohexylene, cyclohexane dimethylene, N,N',N"-tris(hexamethylene)-isocyanurate, N,N'-dihexamethyleneurea, N,N,N'-tris(hexamethylene)-urea, N,N,N',N'-tetrakis(hexamethylene)-urea, or xylene; $R^{13}$, $R^{14}$, and $R^{15}$ independently represent H or $CH_3$; $W^3$ and $W^4$ represent H, $CH_3$, OH, or $V^2$; $X^2$ represents an integer of 2 to 4; $Y^3$ represents an integer of 0 to 2, and $Y^4$ represents an integer of 0 to 5;

(7)

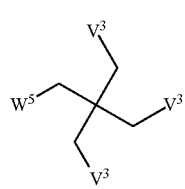

-continued

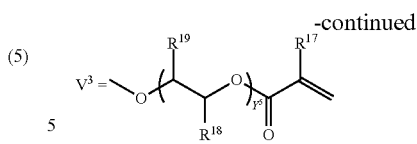

wherein, in the formula (7), $W^5$ represents H, $CH_3$, OH, or $V^3$; $R^{17}$, $R^{18}$, and $R^{19}$ independently represent H or $CH_3$, and $Y^5$ represents an integer of 0 to 20;

(8)

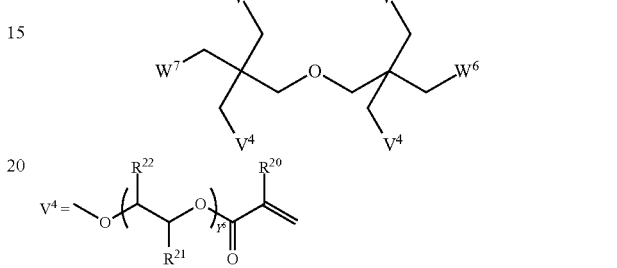

wherein in the formula (8), $W^6$ and $W^7$ represent H, $CH_3$ OH or $V^4$; $R^{20}$, $R^{21}$, and $R^{22}$ represent H or $CH_3$, and $Y^6$ represents an integer of 0 to 3;

(9)

wherein, in the formula (9), $W^8$ represents H, alkyl having 1 to 3 carbon atoms, OH, or $V^5$, and $Y^7$ represents an integer of 1 to 20.

2. The fluorine-containing cyclic olefin polymer composition as set forth in claim 1,
wherein the storage modulus or loss modulus of said fluorine-containing cyclic olefin polymer (A) in the measurement of a dynamic mechanical analysis by tensile mode at a frequency of 1 Hz and a temperature increase rate of 3° C./minute has a variable region in the range from −1 to 0 MPa/° C. with respect to a temperature varying in the temperature region of the glass transition temperature or higher.

3. The fluorine-containing cyclic olefin polymer composition as set forth in claim 1,
wherein the variable region of the storage modulus or loss modulus in the temperature region of the glass transition temperature or higher of said fluorine-containing cyclic olefin polymer (A) is in the storage modulus region or loss modulus region of 0.1 MPa or more.

4. The fluorine-containing cyclic olefin polymer composition as set forth in claim 1,
wherein said fluorine-containing cyclic olefin polymer (A) comprises a repeating structural unit [I] represented by the general formula (1) and a repeating structural unit [II] represented by the general formula (2), the molar ratio thereof is [1]/[11]=95/5 to 25/75, and the fluorine atom content rate is 40 to 75% by mass;

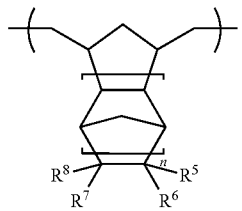

(2)

wherein, at least one of $R^5$ to $R^8$ is fluorine, fluorine-containing alkyl having 1 to 10 carbon atoms, fluorine-containing alkoxy having 1 to 10 carbon atoms, or fluorine-containing alkoxyalkyl having 2 to 10 carbon atoms; wherein when $R^5$ to $R^8$ are fluorine-free groups, $R^5$ to $R^8$ are selected from hydrogen, alkyl having 1 to 10 carbon atoms, alkoxy having 1 to 10 carbon atoms, and alkoxyalkyl having 2 to 10 carbon atoms; $R^5$ to $R^8$ are the same as or different from each other; $R^5$ to $R^8$ are optionally combined with one another to form a ring structure; n represents an integer of 1 or 2.

5. A method for producing an imprint product to which a fine pattern of a mold is transcribed, wherein the method comprising:

a step of bringing said fluorine-containing cyclic olefin polymer composition as set forth in claim 1 into contact with the surface of a mold having a fine pattern over its surface, and a step of heating said composition and then irradiating it with light to cure said composition.

6. The method for producing an imprint product as set forth in claim 5, wherein said step of bringing said fluorine-containing cyclic olefin polymer composition into contact with the surface of the mold comprises a step of coating the composition over the surface of a mold having a fine pattern over its surface.

7. A method for producing an imprint product to which a fine pattern of a mold is transcribed, wherein the method comprising: a step of forming the coating film by coating the fluorine-containing cyclic olefin polymer composition as set forth in claim 1 over a support, a step of pressing the upper surface of said coating film to a mold surface having a fine pattern, and a step of heating said coating film pressed over said mold surface, and then irradiating it with light to cure the coating film.

* * * * *